United States Patent
Duluk, Jr. et al.

(10) Patent No.: US 6,476,807 B1
(45) Date of Patent: Nov. 5, 2002

(54) METHOD AND APPARATUS FOR PERFORMING CONSERVATIVE HIDDEN SURFACE REMOVAL IN A GRAPHICS PROCESSOR WITH DEFERRED SHADING

(75) Inventors: Jerome F. Duluk, Jr., Palo Alto; Stephen L. Dodgen, Boulder Creek; Richard E. Hessel, Pleasanton; Emerson S. Fang; Hengwei Hsu, both of Fremont; Jason R. Redgrave, Mountain View; Sushma S. Trivedi, Sunnyvale, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/378,391

(22) Filed: Aug. 20, 1999

Related U.S. Application Data

(60) Provisional application No. 60/097,336, filed on Aug. 20, 1998.

(51) Int. Cl.[7] .............................................. G06T 15/40
(52) U.S. Cl. ...................... 345/421; 345/422; 345/506; 345/582; 345/589; 345/539
(58) Field of Search ................................ 345/420, 421, 345/422, 506, 582, 589, 539

(56) References Cited

U.S. PATENT DOCUMENTS

| | | | |
|---|---|---|---|
| 4,783,829 A | 11/1988 | Miyakawa et al. | |
| 4,945,500 A | 7/1990 | Deering | 364/522 |
| 4,970,636 A | 11/1990 | Snodgrass et al. | 364/518 |
| 5,083,287 A | 1/1992 | Obata et al. | 395/126 |
| 5,123,085 A * | 6/1992 | Wells et al. | 345/421 |

(List continued on next page.)

OTHER PUBLICATIONS

Watt, "3D Computer Graphics" (2nd ed.), Chapter 4, Reflection and Illumination Models, pp. 89–126.

Foley et al., Computer Graphics—Principles and Practice (2nd ed. 1996), Chapter 16, Illumination and Shading, pp. 721–814.

(List continued on next page.)

*Primary Examiner*—Mark Zimmerman
*Assistant Examiner*—Kimbinh T. Nguyen
(74) *Attorney, Agent, or Firm*—Dorsey & Whitney LLP; R. Michael Ananian

(57) ABSTRACT

Structure, apparatus, and method for performing conservative hidden surface removal in a graphics processor. Culling is divided into two steps, a magnitude comparison content addressable memory cull operation (MCCAM Cull), and a subpixel cull operation. The MCCAM Cull discards primitives that are hidden completely by previously processed geometry. The Subpixel Cull takes the remaining primitives (which are partly or entirely visible), and determines the visible fragments. In one embodiment the method of performing hidden surface removal includes: selecting a current primitive comprising a plurality of stamps; comparing stamps to stamps from previously evaluated primitives; selecting a first stamp as a currently potentially visible stamp (CPVS) based on a relationship of depth states of samples in the first stamp with depth states of samples of previously evaluated stamps; comparing the CPVS to a second stamp; discarding the second stamp when no part of the second stamp would affect a final graphics display image based on the stamps that have been evaluated; discarding the CPVS and making the second stamp the CPVS, when the second stamp hides the CPVS; dispatching the CPVS and making the second stamp the CPVS when both the second stamp and the CPVS are at least partially visible in the final graphics display image; and dispatching the second stamp and the CPVS when the visibility of the second stamp and the CPVS depends on parameters evaluated later in the computer graphics pipeline.

31 Claims, 26 Drawing Sheets

U.S. PATENT DOCUMENTS

| | | | |
|---|---|---|---|
| 5,402,532 A | 3/1995 | Epstein et al. | 395/122 |
| 5,448,690 A | 9/1995 | Shiraishi et al. | |
| 5,455,900 A | 10/1995 | Shiraishi et al. | |
| 5,481,669 A | 1/1996 | Poulton et al. | |
| 5,574,836 A | 11/1996 | Broemmelsiek | 395/127 |
| 5,579,455 A * | 11/1996 | Greene et al. | 345/422 |
| 5,596,686 A * | 1/1997 | Duluk, Jr. | 345/422 |
| 5,664,071 A | 9/1997 | Nagashima | |
| 5,684,939 A * | 11/1997 | Foran et al. | 345/593 |
| 5,699,497 A | 12/1997 | Erdahl et al. | |
| 5,710,876 A | 1/1998 | Peercy et al. | 395/126 |
| 5,767,589 A | 6/1998 | Baldwin | |
| 5,767,859 A | 6/1998 | Rossin et al. | 345/434 |
| 5,828,378 A | 10/1998 | Shiraishi | 345/422 |
| 5,841,447 A | 11/1998 | Drews | |
| 5,850,225 A | 12/1998 | Cosman | |
| 5,854,631 A | 12/1998 | Akeley et al. | 345/419 |
| 5,860,158 A | 1/1999 | Pai et al. | |
| 5,864,342 A | 1/1999 | Kajiya et al. | 345/418 |
| RE36,145 E | 3/1999 | DeAguiar et al. | 345/511 |
| 5,880,736 A | 3/1999 | Peercy et al. | 345/426 |
| 5,889,997 A | 3/1999 | Strunk | |
| 5,920,326 A | 7/1999 | Rentschler et al. | |
| 5,949,424 A | 9/1999 | Cabral et al. | 345/426 |
| 5,949,428 A | 9/1999 | Toelle et al. | |
| 5,977,977 A | 11/1999 | Kajiya et al. | 345/418 |
| 5,990,904 A | 11/1999 | Griffin | |
| 6,002,410 A | 12/1999 | Battle | |
| 6,002,412 A | 12/1999 | Schinnerer | |
| 6,118,452 A | 9/2000 | Gannett | |
| 6,128,000 A | 10/2000 | Jouppi et al. | |
| 6,167,486 A | 12/2000 | Lee et al. | |
| 6,204,859 B1 * | 3/2001 | Jouppi et al. | 345/582 |
| 6,229,553 B1 | 5/2001 | Duluk, Jr. et al. | |
| 6,246,415 B1 | 6/2001 | Grossman et al. | |
| 6,259,452 B1 * | 7/2001 | Coorg et al. | 345/421 |

OTHER PUBLICATIONS

Lathrop, "The Way Computer Graphics Works" (1997) Chapter 7, Rendering (Converting A Scene to Pixels), pp. 93–150.

Peercy et al., "Efficient Bump Mapping Hardware" (Computer Graphics Proceedings, Annual Conference Series, 1997) pp. 303–306.

Lathrop "Rendering (converting a scene to pixels)", (The Way Computer Graphics Works, Wiley Computer Publishing, 1997, John Wiley & Sons, Inc., Chapter 7, pp. 93–150).

Foley et al. "Illumination and shading" (Computer Graphics Principles and Practice (2nd edition in C, Addison–Wesley Publishing Co. 1996, Chapter 16, pp. 721–814).

Watt "Reflection and illumination models" (3D Computer Graphics, 2nd edition, Addison–Wesley, 1993, pp. 89–126).

Schilling et al., "Texram: a smart memory for texturing," IEEE computer graphics and applications, 5/96, 32–41.

Angel (interactive computer graphics: a top–down approach with OpenG1: ISBN: 0–201–85571–2–sections 6.8 & 7.7.2).

* cited by examiner

TILES, STAMPS, AND STAMP PORTIONS

ALL THE SAMPLES WITHIN ONE STAMP FOR A PARTICULAR PRIMITIVE

ALL THE SAMPLES THAT ARE "CURRENTLY" VISIBLE WITHIN ONE STAMP FOR A PARTICULAR PRIMITIVE, BECOME A VSP WHEN DISPATCHED DOWN THE PIPELINE

A FRAGMENT IS ONE PIXEL WITHIN A STAMP PORTION

| NAME | ALSO KNOWN AS | BITS | PRECISION | PURPOSE/DESCRIPTION/OTHER INTERPRETATION |
|---|---|---|---|---|
| PacketType | | 3 | | TO INDICATE THE TYPE OF PACKET |
| PrimType | | 2 | | TO INDICATE TRIANGLE, LINE OR POINT |
| XleftTop | | 16 | 11.5 | IS Xcenter FOR POINT |
| XrightTop | | 16 | 11.5 | IS Xcenter FOR POINT |
| YLRTop | | 8 | 5.3 | |
| XleftCorner | | 16 | 11.5 | |
| YleftCorner | | 8 | 5.3 | |
| XrightCorner | | 16 | 11.5 | |
| YrightCorner | | 8 | 5.3 | IS Yoffset FOR POINT |
| Ybottom | | 8 | 5.3 | |
| SlopeLeft | dxleft/dy | 24 | S14.9 | |
| SlopeRight | dxright/dy | 24 | S14.9 | |
| SlopeBot | dxbottom/dy | 24 | S14.9 | |
| ZslopeX | dz/dx | 35 | S27.7 | |
| ZslopeY | dz/dy | 35 | S27.7 | |
| ZrefTile | | 32 | S28.3 | |
| ZminTile | | 24 | 24.0 | |
| LeftValid | LeftC | 1 | | |
| RightValid | RightC | 1 | | |
| XrefStamp | | 3 | | |
| YrefStamp | | 3 | | |
| XminStamp | | 3 | | |
| XmaxStamp | | 3 | | |
| YminStamp | | 3 | | |
| YmaxStamp | | 3 | | |
| ColorPointer | | 36 | | |
| CullFlushOverlap | | 1 | | |
| DoAlphaTest | | 1 | | |
| DoABlend | | 1 | | |
| DepthFunc | | 3 | | |
| DepthTestEnabled | | 1 | | |
| DepthTestMask | | 1 | | |
| NoColor | | 1 | | |
| PointLineWidth | | 3 | | |
| TOTAL | | 367 | | |

FIG. 15

DETAILED CHSR FLOW CHART
- 9160: RECEIVE PACKETS AND STORE IN A QUEUE.
- 9162: RETRIEVE A CURRENT PRIMITIVE.
- 9164: COMPARE A MINIMUM Z VALUE (ZMin) FOR THE CURRENT PRIMITIVE WITH THE MAXIMUM Z VALUE (ZMax) FOR EACH STAMP IN THE PRIMITIVE'S BOUNDING BOX.
- 9166: IDENTIFY EACH STAMP WHERE ZMin ≤ ZMax WHICH INDICATES THE STAMP IS POTENTIALLY VISIBLE AND SET A CORRESPONDING STAMP SELECTION BIT.
- 9168: IDENTIFY EACH ROW THAT CONTAINS AT LEAST ONE POTENTIALLY VISIBLE STAMP, AND SET A CORRESPONDING ROW SELECTION BIT.
- 9170: FOR EACH ROW OF STAMPS THAT CONTAINS A POTENTIALLY VISIBLE STAMP, SIMULTANEOUSLY COMPUTE THE $XleftSub_i$ AND $XrightSub_i$ FOR EACH OF THE SAMPLE POINTS IN A ROW.
- 9172: DETERMINE THE SET OF STAMPS TOUCHED BY THE PRIMITIVE IN A STAMP ROW FOR EACH SUBRASTER LINE WHERE A SAMPLE POINT IS LOCATED, AND SET THE CORRESPONDING STAMP PRIMITIVE COVERAGE BITS.
- 9174: AND TOGETHER THE STAMP SELECTION BITS AND STAMP PRIMITIVE COVERAGE BITS TO FORM A TOUCHED STAMP LIST.
- 9176: SELECT A STAMP FROM THE TOUCHED STAMP LIST.
- 9178: DETERMINE THE SET OF SAMPLE POINTS IN THE STAMP THAT IS COVERED BY THE PRIMITIVE.
- 9180: COMPUTE THE Z VALUE OF THE PRIMITIVE AT THOSE SAMPLE POINTS.
- 9182: COMPARE THE RESULTING Z VALUES TO THE CORRESPONDING STORED Z VALUES FOR THAT STAMP.
- 9184: UPDATE STORED Z VALUES.
- 9186: GENERATE CONTROL BITS FOR EACH SAMPLE.
- 9188: STORE CONTROL BITS TO FORM A VSP COVERAGE MASK.
- 9190: DOES MORE THAN ONE SAMPLE POSSIBLY AFFECT THE SAMPLE POSITION FINAL VALUE:
- 9192:    YES: EARLY DISPATCH THE STAMP PORTIONS CONTAINING A SAMPLE FOR THAT SAMPLE POSITION.
         NO:  DONE

FIG. 16

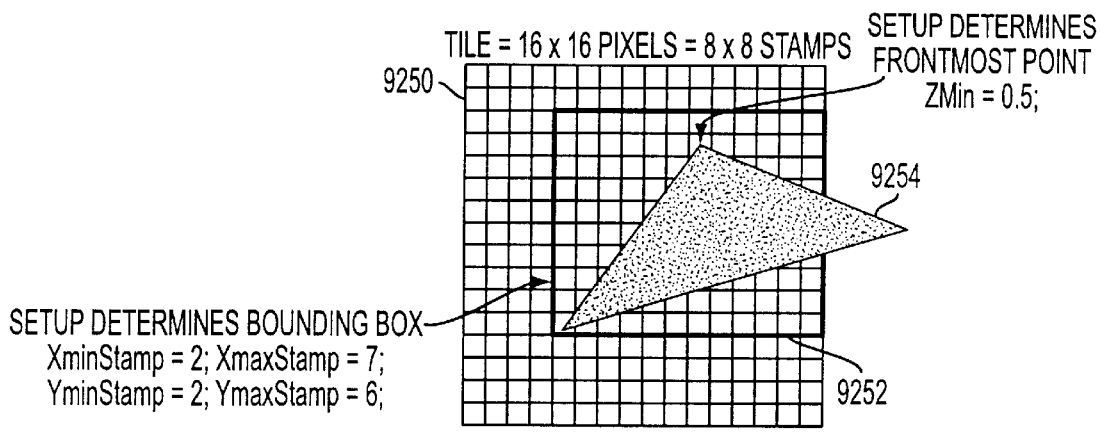
FIG. 17A
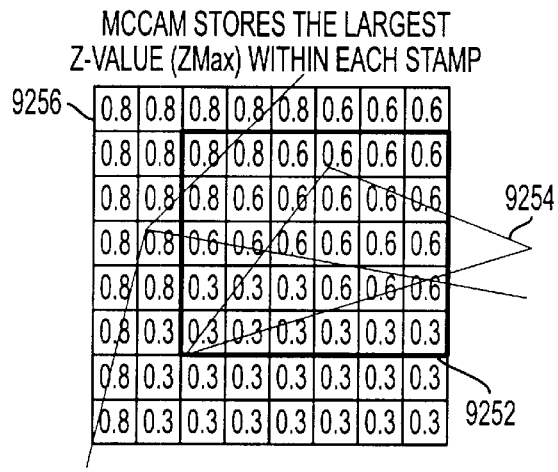
FIG. 17B
FOR EACH STAMP WITHIN THE BOUNDING BOX, MCCAM DOES PARALLEL COMPARISONS TO FIND WHERE ZMin ≤ ZMax, AND INDICATES WHICH ROWS HAVE ANY ZMin ≤ ZMax.
FIG. 17C

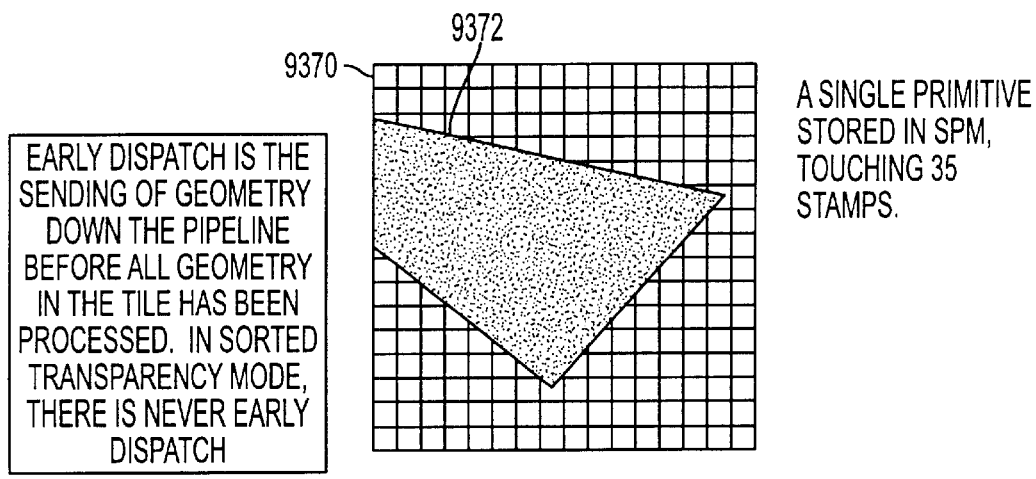
FIG. 23A
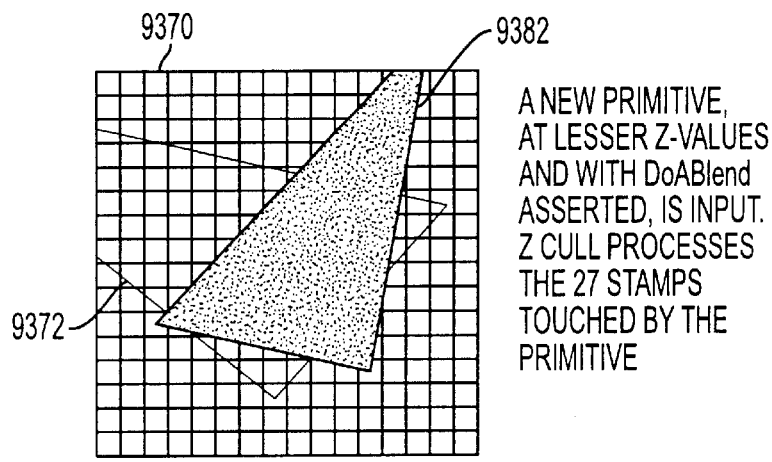
FIG. 23B
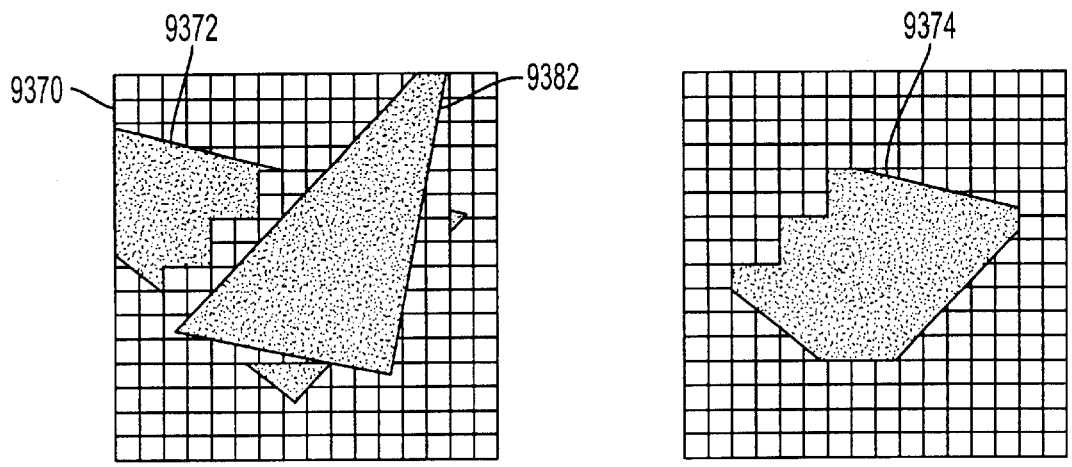
FIG. 23C
FIG. 23D

SORTED TRANSPARENCY MODE
   7.1.1 STORE Z VALUES FOR THE FRONT MOST OPAQUE PRIMITIVE SAMPLES
   7.1.2 SET THE FRONT MOST OPAQUE PRIMITIVE SAMPLES' Z VALUES TO BE Zfar VALUES
   7.1.3 DISPATCH THE FRONT MOST OPAQUE PRIMITIVE SAMPLES DOWN THE PIPELINE TO BE RENDERED.
   7.1.4 SET Znear TO ZERO.
   7.1.5 START NEXT PASS
   7.1.6 IDENTIFY SAMPLES WITH GREATEST Z VALUES THAT ARE LESS THAN Zfar, DEFINE AS THE NEW Znear VALUES, AND STORE THE CORRESPONDING SAMPLES.
   7.1.7 DISPATCH SAMPLES CORRESPONDING TO THE NEW Znear VALUES
   7.1.8 SET Zfar TO THE VALUE OF Znear.
   7.1.9 [GOTO START NEXT PASS (4)].

FIG. 29

METHOD AND APPARATUS FOR PERFORMING CONSERVATIVE HIDDEN SURFACE REMOVAL IN A GRAPHICS PROCESSOR WITH DEFERRED SHADING

RELATED APPLICATIONS

This application claims the benefit under 35 USC Section 119(e) of U.S. Provisional Patent Application Ser. No. 60/097,336 filed Aug. 20, 1998 and entitled GRAPHICS PROCESSOR WITH DEFERRED SHADING.

This application is also related to the following U.S. patent applications, each of which are incorporated herein by reference:

Ser. No. 09/213,990, filed Dec. 17, 1998, entitled HOW TO DO TANGENT SPACE LIGHTING IN A DEFERRED SHADING ARCHITECTURE;

Ser. No. 09/378,598, filed Aug. 20, 1999, entitled APPARATUS AND METHOD FOR PERFORMING SETUP OPERATIONS IN A 3-D GRAPHICS PIPELINE USING UNIFIED PRIMITIVE DESCRIPTORS;

Ser. No. 09/378,633, filed Aug. 20, 1999, entitled SYSTEM, APPARATUS AND METHOD FOR SPATIALLY WORTING IMAGE DATA IN A THREE-DIMENSIONAL GRAPHICS PIPELINE;

Ser. No. 09/378,439, filed Aug. 20, 1999, entitled GRAPHICS PROCESSOR WITH PIPELINE STATE STORAGE AND RETRIEVAL;

Ser. No. 09/378,408, filed Aug. 20, 1999, entitled METHOD AND APPARATUS FOR GENERATING TEXTURE;

Ser. No. 09/379,144, filed Aug. 20, 1999, entitled APPARATUS AND METHOD FOR GEOMETRY OPERATIONS IN A 3D GRAPHICS PIPELINE;

Ser. No. 09/372,137, filed Aug. 20, 1999, entitle APPARATUS AND METHOD FOR FRAGMENT OPERATIONS IN A 3D GRAPHICS PIPELINE;

Ser. No. 09/377,503, filed Aug. 20, 1999, entitled Deferred Shading Graphics Pipeline Processor Having Advanced Features; and Ser. No. 09/378,637, filed Aug. 20, 1999, entitled DEFERRED SHADING GRAPHICS PIPELINE PROCESSOR; and Ser. No. 09/378,299, filed Aug. 20, 1999, entitled DEFERRED SHADING GRAPHICS PIPELINE PROCESSOR, now U.S. Pat. No. 6,229,553.

Ser. No. 09/378,598, filed Aug. 20, 1999, entitled APPARATUS AND METHOD FOR PERFORMING SETUP OPERATIONS IN A 3-D GRAPHICS PIPELINE USING UNIFIED PRIMITIVE DESCRIPTORS.

1 FIELD OF THE INVENTION

This invention relates to three-dimensional computer graphics computer systems, and more particularly to a system for performing conservative hidden surface removal in a graphics processor with deferred shading.

2 BACKGROUND OF THE INVENTION

Computer graphics is the art and science of generating pictures with a computer. This picture or image generation process is commonly called rendering. Generally, in three-dimensional (3D) computer graphics, geometry that represents surfaces (or volumes) of objects in a scene is translated into pixels stored in a frame buffer, and then displayed on a display device. Real-time display devices, such as CRTs used as computer monitors, refresh the display by continuously displaying the image over and over. This refresh usually occurs row-by-row, where each row is called a raster line or scan line. In this document, raster lines are numbered from bottom to top, but are displayed in order from top to bottom.

In a 3D animation, a sequence of images is displayed, giving the illusion of motion in three-dimensional space. Interactive 3D computer graphics allows a user to change his viewpoint or change the geometry in real-time, thereby requiring the rendering system to create new images on-the-fly in real-time.

In 3D computer graphics, each renderable object generally has its own local object coordinate system, and therefore needs to be translated (or transformed) from object coordinates to pixel display coordinates. Conceptually, this is a 4-step process: 1) translation (including scaling for size enlargement or shrink) from object coordinates to world coordinates, which is the coordinate system for the entire scene; 2) translation from world coordinates to eye coordinates, based on the viewing point of the scene; 3) translation from eye coordinates to perspective translated eye coordinates, where perspective scaling (farther objects appear smaller) has been performed; and 4) translation from perspective translated eye coordinates to pixel coordinates, also called screen coordinates. Screen coordinates are points in three-dimensional space, and can be in either screen-precision (i.e., pixels) or object-precision (high precision numbers, usually floating-point), as described later. These translation steps can be compressed into one or two steps by pre-computing appropriate translation matrices before any translation occurs. Once the geometry is in screen coordinates, it is broken into a set of pixel color values (that is "rasterized") that are stored into the framer buffer. Many techniques are used for generating pixel color values, including Gouraud shading, Phong shading, and texture mapping.

A summary of the prior art rendering process can be found in: "Fundamentals of Three-dimensional Computer Graphics", by Watt, Chapter 5: The Rendering Process, pages 97 to 113, published by Addison-Wesley Publishing Company, Reading, Mass., 1989, reprinted 1991, ISBN 0-201-15442-0 (hereinafter referred to as the Watt Reference).

FIG. 1 shows a three-dimensional object, a tetrahedron, with its own coordinate axes ($X_{obj}, Y_{obj}, Z_{obj}$). The three-dimensional object is translated, scaled, and placed in the viewing point's coordinate system based on ($X_{eye}, Y_{eye}, Z_{eye}$). The object is projected onto the viewing plane, thereby correcting for perspective. At this point, the object appears to have become two-dimensional; however, the object's z coordinates are preserved so they can be used later by hidden surface removal techniques. The object is finally translated to screen coordinates, based on ($X_{screen}, Y_{screen}, Z_{screen}$), where $z_{screen}$ is going perpendicularly into the page. Points on the object now have their x and y coordinates described by pixel location (and fractions thereof) within the display screen and their z coordinates in a scaled version of distance from the viewing point.

Because many different portions of geometry can affect the same pixel, the geometry representing the surfaces closest to the scene viewing point must be determined. Thus, for each pixel, the visible surfaces within the volume subtended by the pixel's area determine the pixel color value, while hidden surfaces are prevented from affecting the pixel. Non-opaque surfaces closer to the viewing point than the closest opaque surface (or surfaces, if an edge of geometry crosses the pixel area) affect the pixel color value, while all other non-opaque surfaces are discarded. In this document, the term "occluded" is used to describe geometry which is hidden by other non-opaque geometry.

Many techniques have been developed to perform visible surface determination, and a survey of these techniques are incorporated herein by reference to: "Computer Graphics: Principles and Practice", by Foley, van Dam, Feiner, and Hughes, Chapter 15: Visible-Surface Determination, pages 649 to 720, 2nd edition published by Addison-Wesley Publishing Company, Reading, Mass., 1990, reprinted with corrections 1991, ISBN0-201-12110-7 (hereinafter referred to as the Foley Reference). In the Foley Reference, on page 650, the terms "image-precision" and "object-precision" are defined: "Image-precision algorithms are typically performed at the resolution of the display device, and determine the visibility at each pixel. Object-precision algorithms are performed at the precision with which each object is defined, and determine the visibility of each object."

As a rendering process proceeds, most prior art renderers must compute the color value of a given screen pixel multiple times because multiple surfaces intersect the volume subtended by the pixel. The average number of times a pixel needs to be rendered, for a particular scene, is called the depth complexity of the scene. Simple scenes have a depth complexity near unity, while complex scenes can have a depth complexity of in or twenty. As scene models become more and more complicated, renderers will be required to process scenes of ever increasing depth complexity. Thus, for most renders, the depth complexity of a scene is a measure of the wasted processing. For example, for a scene with a depth complexity of ten, 90% of the computation is wasted on hidden pixels. This wasted computation is typical of hardware renderers that use the simple Z buffer technique (discussed later herein), generally chosen because it is easily built in hardware. Methods more complicated than the Z Buffer technique have heretofore generally been too complex to build in a cost-effective manner. An important feature of the method and apparatus invention presented here is the avoidance of this wasted computation by eliminating hidden portions of geometry before they are rasterized, while still being simple enough to build in cost-effective hardware.

When a point on a surface (frequently a polygon vertex) is translated to screen coordinates, the point has three coordinates: 1) the x coordinate in pixel units (generally including a fraction); 2) the y coordinate in pixel units (generally including a fraction); and 3) the z coordinate of the point in either eye coordinates, d from the virtual screen, or some other coordinate system which preserves the relative distance of surfaces from the viewing point. In this document, positive z coordinate values are used for the "look direction" from the viewing point, and smaller values indicate a position closer to the viewing point.

When a surface is approximated by a set of planar polygons, the vertices of each polygon are translated to screen coordinates. For points in or on the polygon (other than the vertices), the screen coordinates are interpolated from the coordinates of vertices, typically by the processes of edge walking and. span interpolation. Thus, a z coordinate value is generally included in each pixel value (along with the color value) as geometry is rendered.

2.1 Generic 3D Graphics Pipeline

Many hardware renderers have been developed, and an example is incorporated herein by reference: "Leo: A System for Cost Effective 3D Shaded Graphics", by Deering and Nelson, pages 101 to 108 of SIGGRAPH93 Proceedings, Aug. 1–6, 1993, Computer Graphics Proceedings, Annual Conference Series, published by ACM SIGGRAPH, New York, 1993, Softcover ISBN 0-201-58889-7 and CD-ROM ISBN 0-201-56997-3 (hereinafter referred to as the Deering Reference). The Deering Reference includes a diagram of a generic 3D graphics pipeline (i.e., a renderer, or a rendering system) that it describes as "truly generic, as at the top level nearly every commercial 3D graphics accelerator fits this abstraction", and this pipeline diagram is reproduced here as FIG. 2. Such pipeline diagrams convey the process of rendering, but do not describe any particular hardware. This document presents a new graphics pipeline that shares some of the steps of the generic 3D graphics pipeline. Each of the steps in the generic 3D graphics pipeline will: be briefly explained here. Processing of polygons is assumed throughout this document, but other methods for describing 3D geometry could be substituted. For simplicity of explanation, triangles are used as the type of polygon in the described methods.

As seen in FIG. 2, the first step within the floating-point intensive functions of the generic 3D graphics pipeline after the data input (step 212) is the transformation step (step 214), which was described above. The second step, the clip test, checks the polygon to see if it is at least partially contained in the view volume (sometimes shaped as a frustum) (step 216). If the polygon is not in the view volume, it is discarded; otherwise processing continues. The third step is face determination, where polygons facing away from the viewing point are discarded (step 218). Generally, face determination is applied only to objects that are closed volumes. The fourth step, lighting computation, generally includes the set up for Gouraud shading and/or texture mapping with multiple light sources of various types, but could also be set up for Phong shading or one of many other choices (step 222). The fifth step, chipping, deletes any portion of the polygon that is outside of the view volume because that portion would not project within the rectangular area of toe viewing plane (step 224). Generally, polygon clipping is done by splitting the polygon into two smaller polygons that both project within the area of the viewing plane. Polygon clipping is computationally expensive. The sixth step, perspective divide, does perspective correction for the projection of objects onto the viewing plane,(step 226). At this point, the points representing vertices of polygons are converted to pixel space coordinates by step seven, the screen space conversion step (step 228). The eighth step (step 230), set up for incremental render, computes the various begin, end, and increment values needed for edge walking and span interpolation (e.g.: x, y, and z coordinates; RGB color; texture map space u and v coordinates; and the like).

Within the drawing intensive functions, edge walking (step 232) incrementally generates horizontal spans for each raster line of the display device by incrementing values from the previously generated span (in the same polygon), thereby "walking" vertically along opposite edges of the polygon. Similarly, span interpolation (step 234) "walks" horizontally along a span to generate pixel values, including a z coordinate value indicating the pixel's distance from the viewing point. Finally, the z buffered blending also referred to as Testing and Blending (step 236) generates a final pixel color value. The pixel values also include color values, which can be generated by simple Gouraud shading (i.e., interpolation of vertex color values) or by more computationally expensive techniques such as texture mapping (possibly using multiple texture maps blended together),; Phong shading (i.e., per-fragment lighting), and/or bump mapping (perturbing the interpolated surface normal). After drawing intensive functions are completed, a double-buffered MUX output look-up table operation is performed (step 238). In this figure the blocks with rounded corners typically represent functions or process operations, while sharp cornered rectangles typically represent stored data or memory.

By comparing the generated z coordinate value to the corresponding value stored in the Z Buffer, the z buffered blend either keeps the new pixel values (if it is closer to the viewing point than previously stored value for that pixel location) by writing it into the frame buffer, or discards the new pixel values (if it is farther). At this step, antialiasing methods can blend the new pixel color with the old pixel color. The z buffered blend generally includes most of the per-fragment operations, described below.

The generic 3D graphics pipeline includes a double buffered frame buffer, so a double buffered MUX is also included. An output lookup table is included for translating color map values. Finally, digital to analog conversion makes an analog signal for input to the display device.

A major drawback to the generic 3D graphics pipeline is its drawing intensive functions are not deterministic at the pixel level given a fixed number of polygons. That is, given a fixed number of polygons, more pixel-level computation is required as the average polygon size increases. However, the floating-point intensive functions are proportional to the number of polygons, and independent of the average polygon size. Therefore, it is difficult to balance the amount of computational power between the floating-point intensive functions and the drawing intensive functions because this balance depends on the average polygon size.

Prior art Z Buffers are based on conventional Random Access Memory (RAM or DRAM), Video RAM (VRAM), or special purpose DRAMs. One example of a special purpose DRAM is presented in "FBRAM: A new Form of Memory Optimized for 3D Graphics", by Deering, Schlapp, and Lavelle, pages 167 to 174 of SIGGRAPH94 Proceedings, Jul. 24–29, 1994, Computer Graphics Proceedings, Annual Conference Series, published by ACM SIGGRAPH, New York, 1994, Softcover ISBN 0201607956.

2.2 Pipeline State

OpenGL® is a software interface to graphics hardware which consists of several hundred functions and procedures that allow a programmer to specify objects and operations to produce graphical images. The objects and operations include appropriate characteristics to produce color images of three-dimensional objects. Most of OpenGL® (Version 1.2) assumes or requires a that the graphics hardware include a frame buffer even though the object may be a point, line, polygon, or bitmap, and the operation may be an operation on that object. The general features of OpenGL® (just one example of a graphical interface) are described in the reference "The OpenGL® Graphics System: A Specification (Version 1.2) edited by Mark Segal and Kurt Akeley, Version Mar. 12, 1998; and hereby incorporated by reference. Although, reference is made to OpenGL®, the invention is not limited to structures, procedures, or methods which are compatible or consistent with OpenGL®, or with any other standard or non-standard graphical interface, Desirably, the inventive structure and method may be implemented in a manner that is consistent with the OpenGL®, or other standard graphical interface, so that a data set prepared for one of the standard interfaces may be processed by the inventive structure and method without modification. However, the inventive structure and method provides some features not provided by OpenGL®, and even when such generic input/output is provided, the implementation is provided in a different manner.

The phrase pipeline state" does not have a single definition in the prior-art. The OpenGL® specification, for example, sets forth the type and amount of the graphics rendering machine or pipeline state in terms of items of state and the number of bits and bytes required to store that state information. In the OpenGL® definition, pipeline state tends to include object vertex pertinent information including for example, the vertices themselves the vertex normals, and color as well as "non-vertex" information.

When information is sent into a graphics renderer, at least some object geometry information is provided to describe the scene. Typically, the object or objects are specified in terms of vertex information, where an object is modeled, defined, or otherwise specified by points, lines, or polygons (object primitives) made up of one or more vertices. In simple terms, a vertex is a location in space and may be specified for example by a three-space (x,y,z) coordinate relative to some reference origin., Associated with each vertex is other information, such as a surface normal, color, texture, transparency, and the like information pertaining to the characteristics of the vertex. This information is essentially "per-vertex" information.

Unfortunately, forcing a one-to-one relationship between incoming information and vertices as a requirement for per-vertex information is unnecessarily restrictive. For example, a color value may be specified in the data stream for a particular vertex and then not respecified in the data stream until the color changes for a subsequent vertex. The color value may still be characterized as per-vertex data even though a color value is not explicitly included in the incoming data stream for each vertex.

Texture mapping presents an interesting example of information or data which could be considered as either per-vertex information or pipeline state information. For each object, one or more texture maps may be specified, each texture map being identified in some manner, such as with a texture coordinate or coordinates. One may consider the texture map to which one is pointing with the texture coordinate as part of the pipeline state while others might argue that it is per-vertex information.

Other information, not related on a one-to-one basis to the geometry object primitives, used by the renderer such as lighting location and intensity, material settings, reflective properties, and other overall rules on which the renderer is operating may more accurately be referred to as pipeline state. One may consider that everything that does not or may not change on a per-vertex basis is pipeline state, but for the reasons described, this is not an entirely unambiguous definition. For example, one may define a particular depth test (See later description) to be applied to certain objects to be rendered, for example the depth test may require that the z value be strictly "greater-than" for some objects and "greater-than-or-equal-to" for other objects. These particular depth tests which change from time to time, may be considered to be pipeline state at that time.

Parameters considered to be renderer (pipeline) state in OpenGL® are identified in Section 6.2 of the aforementioned OpenGL® Specification (Version 1.2, at pages 193–217).

Essentially then, there are two types of data or information used by the renderer: (1) primitive data which may be thought of as per-vertex data, and (ii) pipeline state data (or simply pipeline state) which is everything else,. This distinction should be thought of as a guideline rather than as a specific rule, as there are ways of implementing a graphics renderer treating certain information items as either pipeline state or non-pipeline state.

2.3 Per-Fragment Operations

In the generic 3D graphics pipeline, the "z buffered blend" step actually incorporates many smaller "per-fragment" operational steps.

Application Program Interfaces (APIs), such as OpenGL® (Open Graphics Library) and D3D, define a set of per-fragment operations (See Chapter 4 of Version 1.2 OpenGL® Specification). Some exemplary OpenGL® per-fragment operations are briefly reviewed so that any generic similarities and differences between the inventive structure and method and conventional structures and procedures can be more readily appreciated.

Under OpenGL®, a frame buffer stores a set of pixels as a two-dimensional array. Each picture-element or pixel stored in the frame buffer is simply a set of some number of bits. The number of bits per pixel may vary depending on the particular GL implementation or context.

Corresponding bits from each pixel in the frame buffer are grouped together into a bitplane; each bitplane containing a single bit from each pixel. The bitplanes are grouped into several logical buffers referred to as the color, depth, stencil, and accumulation buffers. The color buffer in turn includes what is referred to under OpenGL® as the front left buffer, the front right buffer, the back left buffer, the back right buffer, and some additional auxiliary buffers. The values stored in the front buffers are the values typically displayed on a display monitor while the contents of the back buffers and auxiliary buffers are invisible and not displayed. Stereoscopic contexts display both the front left and the front right buffers, while monoscopic contexts display only the front left buffer. In general, the color buffers must have the same number of bitplanes, but particular implementations of context may not provide right buffers, back buffers, or auxiliary buffers at all, and an implementation or context may additionally provide or not provide stencil, depth, or accumulation buffers.

Under OpenGL®, the color buffers consist of either unsigned integer color indices or R, G, B, and, optionally, a number "A" of unsigned integer values; and the number of bitplanes in each of the color buffers, the depth buffer (if provided), the stencil buffer (if provided), and the accumulation buffer (if provided), is fixed and window dependent. If an accumulation buffer is provided, it should have at least as many bit planes per R, G, and B color component as do the color buffers.

A fragment produced by rasterization with window coordinates of $X_w$, $Y_w$) modifies the pixel in the frame buffer at that location based on a number of tests, parameters, and conditions. Noteworthy among the several tests that are typically performed sequentially beginning with a fragment and its associated data and finishing with, the final output stream to the frame buffer are in the order performed (and with some variation among APIs): 1) pixel ownership test; 2) scissor test; 3) alpha test; 4) Color Test; 5) stencil test; 6) depth test; 7) blending; 8) dithering; and 9) logicop. Note that the OpenGL® does not provide for an explicit "color test" between the alpha test and stencil test. Per-Fragment operations under OpenGL® are applied after all the color computations. Each of these tests or operations is briefly described below.

2.3.1 Ownership Test

Under OpenGL®, the pixel ownership test determines if the pixel at location $(x_w, y_w)$ in the frame buffer is currently owned by the GL context. If it is not, the window system decides the fate of the incoming fragment. Possible results are that the fragment is discarded or that some subset of the subsequent per-fragment operations are applied to the fragment. This pixel ownership test allows the window system to properly control the GL's behavior.

Assumes that in a computer having a display screen, one or several processes are running and that each process has a window on the display screen. For each process, the associated window defines the pixels the process wants to write or render to. When there are two or more windows, the window associated with one process may be in front of the window associated with another process, behind that window, or both windows may be entirely visible. Since there is only a single frame buffer for the entire display screen or desktop, the pixel ownership test involves determining which process and associated window owns each of the pixels. If a particular process does not "own" a pixel, it fails the pixel ownership test relative to the frame buffer and that pixel is thrown away. Note that under the typical paradigm, the pixel ownership test is run by each process, and that for a give pixel location in the frame buffer, that pixel may pass the pixel ownership test for one of the processes, and fail the pixel ownership test for the other process. Furthermore, in general, a particular pixel can pass the ownership test for only one process because only one process can own a particular frame buffer pixel at the same time.

In some rendering schemes the pixel ownership test may not be particularly relevant. For example, if the scene is being rendered to an off-screen buffer, and subsequently Block Transferred or "blitted" to the desktop, pixel ownership is not really even relevant. Each process automatically or necessarily passes the pixel ownership test (if it is executed) because each process effectively owns its own off-screen buffer and nothing is in front of that buffer.

If for a particular process, the pixel is not owned by that process, then there is no need to write a pixel value to that location, and all subsequent processing for that pixel may be ignored. In a typical workstation, all the data associated with a particular pixel on the screen is read during rasterization. All information for any polygon that feeds that pixel is read, including information as to the identity of the process that owns that frame buffer pixel, as well as the Z buffer, the color value, the old color value, the alpha value, stencil bits, and so forth. If a process owns the pixel, then the other downstream process are executed (for example, scissor test, alpha test, and the like) On the other hand, if the process does not own the pixel and fails the ownership test for that pixel, the process need not consider that pixel further and that pixel is skipped for subsequent tests.

2.3.2 Scissor Test

Under OpenGL®, the scissor test determines if $(X_w, Y_w)$ lies within a scissor rectangle defined by four coordinate values; corresponding to a left bottom (left, bottom) coordinate, a width of the rectangle, and a height of the rectangle. The values are set with the procedure "void Scissor(int left, int bottom, sizei width, sizei height)" under OpenGL®. If $left \leq X_w < left+width$ and $bottom \leq Y_w < bottom+height$, then the scissor test passes; otherwise the scissor test fails and the particular fragment being tested is discarded. Various initial states are provided and error conditions monitored and reported.

In simple terms, a rectangle defines a window which may be an on-screen or off-screen window. The window is defined by an x-left, x-right, y-top, and y-bottom coordinate (even though it may be expressed in terms of a point and height and width dimensions from that point). This scissor window is useful in that only pixels from a polygon fragment that fall in that screen aligned scissor window will change. In the event that a polygon straddles the scissor window, only those pixels that are inside the scissor window may change.

When a polygon in an OpenGL® machine comes down the pipeline, the pipeline calculates everything it needs to in order to determine the z value and color of that pixel. Once z value and color are determined, that information is used to determine what information should be placed in the frame buffer (thereby determining what is displayed on the display screen).

Just as with the pixel ownership test, the scissor test provides means for discarding pixels and/or fragments before they actually get to the frame buffer to cause the output to change.

2.3.3 Alpha Test

Color is! defined by four values, red (R), green (G), blue (B), and alpha (A). The RGB values define the contribution from each of the primary colors, and alpha is related to the transparency. Typically, color is a 32-bit value, 8-bits for each component, though such representation is not limited to 32-bits. Alpha test compares the alpha value of a given pixel to an alpha reference value. The type of comparison may also be specified, so that for example the comparison may be a greater-than operation, a less-than operation, and so forth. If the comparison is a greater-than operation, then the pixel's alpha value has to be greater than the reference to pass the alpha test. Any pixel not passing the alpha test is thrown away or discarded. The OpenGL® Specification describes the manner in which alpha test is implemented in OpenGL®.

Alpha test is a per-fragment operation and after all of the fragment coloring calculations and lighting and shading operations are completed. Each of these per-fragment operations may be thought of as part of the conventional z buffer blending operations.

2.3.4 Color Test

Color test is similar to the alpha test described hereinbefore, except that rather than performing the magnitude or logical comparisons between the pixel alpha (A) value and a reference value, the color test performs a magnitude or logical comparison between one or a combination of the R, G, or B color components and reference value(s). The comparison test may be for example, greater-than, less-than, equal-to, greater than-or-equal-to, "greater-than-$c_1$ and less-than $c_2$ where $c_1$ and $c_2$ are sore predetermined reference values, and so forth. One might for example, specify a reference minimum R value, and a reference maximum R value, such that the color test would be passed only if the pixel R value is between that minimum and maximum. Color test might, for example, be useful to provide blue-screen functionality. The comparison test may also be performed on a single color component or on a combination of color components. Furthermore, although for the alpha test one typically has one value for each component, for the color test there are effectively two values per component, a maximum value and a minimum value.

2.3.5 Stencil test

Under OpenGL®, stencil test conditionally discards a fragment based on the outcome of a comparison between a value stored in a stencil buffer at location ($X_w$, $y_w$) and a reference value. Several stencil comparison functions are permitted such that whether the stencil test passes can depend upon whether the reference value is less than, less than or equal to, equal to, greater than or equal to, greater than, or not equal to the masked stored value in the stencil buffer. The Under OpenGL®, if the stencil test fails, the incoming fragment is discarded. The reference value and the comparison value can have multiple bits, typically 8 bits so that 256 different values may be represented. When an object is rendered into the frame buffer, a tag having the stencil bits is also written into the frame buffer. These stencil bits are part of the pipeline state. The type of stencil test to perform can be specified at the time the geometry is rendered.

The stencil bits are used to implement various filtering, masking or stenciling operations. For example, if a particular fragment ends up affecting a particular pixel in the frame buffer, then the stencil bits can be written to the frame buffer along with the pixel information.

2.3.6 Depth Buffer Test

Under OpenGL®, the depth buffer test discards the incoming fragment if a depth comparison fails. The comparison is enabled or disabled with the generic Enable and Disable commands using the OpenGL® symbolic constant DEPTH_TEST. When depth test is disabled, the depth comparison and subsequent possible updates to the depth buffer value are bypassed and a fragment is passed to the next operation. The stencil bits are also involved and are modified even if the test is bypassed. The stencil value is modified if the depth buffer test passed. If depth test is enabled, the depth comparison takes place and the depth buffer and stencil value may subsequently be modified. The manner in which the depth test is implemented in OpenGL® is described in greater detail in the OpenGL® specification at page 145.

Depth comparisons are implemented in which possible outcomes are as follows: the depth buffer test either never passes or always passes, if the incoming fragment's $z_w$ value is less than, less than or equal to, equal to, greater than, greater than or equal to, or not equal to the depth value stored at the location given by the incoming fragment's ($X_w$, $Y_w$) coordinates. If the depth buffer test fails, the incoming fragment is discarded. The stencil value at the fragment's ($X_w$, $Y_w$) coordinate is updated according to the function currently in effect for depth buffer test failure. Otherwise, the fragment continues to the next operation and the value of the depth buffer at the fragment's ($X_w$, $Y_w$) location is set to the fragment's $z_w$ value. In this case the stencil value is updated according to the function currently in effect for depth buffer test success. The necessary OpenGL® state is an eight-valued integer and a single bit indicating whether depth buffering is enabled or disabled.

2.3.7 Alpha Blending

Under OpenGL®, alpha blending (also referred to as blending) combines the incoming fragments R, G. B, and A values with the R, G. B, and A values stored in the frame buffer at the incoming fragment's ($X_w$, $Y_w$) location.

This blending is typically dependent on the incoming fragment's alpha value (A) and that of the corresponding frame buffer stored pixel. In the following discussion, Cs refers to the source color for an incoming fragment, Cd refers to the destination color at the corresponding frame buffer location, and Cc refers to a constant color in-the GL state. Individual RGBA components of these colors are denoted by subscripts of s, d, and c respectively.

Blending is basically an operation that takes color in the frame buffer and the color in the fragment, and blends them together. The manner in which blending is achieved, that is the particular blending function, may be selected from various alternatives for both the source and destination.

Blending is described in the OpenGL® specification at page 146–149 and is hereby incorporated by reference. Various blend equations are available under OpenGL®. For example, an additive type blend is available wherein a blend result (C) is obtained by adding the product of a source color (Cs) by a source weighting factor,quadruplet (S) to the product of a destination color (Cd) and a destination weighting factor (D) quadruplet, that is $C=C_sS+C_dD$. Alternatively, the blend equation may be a subtraction ($C=C_sS-C_dD$), a reverse subtraction ($C=C_sS+C_dD$), a minimum function ($C=\min(C_s, C_d)$), a maximum function ($C=\max(C_s, C_d)$),. Under OpenGL®, the blending equation is evaluated separately for each color component and its corresponding weighting coefficient. Each of the four R, G, B, A components has its own weighting factor.

The blending test (or blending equation) is part of pipeline state and can potentially change for every polygon, but more typically would change only for the object made up or several polygons.

In generally, blending is only performed once other tests such as the pixel ownership test and stencil test have been passed so that it is clear that the pixel or fragment under consideration would or could have an effect in the output.

2.3.8 Dithering Under OpenGL®, dithering selects between two color values or indices. In RGBA mode, consider the value of any of, the color components as a fixed-point value with m bits to the left of the binary point, where m is the number of bits allocated to that component in the frame buffer; call each such value c. For each c, dithering selects a value c1 such that $c1\epsilon\{\max\{0, [c]-1, [c]\}$. This selection may depend on the $X_w$ and $Y_w$ coordinates of the pixel. In color index mode, the same rule applies with c being a single color index. The value of c must not be larger than the maximum value representable in the frame buffer for either the component or the index.

Although many dithering algorithms are possible, a dithered value produced by any algorithm must generally depend only the incoming value and the fragment's x and y window coordinates. When dithering is disabled, each color component is truncated to a fixed-point value with as many bits as there are in the corresponding frame buffer component, and the color index is rounded to the nearest integer representable in the color index portion of the frame buffer.

The OpenGL® Specification of dithering is described more fully in the OpenGL® specification, particularly at pages 149–150, which are incorporated by reference.

2.3.9 Logicop

Under OpenGL®, there is a final logical operation applied between the incoming fragment's color or index values and the color or index values stored in the frame buffer at the corresponding location. The result of the logical operation replaces the values in the frame buffer at the fragment's (x, y) coordinates. Various logical operations may be implemented between source (s) and destination (d), including for example: clear, set, and, noop, xor, or, nor, nand, invert, copy, inverted and, equivalence, reverse or, reverse and, inverted copy, and inverted or. The logicop arguments and corresponding operations, as well as additional details of the OpenGL® logicop implementation, are set forth in the OpenGL® specification at pates 150–151. Logical operations are performed independently for each color index buffer that is selected for writing, or for each red, green, blue, and alpha value of each color buffer that is selected for writing. The required state is an integer indicating the logical operation, and two bits indicating whether the logical operation is enabled or disabled.

2.4 Antialiasing

In this document, pixels are referred to as the smallest individually controllable element of the display device. But, because images are quantized into discrete pixels, spatial aliasing occurs. A typical aliasing artifact is a staircase" effect caused when a straight line or edge cuts diagonally across rows of pixels.

Some rendering systems reduce aliasing effects by dividing pixels into sub-pixels, where each sub-pixel can be colored independently. When the image is to be displayed, the colors for all sub-pixels within each pixel are blended together to form an average color for the pixel. A renderer that uses up to 16 sub-pixels per pixel is described in "RealityEngine Graphics", by Akeley, pages 109 to 116 of SIGGRAPH93 Proceedings, Aug. 1–6, 1993, Computer Graphics Proceedings, Annual Conference Series, published by ACM SIGGRAPH, New York, 1993, Softcover ISBN 0-201-58889-7 and CD-ROM ISBN 0-201-56997-3 (hereinafter referred to as the Akeley Reference).

Another prior art antialiasing method is the A-Buffer used to perform blending (this technique is also included in the Akeley Reference), and is described in "The A-buffer, an Antialiased Hidden Surface Method" by L. Carpenter, SIGGRAPH 1984 Conference Proceedings, pp.103–108 (hereinafter referred to as the Carpenter Reference). The A-buffer is an antialiasing technique that reduces aliasing by keeping track of the percent coverage of a pixel by a rendered polygon. The main drawback to this technique is the need to sort polygons front-to-back (or back-to-front) at each pixel in order to get acceptable antialiased polygons.

2.5 Content Addressable Memories

Most Content Addressable Memories (CAM) perform a bit-for-bit equality test between an input vector and each of the data words stored in the CAM. This type of CAM frequently provides masking of bit positions in order to eliminate the corresponding bit in all words from affecting the equality test. It is inefficient to perform magnitude comparisons in a equality-testing CAM because a large number of clock cycles is required to do the task. CAMs are presently used in translation look-aside buffers within a virtual memory systems in some computers. CAMs are also used to match addresses in high speed computer networks.

Magnitude comparison CAM (MCCAM) is defined here as any content addressible memory where the stored data are treated as numbers, and arithmetic magnitude comparisons (i.e. less-than, greater-than, less-than-or-equal-to, and the like) are performed on the data in parallel. This is in contrast to ordinary CAM which treats stored data strictly as bit vectors, not as numbers. One exemplary magnitude comparison content addressable memory is described in, and incorporated herein by reference, is U.S. Pat. No. 4,996,666, by Jerome F. Duluk Jr., entitled "Content-Addressable Memory System Capable of Fully Parallel Magnitude Comparisons", granted Feb. 26, 1991 (hereinafter referred to as the Duluk Patent). Structures within the Duluk Patent specifically referenced shall include the prefix "Duluk Patent" (for example, "Duluk Patent MCCAM Bit Circuit"). Other types of magnitude comparison content addressable memories may also be used. The "MCCAM" abbreviation is conveniently used in this description to refer to various types;, structures, and methods for magnitude comparison content addressable memory and is not limited to the particular magnitude comparison content addressable memory described in U.S. Pat. No. 4,996,666.

The basic internal structure of an MCCAM is a set of memory bits organized into words, where each word can perform one or more arithmetic magnitude comparisons between the stored data and input data. In general, for an MCCAM, when a vector of numbers is applied in parallel to an array of words, all arithmetic comparisons in all words occur in parallel. Such a parallel search comparison operation is called a "query" of the stored data.

The intention described here augments the capability of the MCCAM by adding various features, 38 including the ability to output all the query result bits every clock cycle and to logically "or" together these output query result bits to form additional outputs.

SUMMARY OF THE INVENTION

The inventive apparatus and method provide conservative hidden surface removal (CHSR) in a deferred shading graphics pipeline (DSGP). The pipeline renders primitives, and the invention is described relative to a set of renderable primitives that include: 1) triangles, 2) lines, and 3) points. Polygons with more than three vertices are divided into triangles in the Geometry block (described hereinafter), but the DSGP pipeline could be easily modified to render quadrilaterals or polygons with more sides. Therefore, since the pipeline can render any polygon once it is broken up into triangles, the inventive renderer effectively renders any polygon primitive. The invention advantageously takes into account whether and in what part of the display screen a given primitive may appear or have an effect. To identify what part of a 3D window on the display screen a given primitive may affect, the pipeline divides the 3D window being drawn into a series of smaller regions, called tiles and stamps. The pipeline performs deferred shading, in which pixel colors are not determined until after hidden-surface removal. The use of a Magnitude Comparison Content Addressable Memory (MCCAM) advantageously allows the pipeline to perform hidden geometry culling efficiently.

Implementation of the inventive Conservative Hidden Surface Removal procedure, advantageously maintains compatibility with other standard APIs, such as OpenGL®, including their support of dynamic rule changes for the primitives (e.g. changing the depth test or stencil test during a scene). In embodiments of the inventive deferred shader, the conventional rendering paradigm, wherein non-deferred shaders typically execute a sequence of rules for every geometry item and then check the final rendered result, is broken. The inventive structure and method anticipate or predict what geometry will actually affect the final values in the frame buffer without having to make or generate all the colors for every pixel inside of every piece of geometry. In principle, the spatial position of the geometry is examined, and a determination is made for any particular sample, the one geometry item that affects the final color in the z buffer, and then generates only at color.

In one embodiment, the CHSR processes each primitive in time order and, for each sample that a primitive touche s, CHSR makes conservative decision based on the various Application Program Interface (API) state variables, such as depth test and alpha test. One of the advantageous features of the CHSR process is that color computation does not need to be done during hidden surface removal even though non-depth-dependent tests from the API, such as alpha test, color test, and stencil test can be performed by the DSGP pipeline. The CHSR process can be considered a finite state machine (FSM) per sample.

Hereinafter, each per-sample FSM is called a sample finite state machine. Each sample FSM maintains per-sample data including: (1) z coordinate information; (2) primitive information (any information needed to generate the primitive's color at that sample or pixel, or a pointer to such information); and (3) one or more sample state bits (for example, these bits could designate the z value or z values to be accurate or conservative). While multiple z values per sample can be easily used, multiple sets of primitive information per sample would be expensive. Hereinafter, it is assumed that the sample FSM maintains primitive information for one primitive. Each sample FSM may also maintain transparency information, which is used for sorted transparencies.

The DSGP can operate in two distinct modes: 1) time order mode, and 2) sorted transparency mode. Time order mode is designed to preserve, within any particular tile, the same temporal sequence of primitives. In time order mode, time order of vertices and modes are preserved within each tile, where a tile is a portion of the display window bounded horizontally and vertically. By time order preserved, we mean that for a given tile, vertices and modes are read in the same order as they are written. In sorted transparency mode; the process of reading geometry from a tile is divided into multiple passes. In the first pass, the opaque geometry(i.e., geometry that can completely hide more distant geometry) is processed, and in subsequent passes, potentially transparent geometry is processed. Within each sorted transparency mode pass, the time ordering is preserved, and mode data is inserted in its correct time-order location. Sorted transparency mode can spatially sort (on a sample-by-sample basis) the geometry into either back-to-front or front-to-back order, thereby providing a mechanism for the visible transparent objects to be blended in spatial order (rather than time order), resulting in a more correct rendering. In a preferred embodiment, the sorted transparency method is performed jointly by the Sort block and the Cull block.

The inventive structure and method may be implemented in various embodiments. In one aspect, the invention provides structure and method for performing hidden surface removal wherein the structure is advantageously implemented as a computer graphics pipeline and wherein the inventive hidden surface removal method includes the following steps or procedures. First, an object primitive (current primitive) is selected from a group of primitives, each primitive comprising a plurality of stamps. Next, stamps in the current primitive are compared to stamps from previously evaluated primitives in the group of primitives, and a first stamp is selected from the current primitive by the stamp selection process as a current stamp (CS), and optionally by the SAM for performance reasons. CS is compared to a second stamp or a CPVS selected from previously evaluated stamps that have not been discarded. The second stamp is discarded when no part of the second stamp would affect a final graphics display image based on the comparison with the CS. If part, but not all, of the second stamp would not affect the final image based on the comparison with the CS, then the part of second stamp that would not affect the final image is deleted from the second stamp. The CS is discarded when no part of the second stamp would affect a final graphics display image based on the comparison with the second stamp. If part, but not all, of the CS would not affect the final image based on the comparison with the second stamp, then the part of CS that would not affect the final image is deleted from the CS. When all stamps in all primitives within a region of the display screen have been evaluated, the stamps that have not been discarded have their pixels, or samples, colored by the part of the pipeline downstream from these first steps in performing hidden surface removal. In one embodiment, the set of non-discarded stamps can be limited to one stamp per sample. In this embodiment, when the second stamp and the CS include the same sample and both can not be discarded, the second stamp is dispatched and the CS is kept in the list of non-discarded stamps. Also for this alternate embodiment, when the visibility of the second stamp and the CS depends on parameters evaluated later in the computer graphics pipeline, the second stamp and the CS are dispatched. As an alternate embodiment, the selection of the first stamp by for example the SAM and the stamp selection process, as a current stamp (CS) is based on a relationship test of depth states of samples in the first stamp with depth states of samples of previously evaluated stamps; and an aspect of the inventive apparatus simultaneously performs the relationship test on a multiplicity of stamps.

In another aspect of the inventive structure and method for performing hidden surface removal, a set of currently, potentially visible stamps (CPVSs) is maintained separately from the set of current depth values (CDVs), wherein the inventive hidden surface removal method includes the following steps or procedures. First, an object primitive (current primitive) is selected from a group of primitives, each primitive comprising a plurality of stamps. Next, a first stamp from the current primitive is selected as a currently stamp (CS). Next, a currently potentially visible stamp (CPVS) is selected from the set of CPVSs such that the CPVS overlaps the CS. For each sample that is overlapped by both the selected CPVS and the CS, the depth value of the CS is compared to the corresponding value in the set of CDVs, and this comparison operation takes into account the pipeline state and updates the CDVs. Samples in the selected CPVS that are determined to be not visible are deleted for the selected CPVS. If all samples in the selected CPVS are deleted, the selected CPVS is deleted from the set of CPVS's. If any sample in the CS is determined to be visible, the CS is added to the set of the CPVS's with only its visible samples included. If for any sample both the CS and selected CPVS are visible, then at least those visible samples in the selected CPVS are sent down the pipeline for color computations. If the visibility of a sample included in both the CS and CPVS depend on parameters evaluate later in the computer graphics pipeline, at least those samples are sent down the pipeline for color computations. The invention provides structure and method for processing in parallel all CPVS's that overlap the CS. Furthermore, the parallel processing is pipelined such that a CS can be processed at the rate of one CS per clock cycle. Also multiple CS's can be processed in parallel.

In another aspect, the invention provides structure and method for a hidden surface removal system for a deferred shader computer graphics pipeline, wherein the pipeline includes a Magnitude Comparison Content Addressable Memory (MCCAM) Cull unit for identifying a first group of potentially visible samples associated with a; current primitive; a Stamp Selection unit, coupled to the MCCAM cull unit, for identifying, based on the first group and a perimeter of the primitive, a second group of potentially visible samples associated with the primitive; a Z-Cull unit, coupled to the stamp selection unit and the MCCAM cull unit, for identifying visible stamp portions by evaluating a pipeline state, and comparing depth states of the second group with stored depth state values; and a Stamp Portion Memory unit, coupled to the Z-Cull unit, for storing visible stamp portions based on control signals received from the Z-Cull unit, wherein the Stamp Portion Memory unit dispatches stamps having a visibility dependent on parameters evaluated later in the computer graphics pipeline.

In yet another aspect, the invention provides structure and method of rendering a graphics image including the steps of: receiving a plurality of primitives to be rendered; selecting a sample location;

rendering a front most opaque sample at the selected sample location, and defining the z value of the front most opaque sample as Zfar; comparing z values of a first plurality of samples at the selected sample location; defining to be Znear a first sample, at the selected sample location, having a z value which is less than Zfar and which is nearest to Zfar of the first plurality of samples; rendering the first sample; setting Zfar to the value of Znear; comparing z values of a second plurality of samples at the selected sample location;

defining as Znear the z value of a second sample at the selected sample location, having a z value which is less than Zfar and which is nearest to Zfar of the second plurality of samples; and rendering the second sample.

BRIEF DESCRIPTION OF THE DRAWINGS

Additional objects and features of the invention will be more readily apparent from the following detailed description and appended claims when taken in conjunction with the drawings, in which:

FIG. 15 illustrates a Setup Output Primitive Packet according to one embodiment of the present invention.

FIG. 16 illustrates a flow chart of a conservative hidden surface removal method according to one embodiment of the present invention.

FIG. 17A illustrates a sample tile including a primitive and a bounding box.

FIG. 17B shows the largest z values (ZMax) for each stamp in the tile.

FIG. 17C shows the results of the z value comparisons between the ZMin for the primitive and the ZMaxes for every stamp.

FIGS. 23A–23D illustrate an example of early dispatch.

FIG. 29 illustrates a flow chart of a sorted transparency mode CHSR method according to one embodiment of the present invention.

4 DETAILED DESCRIPTION OF EMBODIMENTS OF THE INVENTION

Figure 1:
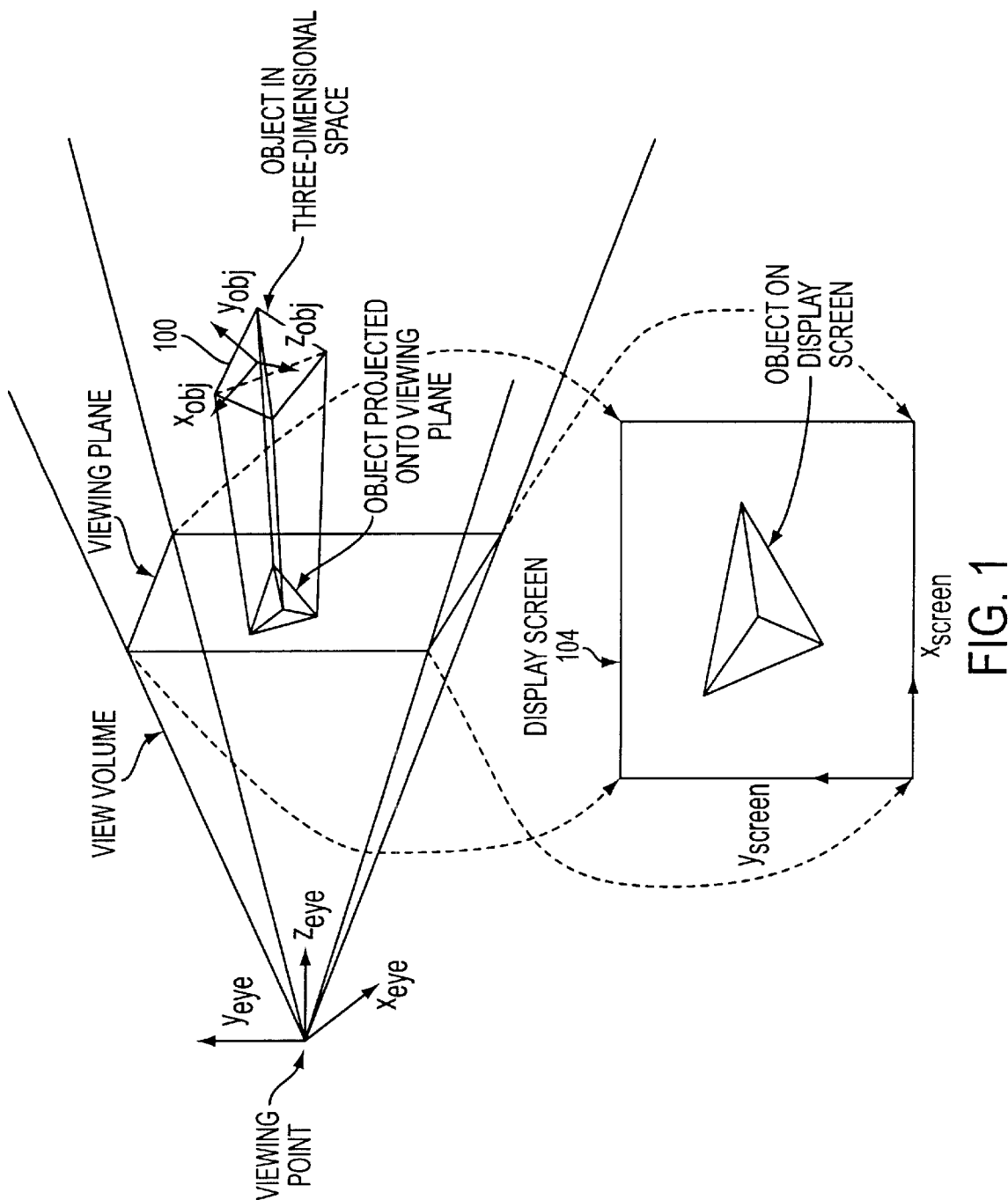
FIG. 1 is a diagrammatic illustration showing a tetrahedron, with its own coordinate axes, a viewing point's coordinate system, and screen coordinates

The invention is directed to a system for performing Conservative Hidden Surface Removal (CHSR) Deferred Shading Graphics Processor (DSGP) graphics processor. This present invention includes numerous embodiments of the DSGP pipeline. The DSGP pipeline can be connected to a computer via a variety of possible interfaces, including but not limited to for example, an Advanced Graphics Port (AGP) and/or a PCI bus interface, amongst the possible interface choices. VGA and video output are generally also included. Embodiments of the invention supports both OpenGL® and Direct3D APIs. The OpenGL® specification, entitled "The OpenGL® Graphics System: A Specification (Version 1.2)" by Mark Segal and Kurt Akeley, edited by Jon Leech, is included incorporated by reference.

We first describe features that may be implemented in one or more embodiments of the CHSR and then describe several exemplary embodiments or versions of a Deferred Shading Graphics Pipeline.

4.0.1 CHSR and Greater-than Depth Test

Implementation of the Conservative Hidden Surface Removal procedure, advantageously maintains compatibility with other standard APIs, such as OpenGL®. One complication of many APIs is their ability to change the depth test. Typically 3D rendering assumes visible objects are closer than obscured objects (i.e., at lesser z values), and this is accomplished by selecting a "less-than" depth test (i.e., an object is visible if its z value is "less-than" other geometry). However, most APIs support other depth tests, which may change within a frame, such as: greater-than, less-than, greater-than-or-equal-to, equal, less-than-or-equal-to, less-than, not-equal, and the like algebraic, magnitude, and logical relationships. This essentially dynamically "changes the rules" for what is visible, and as a result, the time order of primitives with different rendering rules must be taken into account.

In the inventive conservative hidden surface removal system, different or additional procedures are advantageously implemented, to maintain compatibility with other standard APIs when a "greater-than" depth test is used. Analogous changes may advantageously be employed if the depth test is greater-than-or-equal-to, or another functional relationship that would otherwise result in the anomalies described.

Further observe that conventional non-deferred shaders execute a sequence of rules for every geometry item and then check the final rendered result. By comparison, in embodiments of the inventive deferred shader, that conventional paradigm is broken. The inventive structure and method anticipate or predict what geometry will actually affect the final values in the frame buffer without having to make or generate all the colors for every pixel inside of every piece of geometry. In principle, the spatial position of the geometry is examined, and a determination is made for any particular sample, the one geometry item that affects the final color in the z buffer, and then generate only that color.

4.0.2 Additional Considerations for the CHSR Process

Samples are processed in parallel, and generally all the samples in all the pixels within a stamp are processed in parallel. Hence, if one stamp can be processed per clock cycle (and there are 4 pixels per stamp and 4 samples per pixel), then 16 samples are processed per clock cycle. A "stamp" defines the number of pixels and samples processed at one time. This per-stamp processing is generally pipelined, with pipeline stalls injected if a stamp needs to be processed again before the same stamp (from a previous primitive) has completed (that is, unless out-of-order stamp processing can be handled).

If no early dispatches are needed, then only end-of-tile dispatches are needed. This is the case when all the geometry in a tile is opaque and there are no stencil tests or operations and there are no alpha tested primitives that could be visible.

The primitive information in each sample FSM can be replaced by a pointer into a memory where all the primitive information is stored. As described in later in a preferred embodiment, the Color Pointer is used to point to a primitive's information in Polygon Memory.

As an alternative, only the far z value could be kept (the near z value is not kept), thereby reducing data storage, but requiring the sample state bits to remain "conservative" after primitive F and also causing primitive E to be sent down the pipeline because it would not be known whether primitive E is in front or behind primitive F.

As an alterative to maintaining both a near z value and a far z value, only the far z value could be kept, thereby reducing data storage, but requiring the sample state bits to remain "conservative" when they could have been labeled "accurate", and also causing additional samples to be sent down the pipeline. In the first CHSR example above (the one including alpha test), the sample state bits would remain "conservative" after primitive F, and also, primitive E would be sent down the pipeline because it would not be known whether primitive E is in front or behind primitive F due to the lack of the near z value.

Processing samples in groups by stamp improves efficiency by allowing sample FSMs to operate in parallel on a stamp-by-stamp basis. Stamps are also used to reduce the number of data packets transmitted down the pipeline. That is, when one sample within a stamp is dispatched (either early dispatch or end-of-tile dispatch), other samples within the same stamp and the same primitive are also dispatched (such a joint dispatch is hereinafter called a Visible Stamp Portion, or VSP). In the second CHSR example above (the one including stencil test), if all four samples were in the same stamp, then the early dispatching of samples 1 and 2 would cause early dispatching of samples 0 and 3. While this causes more samples to be sent down the pipeline, it generally causes a net decrease in the amount of color computation. This is due to the spatial coherence within a pixel (i.e., samples within the same pixel tend to be either visible together or hidden together) and a tendency for the edges of polygons with alpha test, color test, stencil test, and/or alpha blending to potentially split otherwise spatially coherent stamps. That is, sending additional samples down the pipeline when they do not appreciably increase the computational load is more than offset by reducing the total number of VSPs that need to be sent. In the second CHSR example above, if all the samples are in the same stamp, then the same number of VSPs would be generated.

In the case of alpha test, if alpha values for a primitive arise only from the alpha values at the vertices (not from other places such as texturing), then a simplified alpha test can be done for entire primitives. That is, the vertex processing block (which is the Geometry block in a preferred embodiment) can determine when any interpolation of the vertex alpha values would be guaranteed to pass the alpha test, and for that primitive, disable the alpha test. This cannot be done if the alpha values cannot be determined before CHSR is performed. If a frame does not start with depth clear, then the sample FSMs are set to their most conservative state (with near z values at the minimum and far z values at the maximum).

4.0.3 Two Modes of DSGP Operation

The DSGP can operate in two distinct modes: 1) time order mode, and 2) sorted transparency mode. Time order mode is described above, and is designed to preserve, within any particular tile, the same temporal sequence of primitives. The Sorted Transparency mode is described immediately below. In a preferred embodiment, the control of the pipeline operating mode is done in the Sort block 6000.

Sort block 6000 is located in the pipeline between a Mode Extraction block (MEX) 4000 and Setup (STP) block 8000. Sort block operates primarily to take geometry scattered around the display window and sort it into tiles. Sort block also manages the Sort Memory, which stores all the geometry from the entire scene before it is rasterized, along with some mode information. Sort memory comprises a double-buffered list of vertices and modes. One page collects a scene's geometry (vertex by vertex and mode by mode), while the other page is sending its geometry (primitive by primitive and mode by mode) down the rest of the pipeline.

When a page in sort memory is being written, vertices and modes are written sequentially into the sort memory as they are received by the sort block. When a page is read from sort memory, the read is done on a tile-by-tile basis, and the read process operates in two modes: (1) time order mode, and (2) sorted transparency mode.

4.0.4 Time Order Mode

In time order mode, time order of vertices and modes are preserved within each tile, where a tile is a portion of the display window bounded horizontally and vertically. By time order preserved, we mean that for a given tile, vertices and modes are read in the same order as they are written.

4.0.5 Sorted Transparency Mode

In sorted transparency mode, the process of reading geometry from a tile is divided into multiple passes. In the first pass, the Sort block outputs guaranteed opaque geometry, and in subsequent passes the Sort block outputs potentially transparent geometry. Within each sorted transparency mode pass, the time ordering is preserved, and mode data is inserted in its correct time-order location. Sorted transparency mode can be performed in either back-to-front or front-to-back order. In a preferred embodiment, the sorted transparency method is performed jointly by the Sort block and the Cull block.

4.0.6 Multiple-step Hidden Surface Removal

Conventionally hidden surfaces are removed using either an "exact" hidden surface removal procedure, or using z buffers. In one embodiment of the inventive structure and method, a two-step approach is implemented wherein a (i) "conservative" hidden surface removal is followed by (ii) a Z buffer based procedure. In a different embodiment, a three-step approach is implemented: (i) a particular spatial Cull procedure, (ii) conservative hidden surface removal, and (iii) z buffer.

4.1 Versions of the Deferred Shading Graphics Pipeline

Several versions or embodiments of the Deferred Shading Graphics Pipeline are described here, and embodiments having various combinations of features may also be implemented. Furthermore, features of the invention may be implemented independently of other features. Most of the important features described above can be applied to all versions of the DSGP pipeline.

4.1.1 Tiles, Stamps, Samples, and Fragments

Each frame (also called a scene or user frame) of 3D graphics primitives is rendered into a 3D window on the display screen. A window consists of a rectangular grid of pixels, and the window is divided into tiles (hereinafter tiles are assumed to be 16×16 pixels, but could be any size). If tiles are not used, then the window is considered to be one tile. Each tile is further divided into stamps (hereinafter stamps are assumed to be 2×2 pixels, thereby resulting in 64 stamps per file, but stamps could be any size within a tile). Each pixel includes one or more of samples, where each sample has its own color values and z value (hereinafter, pixels are assumed to include four samples, but any number could be used). A fragment is the collection of samples covered by a primitive within a particular pixel. The term "fragment" is also used to describe the collection of visible samples within a particular primitive and a particular pixel.

4.1.2 Deferred Shading

In conventional Z buffer rendering, the renderer calculates the color value (RGB or RGBA) and z value for each pixel, of each primitive, then compares the z value of the new pixel with the current z value in the Z-buffer. If the z value comparison indicates the new pixel is "in front of" the existing pixel in the frame buffer, the new pixel overwrites the old one; otherwise, the new pixel is thrown away.

Z buffer rendering typically results in a great deal of wasted processing effort if the scene contains many hidden surfaces. In complex scenes, the renderer may calculate color values for ten or twenty times as many pixels as are visible in the final picture. This means the computational cost of any per-pixel operation—such as Phong shading or texture-mapping—is multiplied by ten or twenty. Therefore an improved method of rendering that reduces Z buffer rendering inefficiency is needed.

In a pipeline that performs deferred shading, hidden surface removal (HSR) is completed before any pixel coloring is done. The objective of a deferred shading pipeline is to generate pixel colors for only those primitives that appear in the final image (i.e., exact HSR). Eliminating samples before the resource intensive coloring process is performed on the samples improves the efficiency of the rendering process. In deferred shading the primitives should generally be accumulated before HSR begins. For a frame with only opaque primitives, the HSR process determines the single visible primitive at each sample within all the pixels. Once the visible primitive is determined for a sample, then the primitive's color at that sample location is determined. Additional efficiency can be achieved by determining a single per-pixel color for all the samples within the same pixel, rather than computing per-sample colors.

For a frame with at least some alpha blending of primitives (generally due to transparency), there are some samples that are colored by two or more primitives. This means the HSR process must determine a set of visible primitives per sample. Alpha blending is described in greater detail in the aforementioned OpenGL® specification.

In some APIs, such as OpenGL®, the HSR process can be complicated by other operations (that is by operations other than depth test) that can discard primitives. These other operations include: pixel ownership test, scissor test, alpha test, color test, and stencil test (as described elsewhere in this specification). Some of these operations discard a primitive based on its color (such as alpha test), which is not determined in a deferred shading pipeline until after the HSR process (this is because alpha values are often generated by the texturing process, included in pixel fragment coloring). For example, a primitive that would normally obscure a more distant primitive (generally at a greater z value) can be discarded by alpha test, thereby,causing it to not obscure the more distant primitive. A HSR process that does not take alpha test into account could mistakenly discard the more distant primitive. Hence, there may be an inconsistency between deferred shading and alpha test (similarly, with color test and stencil test); that is, pixel coloring is postponed until after hidden surface removal, but hidden surface removal can depend on pixel colors. Simple solutions to this problem include: 1) eliminating non-depth-dependent tests from the API, such as alpha test, color test, and stencil test, but this potential solution might prevent existing programs from executing properly on the deferred shading pipeline; and 2) having the HSR process do some color generation, only when needed, but this potential solution would complicate the data flow considerably. Therefore, neither of these choices is attractive. A third alternative, called conservative hidden surface removal (CHSR), is one of the important innovations provided by the inventive structure and method.

Another complication in many APIs is their ability to change the depth test. The standard way of thinking about 3D rendering assumes visible objects are closer than obscured objects (i.e., at lesser z values), and this is accomplished by selecting a "less-than" depth test (i.e., an object is visible if its z value is "less-than" other geometry). However, most APIs support other depth tests such as: greater-than, less-than, greater-than-or-equal-to, equal, less-than-or-equal-to, less-than, not-equal, and the like algebraic, magnitude, and logical relationships. This essentially "changes the rules" for what is visible. This complication is compounded by an API allowing the application program to change the depth test within a frame. Different geometry may be subject to drastically different rules for visibility. Hence, a deferred shading pipeline must preserve the time ordering of primitives, and the correct pipeline state (for example, the depth test) must be associated with each primitive.

4.1.3 Deferred Shading Graphics Pipeline, First Embodiment (Version 1)

Figure 2:
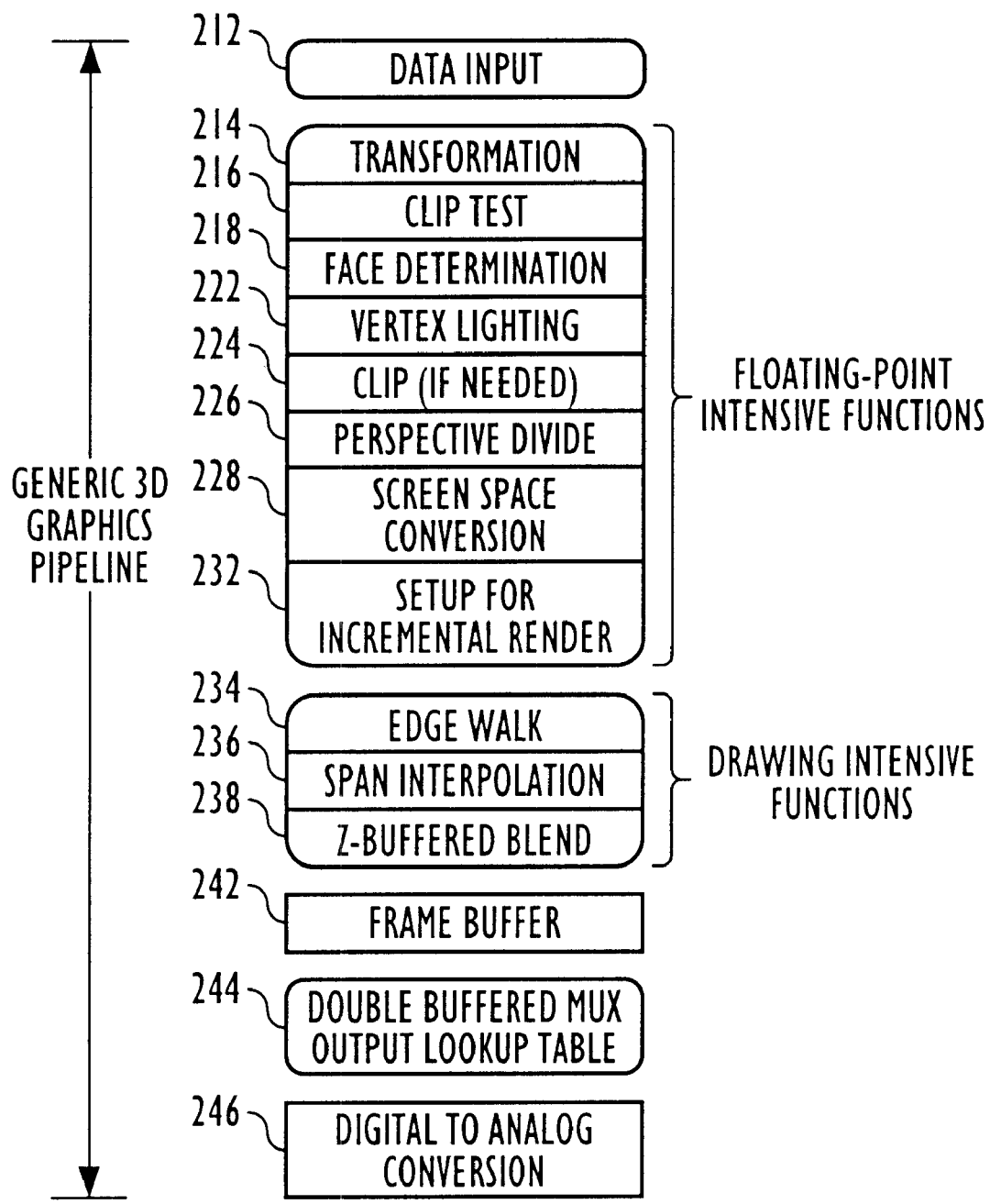
FIG. 2 is a diagrammatic illustration showing a conventional generic renderer for a 3D graphics pipeline.
Figure 3:
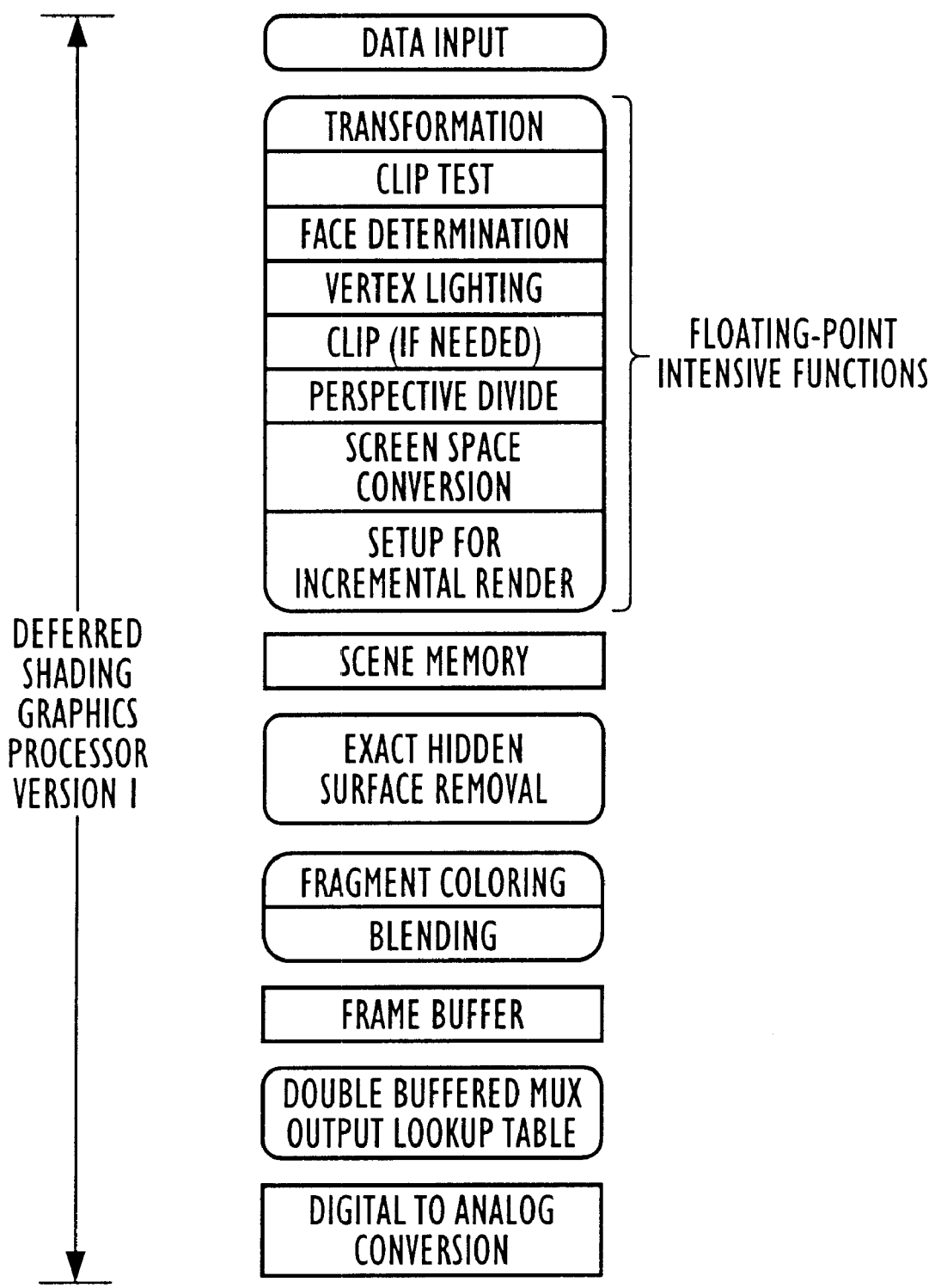
FIG. 3 is a diagrammatic illustration showing a first embodiment of the inventive 3-Dimensional Deferred Shading Graphics Pipeline.

A conventional 3D graphics pipeline is illustrated in FIG. 2. The following describes a first embodiment of the inventive 3D Deferred Shading Graphics Pipeline Version 1 (hereinafter "DSGPv1"), as shown in FIG. 3. It will be observed that the inventive pipeline (FIG. 3) has been obtained from the generic conventional; pipeline (FIG. 2) by replacing the drawing intensive functions 231 with: (1) a scene memory 250 for storing the pipeline state and primitive data describing each primitive, called scene memory in the figure; (2) an exact hidden surface removal process 251; (3) a fragment coloring process 252; and (4) a blending process 253.

The scene memory 250 stores the primitive data for a frame, along with their attributes, and also stores the various settings of pipeline state throughout the frame. Primitive data includes vertex coordinates, texture coordinates, vertex colors, vertex normals, and the like In DSGPv1, primitive data also includes the data generated by the setup for incremental render, which includes spatial, color, and edge derivatives.

When all the primitives in a frame have been processed by the floating-point intensive functions 213 and stored into the scene memory 250, then the HSR process commences. The scene memory 250 can be double buffered, thereby allowing the HSR process to perform computations on one frame while the floating-point intensive functions perform computations on the next frame. The scene memory can also be triple buffered. The scene memory could also be a scratchpad for the HSR process, storing intermediate results for the HSR process, allowing the HSR process to start before all primitive have been stored into the scene memory.

In the scene memory, every primitive is associated with the pipeline state information that was valid when the primitive was input to the pipeline. The simplest way to associate the pipeline state with each primitive is to include the entire pipeline state within each primitive. However, this would introduce a very large amount of redundant information because much of the pipeline state does not change between most primitives (especially when the primitives are in the same object). The preferred way to store information in the scene memory is to keep separate lists: one list for pipeline state settings and one list for primitives. Furthermore, the pipeline state information can be split into a multiplicity of sub-lists, and additions to each sub-list occurs only when part of the sub-list changes. The preferred way to store primitives is done by storing a series of vertices, along with the connectivity information to recreate the primitives. This preferred way of storing primitives eliminates redundant vertices that would otherwise occur in polygon meshes and line strips.

The HSR process described relative to DSGPv1 is required to be an exact hidden surface removal (EHSR)

because it is the only place in the DSGPv1 where hidden surface removal is done. The exact hidden surface removal (EHSR) process 251 determines precisely which primitives affect the final color of the pixels in the frame buffer. This process accounts for changes in the pipeline state, which introduces various complexities into the process. Most of these complications stem from the per-fragment operations (ownership test, scissor test, alpha test, and the like), as described above. These complications are solved by the innovative conservative hidden surface removal (CHSR) process, described later, so that exact hidden surface removal is not required.

The fragment coloring process generates colors for each sample or group of samples within a pixel. This can include: Gouraud shading, texture mapping, Phong shading, and various other techniques for generating pixel colors. This process is different from edge walk 232 and span interpolation 234 because this process must be able to efficiently generate colors for subsections of primitives. That is, a primitive may be partially visible, and therefore, colors need to be generated for only some of its pixels, and edge walk and span interpolation assume the entire primitive must be colored. Furthermore, the HSR process may generate a multiplicity of visible subsections of a primitive, and these may be interspersed in time amongst visible subsections of other primitives. Hence, the fragment coloring process 252 should be capable of generating color values at random locations within a primitive without needing to do incremental computations along primitive edges or along the x-axis or y-axis.

The blending process 253 of the inventive pipeline combines the fragment colors together to generate a single color per pixel. In contrast to the conventional z buffered blend process 236, this blending process 253 does not include Z buffer operations because the exact hidden surface removal process 251 as already determined which primitives are visible at each sample. The blending process 253 may keep separate color values for each sample, or sample colors may be blended together to make a single color for the entire pixel. If separate color values are kept per sample and are stored separately into the Frame buffer 240, then final pixel colors are generated from sample colors during the scan out process as data is sent to the digital to analog converter 242.

4.1.4 Deferred Shading Graphics Pipeline, Second Embodiment (Version 2)

Figure 4:
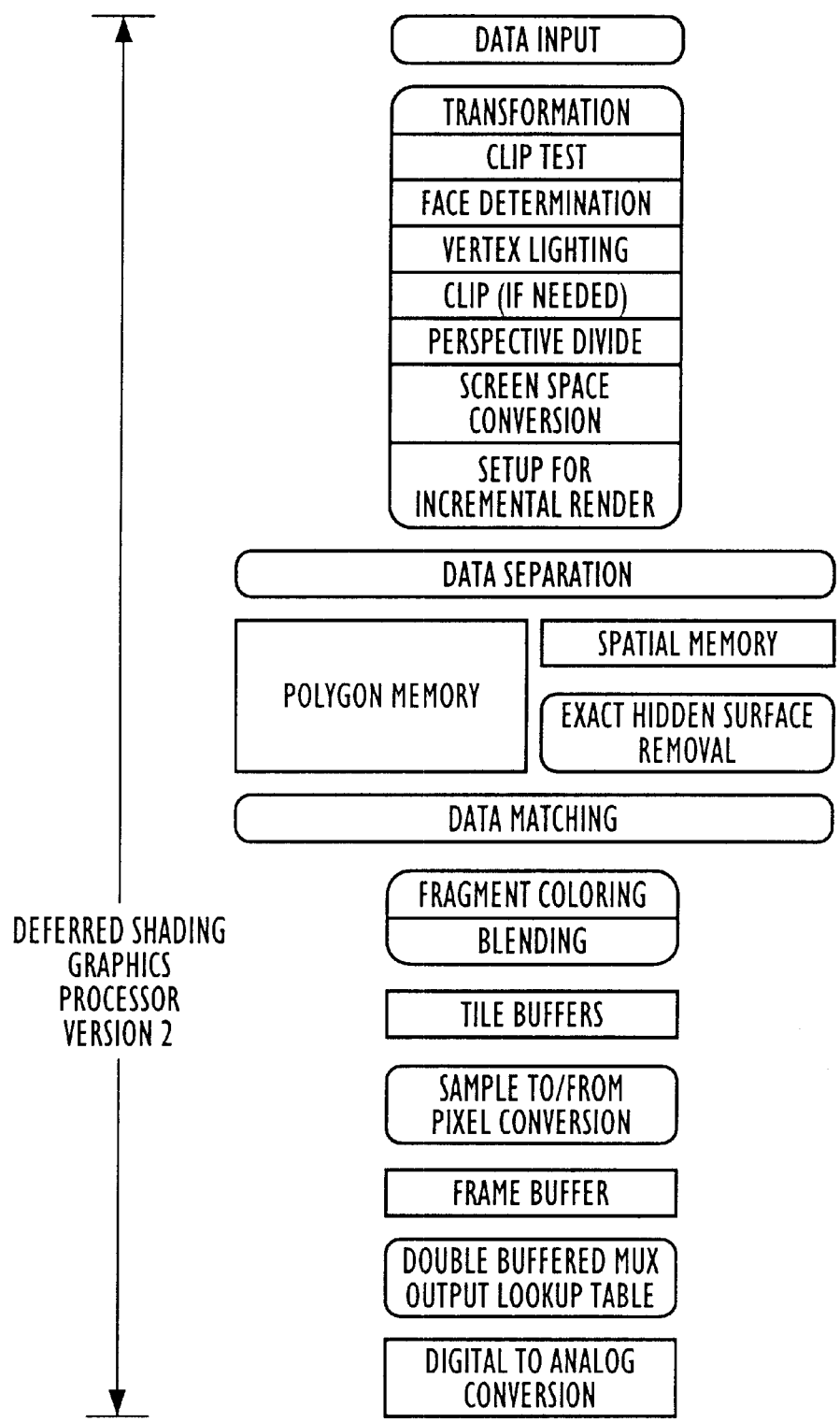
FIG. 4 is a diagrammatic illustration showing a second embodiment of the inventive 3-Dimensional Deferred Shading, Graphics Pipeline.

As described above for DSGPv1, the scene memory 250 stores: (1) primitive data; and (2) pipeline state. In a second embodiment of the Deferred Shading Graphics Pipeline 260 (Version 2) (DSGPv2),illustrated in FIG. 4, this scene memory 250 is split into two parts: a spatial memory 261 part and polygon memory 262 part. The split of the data is not simply into primitive data and pipeline state data.

In DSGPv2, the part of the pipeline state data needed for HSR is stored into spatial memory 261, while the rest is stored into polygon memory 262. Examples of pipeline state needed for HSR include (as defined, for example in the OpenGL® Specification) are DepthFunc, DepthMask, StencilEnable, etc. Examples of pipeline state not needed for HSR include: BlendEquation, BlendFunc, stipple pattern, etc. While the choice or identification of a particular blending function (for example, choosing $R=R_sA_s+R_o(1-A_s)$) is not needed for HSR, the HSR process must account for whether the primitive is subject to blending, which generally means the primitive is treated as not being able to fully occlude prior geometry. Similarly, the HSR process must account for whether the primitive is subject to scissor test, alpha test, color test, stencil test, and other per-fragment operations.

Primitive data is also split. The part of the primitive data needed for HSR is stored into spatial memory 261, and the rest of the primitive data is stored into polygon memory 262. The part of primitive data needed for HSR includes vertex locations and spatial derivatives (i.e., dz/dx, dz/dy, dx/dy for edges, etc.). The part of primitive data not needed for HSR includes vertex colors, texture coordinates, color derivatives, etc. If per-fragment:lighting is performed in the pipeline, the entire lighting equation is applied to every fragment. But in a deferred shading pipeline, only visible fragments require lighting calculations. In this case, the polygon memory may also include vertex normals, vertex eye coordinates, vertex surface tangents, vertex binormals, spatial derivatives of all these attributes, and other per-primitive lighting information.

During the HSR process, a primitive's spatial attributes are accessed repeatedly, especially if the HSR process is done on a per-tile basis. Splitting the scene memory 250 into spatial memory 261 and polygon memory 262 has the advantage of reducing total memory bandwidth.

The output from setup for incremental render 230 is input to the spatial data separation process 263, which stores all the data needed for HSR into spatial memory 261 and the rest of the data into polygon memory 262. The EHSR process 264 receives primitive spatial data (e.g., vertex screen coordinates, spatial derivatives, etc.) and the part of the pipeline state needed for HSR (including all control bits for the per-fragment testing operations).

When visible fragments are output from the EHSR process 264, the data matching process 265 matches the vertex state and pipeline state with visible fragments, and tile information is stored in tile buffers 266. The remainder of the pipeline is primarily concerned with the scan out process including sample to/from pixel conversion 267, reading and writing to the frame buffer, double buffered MUX output look-up, and digital to analog (D/A) conversion of the data stored in the frame buffer to the actual analog display device signal values.

4.1.5 Deferred Shading Graphics Pipeline, Third Embodiment (Version 3)

Figure 5:
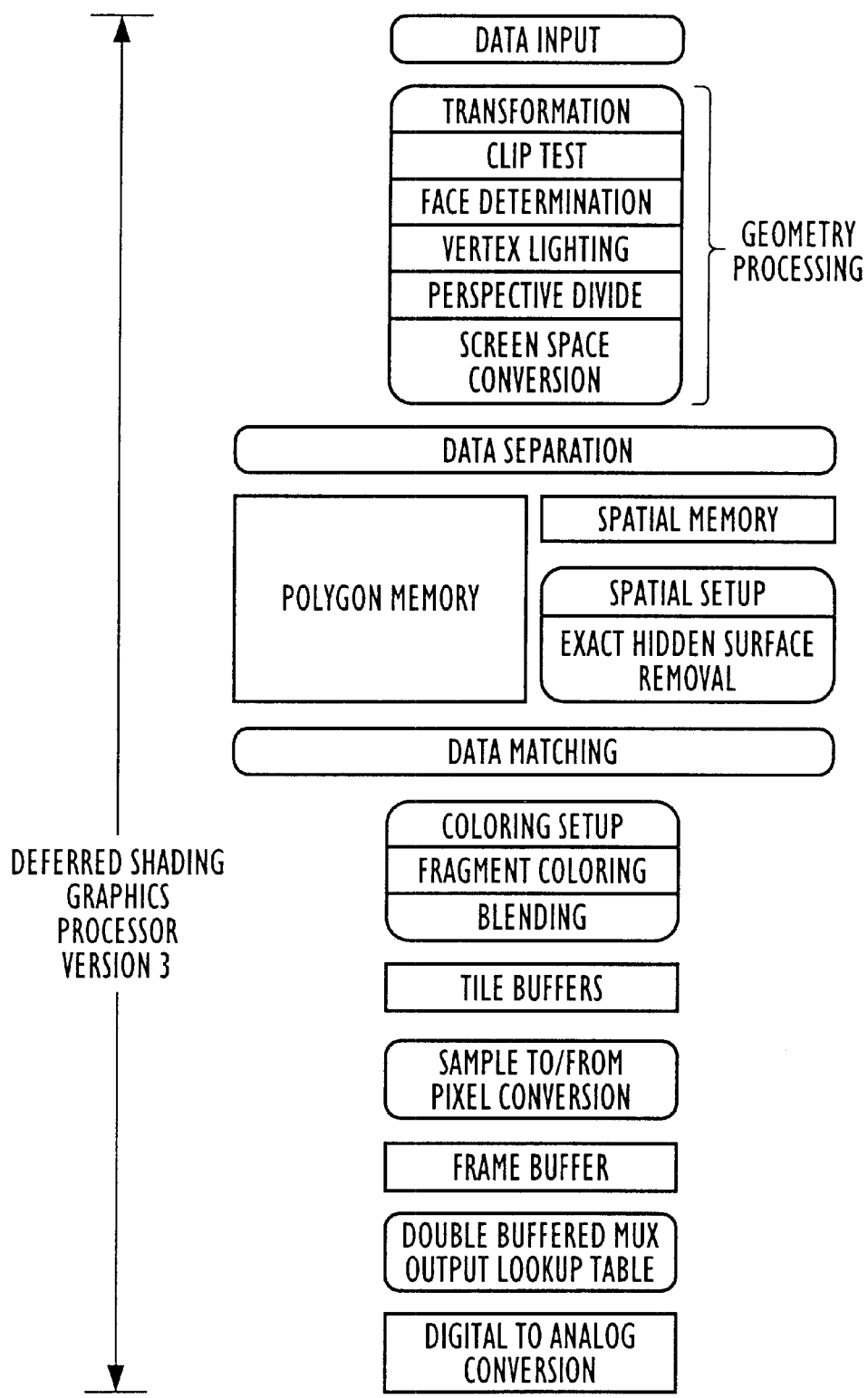
FIG. 5 is diagrammatic illustration showing a third embodiment of the inventive 3-Dimensional Deferred Shading Graphics Pipeline.

In a third embodiment of the Deferred Shading Graphics Pipeline (Version 3) (DSGPv3), illustrated in FIG. 5, the scene memory 250 is still split into two parts (a spatial memory 261 and polygon memory 262) and in addition the setup for incremental render 230 is replaced by a spatial setup which occurs after data separation and prior to exact hidden surface removal. The remainder of the pipeline structure and processes are unchanged from those already described relative to the first embodiment.

4.1.6 Deferred Shading Graphics Pipeline, Fourth Embodiment (Version 4)

Figure 6:
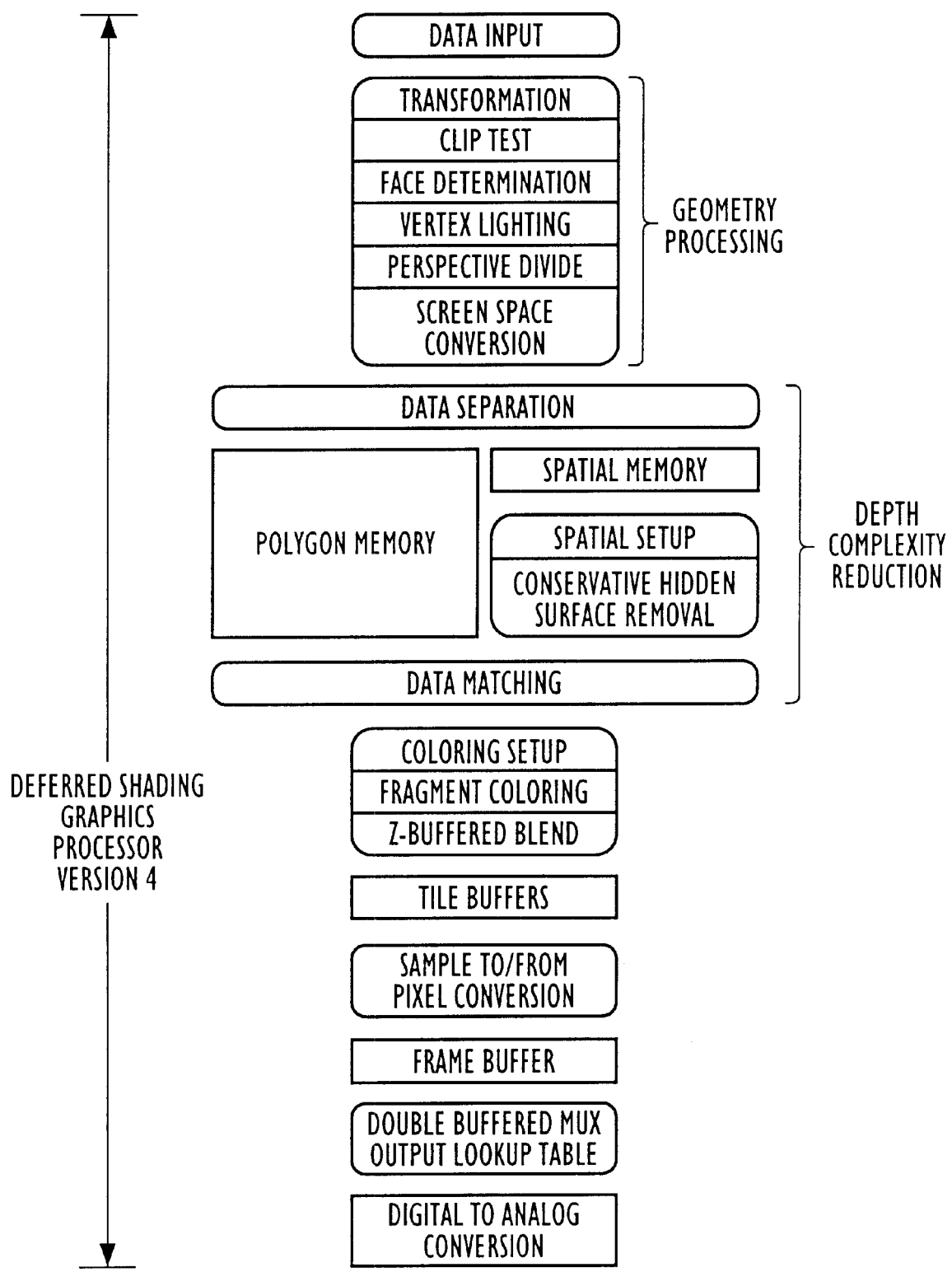
FIG. 6 is a diagrammatic illustration showing a fourth embodiment of the inventive 3-Dimensional Deferred Shading Graphics Pipeline.

In a fourth embodiment of the Deferred Shading Graphics Pipeline (Version 4) (DSGPv4), illustrated in FIG. 6, the exact hidden surface removal of the third embodiment (FIG. 5) is replaced by a conservative hidden surface removal structure and procedure and a down-stream z buffered blend replaces the blending procedure.

4.1.7 Deferred Shading Graphics Pipeline, Fifth Embodiment (Version 5)

Figure 7:
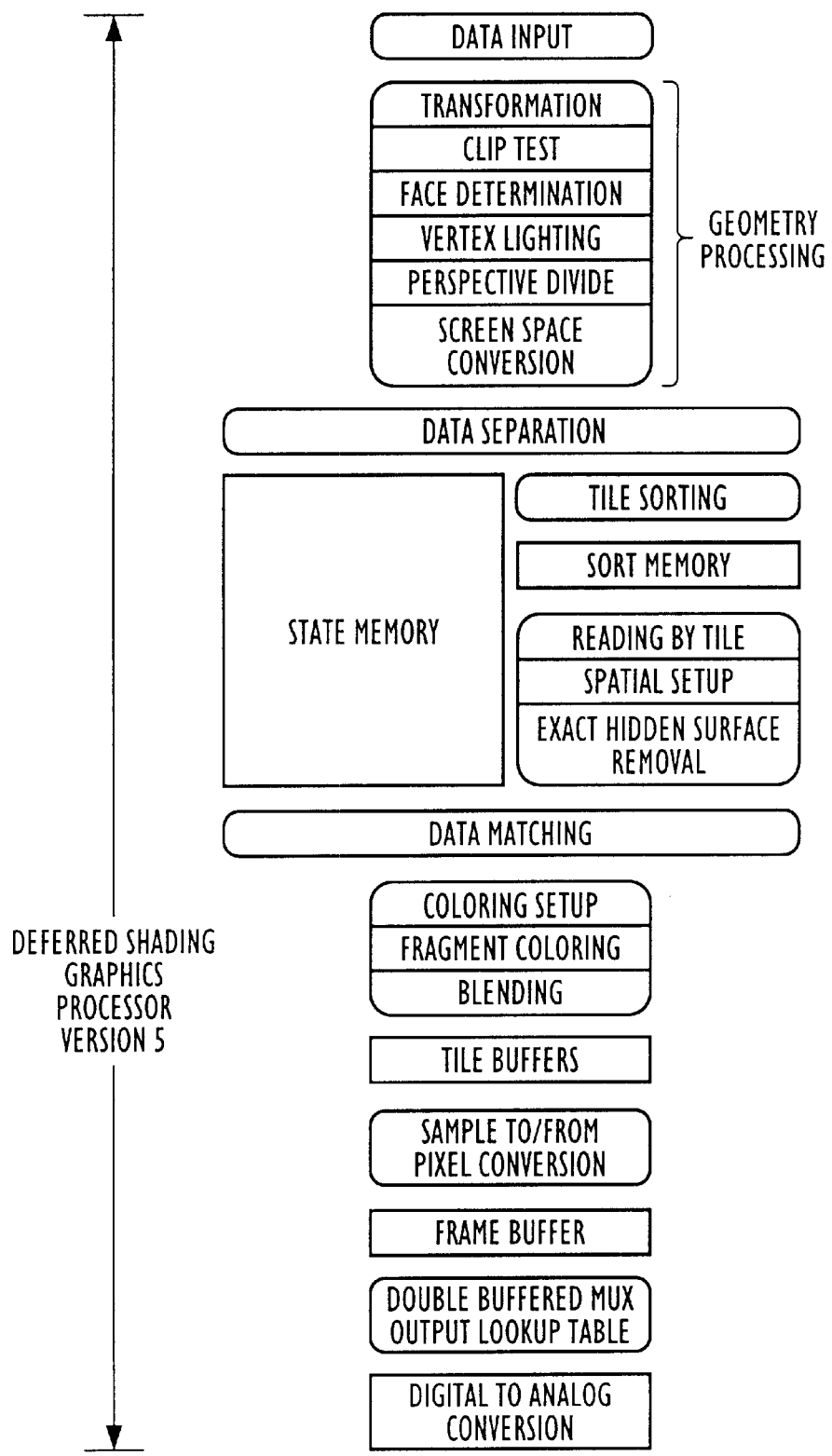
FIG. 7 is a diagrammatic illustration showing a fifth embodiment of the inventive 3-Dimensional Deferred Shading Graphics Pipeline.

In a fifth embodiment of the Deferred Shading Graphics Pipeline (Version 5) (DSGPv5), illustrated in FIG. 7, exact hidden surface removal is used as in the third embodiment, however, the tiling is added, and a tile sorting procedure is added after data separation, and the read is by tile prior to spatial setup. In addition, the polygon memory of the first three embodiments is replaced with a state memory.

4.1.8 Deferred Shading Graphics Pipeline, Sixth Embodiment (Version 6)

Figure 8:
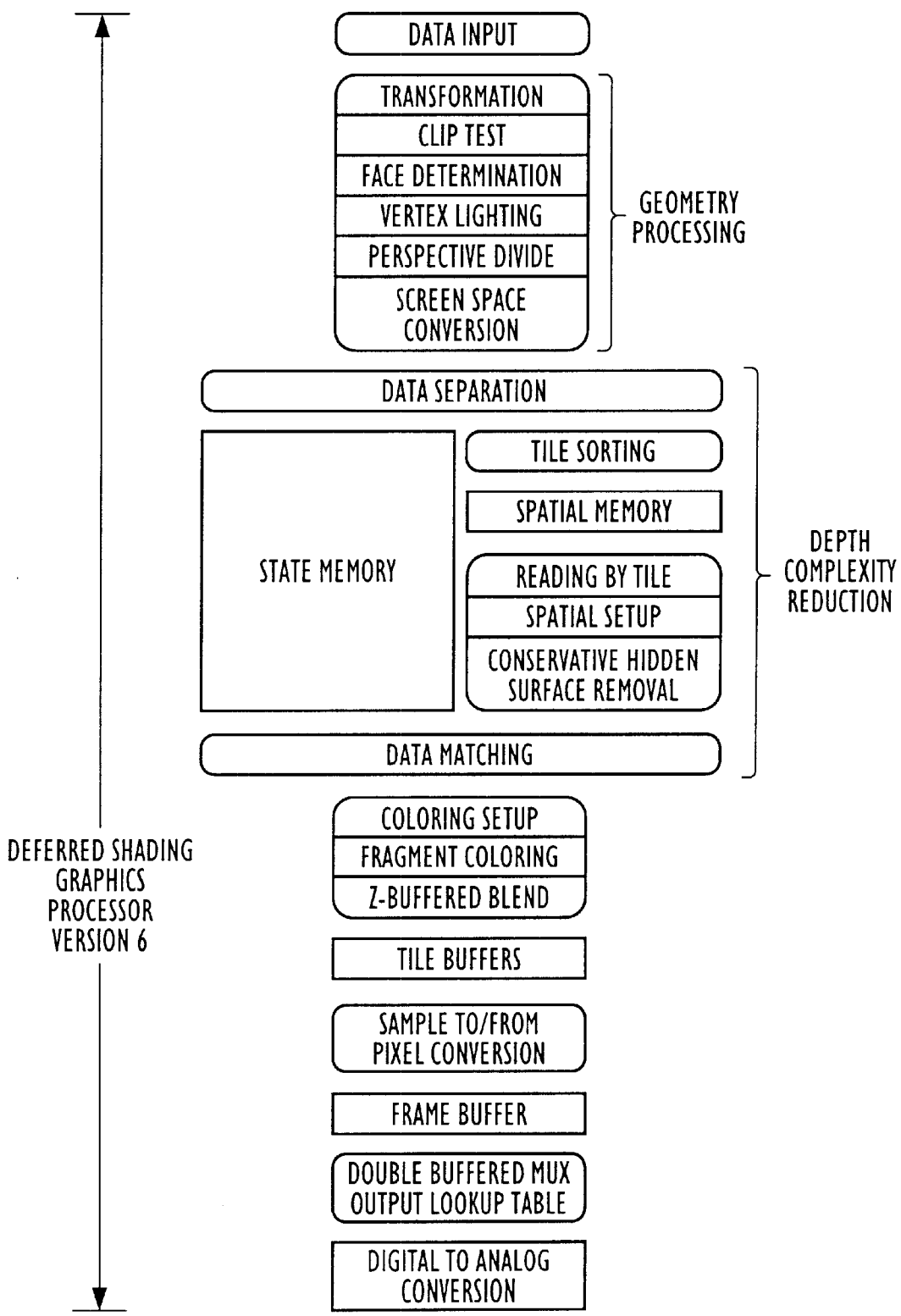
FIG. 8 is a diagrammatic illustration showing a sixth embodiment of the inventive 3-Dimensional Deferred Shading Graphics Pipeline.

In a sixth embodiment of the Deferred Shading Graphics Pipeline (Version 6) (DSGPv6), illustrated in FIG. 8, the exact hidden surface removal of the fifth embodiment (FIG. 7) is replaced with a conservative hidden surface removal, and the downstream blending of the fifth embodiment is replaced with exact z buffered blending (Testing & Blending).

4.1.9 Other possible Embodiments (Versions)

It should be noted that although several exemplary embodiments of the inventive Graphics Pipeline have been shown and described relative to FIGS. 3–8, persons of ordinary skill in the art in light of the description provided here will readily appreciate that the inventive structures and procedures may be implemented in different combinations and permutations to provide other embodiments of the invention, and that the invention is not limited to the particular combinations specifically identified here.

5 SYSTEM LEVEL OVERVIEW

Figure 9:
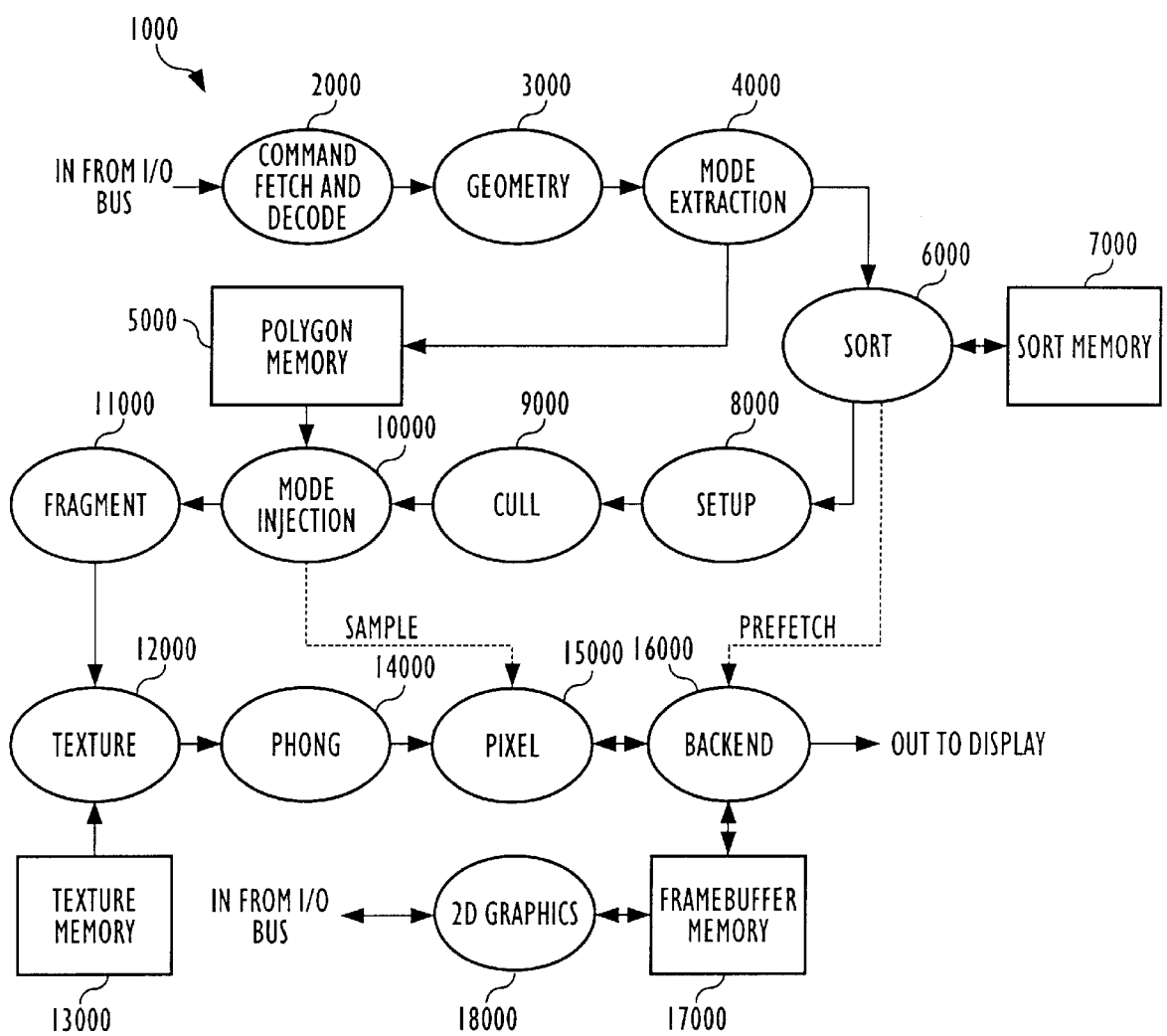
FIG. 9 is a diagramatic illustration showing an exemplary flow of data through blocks of an embodiment of the pipeline.
Figure 10:
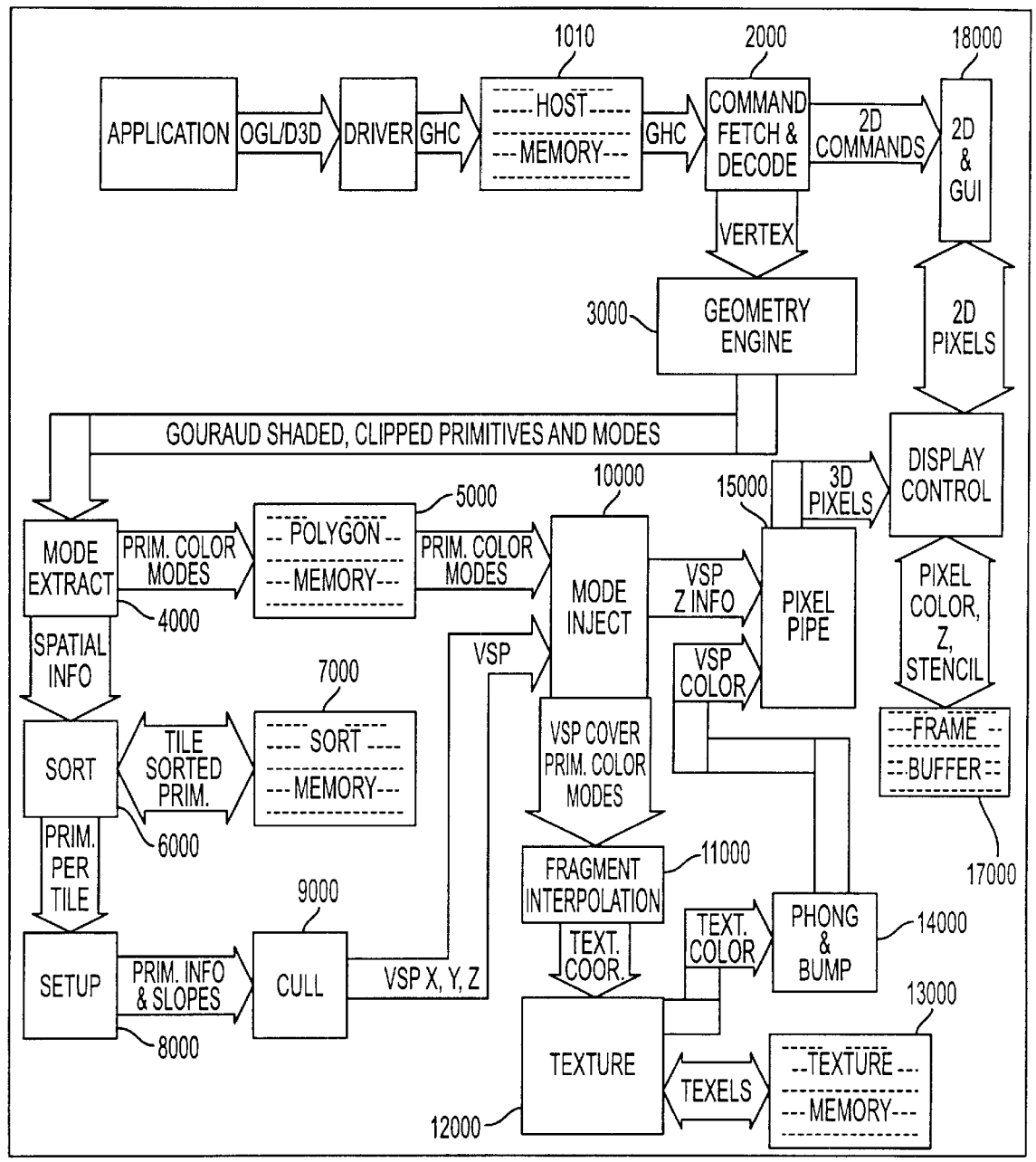
FIG. 10 is a diagrammatic illustration showing an embodiment of the inventive 3-Dimensional graphics pipeline including information passed between the blocks.

The pipeline$_1$ takes data from the host computer's I/O bus, processes it, and sends it to the computer's display. The pipeline is divided into twelve blocks, plus three memory stores and the frame buffer. FIG. 9 shows the flow of data through the pipeline 1000. The blocks that make up the pipeline are discussed below FIG. 10 shows a method flow diagram of pipeline 1000 which also illustrates the information that is passed between the blocks.

5.1 Command Fetch and Decode (CFD)

Command Fetch and Decode (CFD) 2000 handles communication with the host computer through the I/O bus. It converts its input into a series of packets, which it passes to the Geometry block. Most of the input stream consists of geometrical data-lines, points, and polygons. The descriptions of these geometrical objects ;can include colors, surface normals, texture coordinates, etc. The input stream also contains rendering information, such as lighting, blending modes, and buffer functions.

5.2 Geometry (GEO)

The Geometry block 3000 handles four major tasks: transforms, decomposition of all polygons into triangles, clipping, and per-vertex lighting calculations needed for Gouraud shading.

First, the Geometry block transforms incoming graphics primitives into a uniform coordinate space ("world space"). Then it clips the primitives to the viewing volume, or frustum. In addition to the six planes that define the viewing volume (left, right, top, bottom, front and back), the DSGP pipeline provides six user-definable clipping planes. After clipping, the Geometry block breaks polygons with more than three vertices into sets of triangles to simplify processing.

Finally, if there is any Gouraud shading in the frame, the Geometry block calculates the vertex colors that the Fragment block uses to perform the shading.

5.3 Mode Extraction (MEX)

The Mode Extraction block 4000 separates the data stream into two parts: 1) vertices, and 2) everything else. Vertices are sent to the Sort block. The "everything else"— lights, colors, texture coordinates, etc.—is stored in a special buffer called the Polygon Memory, where it can be retrieved by the Mode Injection block. The Polygon Memory is double buffered, so the Mode Injection block can read data for one frame, while the Mode Extraction block is storing data for the next frame. The mode data stored in the Polygon Memory falls into three major categories: per-frame data (such as lighting), per-primitive data (such as material properties) and per-vertex data (such as color). The Mode Extraction and Mode Injection blocks further divide these categories to optimize efficiency.

For each vertex, the Mode Extraction block sends the Sort block a packet containing the vertex data and a pointer into the Polygon Memory. The pointer is called the Color Pointer, although it is used to retrieve all sorts of other information in addition to color. The packet also contains fields indicating whether the vertex represents a point, the endpoint of a line, or the corner of a triangle. The vertices are sent in a strict time sequential order, the same order in which they were fed into the pipeline. The packet also specifies whether the current vertex forms the last one in a given primitive (i.e., "completes" the primitive). In the case of triangle strips or fans, and line strips or loops, the vertices are shared between adjacent primitives. In this case, the packets indicate how to identify the other vertices in each primitive.

5.4 Sort (SRT)

The Sort block 6000 receives vertices from the Mode Extraction block and sorts the resulting points, lines, and triangles by tile. In the double-buffered Sort Memory 7000, it maintains a list of vertices representing the graphic primitives, and a set of Tile Pointer Lists-one list for each tile in the frame. When Sort block 6000 receives a vertex that completes a primitive (such as the third vertex in a triangle), it checks to see which tiles the primitive touches. For each tile a primitive touches, the Sort block adds a pointer to the vertex to that tile's Tile Pointer List.

When the Sort block has finished sorting all the geometry in a frame, it sends the data to Setup block 8000. Each Sort block output packet represents a complete primitive. Sort sends its output in tile-by-tile order: all of the primitives that touch a given tile, then all of the primitives that touch the next tile, and so on. Note that this means that Sort may send the same primitive many times, once for each tile it touches.

5.5 Setup (STP)

The Setup block 8000 calculates spatial derivatives for lines and triangles. Setup block 8000 processes one tile's worth of data, one primitive at a time. When Setup block 8000 is done with a primitive, it sends the data on to the Cull block. The Setup block also breaks stippled lines into separate line segments (each a rectangular region), and computes the minimum z value for each primitive within the tile. The Setup block outputs Setup Output Primitive Packets, each of which represents one primitive: a triangle, line segment or point.

5.6 Cull (CUL)

Figure 11:
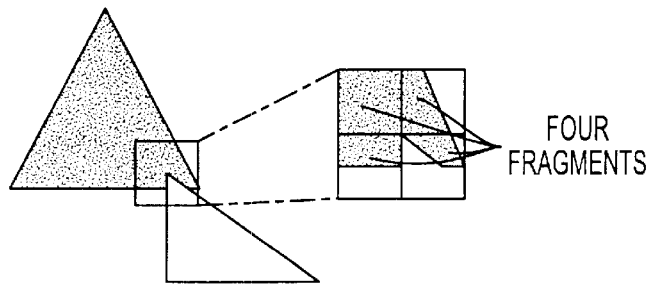
FIG. 11 is a diagramatic illustration showing the manner in which an embodiment of the Cull block produces fragments from a partially obscured triangle.

Cull block 9000 performs the conservative hidden surface removal process. The Cull block 9000 processing is divided into two steps: Magnitude Comparison Content Addressable Memory (MCCAM) Cull, and Subpixel Cull. The Cull block accepts data one tile's worth at a time. The MCCAM Cull discards primitives that are hidden completely by previously processed geometry. The Subpixel Cull takes the remaining primitives (which are partly or entirely visible), and determines the visible fragments. The Subpixel Cull outputs one stamp's worth of fragments at a time, called a Visible Stamp Portion (VSP). FIG. 11 shows an example of how the Cull block produces fragments from a partially obscured triangle.

Each pixel in a VSP is divided up into a number of samples to determine how much of the pixel is covered by a given fragment. The Pixel block uses this information when it blends the fragments to produce the final color for the pixel.

5.7 Mode Injection (MIJ)

The Mode Injection block 10000 retrieves mode information-such as colors, material properties, and so on-from the Polygon Memory 5000 and passes it downstream as required. To save bandwidth, the individual downstream blocks cache recently used mode information. The Mode Injection block keeps track of what information is cached downstream, and only sends information as necessary.

5.8 Fragment (FRG)

The Fragment block 11000 primarily performs interpolation. Fragment block 11000 interpolates color values for Gouraud shading, surface normals for Phong shading and texture coordinates for texture mapping. Fragment block 11000 also interpolates surface tangents for use in the bump mapping algorithm, if bump maps are in use. In addition, the Fragment block performs perspective corrected interpolation using barycentric coefficients.

5.9 Texture (TEX)

The Texture block 12000 applies texture maps to the pixel fragments. Texture maps are stored in the Texture Memory 13000. Unlike the other memory elements described previously, the Texture Memory is single-buffered. It is loaded from the host computer's memory using the AGP interface. A single polygon can use up to four textures.

Textures are mip-mapped. That is, each texture comprises a series of texture maps at different levels of detail, each map representing the appearance of the texture at a given distance from the eye point. To produce a texture value for a given pixel fragment, the Texture block performs tri-linear interpolation from the texture maps, to approximate the correct level of detail. The Texture block also performs other interpolation methods, such as anisotropic interpolation.

The Texture block supplies interpolated texture values (generally as RGBA color values) to the Phong block on a per-fragment basis. Bump maps represent a special kind of texture map. Instead of a color, each texel of a bump map contains a height field gradient.

5.10 Phong (PHG)

The Phong block 14000 performs Phong shading for each pixel fragment. It uses the material and lighting information supplied by the Mode Injection block, the texture colors from the Texture block, and the surface normal generated by the Fragment block to determine the fragment's apparent color. If bump mapping is in use, the Phong block uses the interpolated height field gradient from the Texture block to perturb the fragment's surface normal before shading.

5.11 Pixel (PIX)

The Pixel block 15000 receives VSPs, where each fragment has an independent color value. The Pixel block performs pixel ownership test, scissor test, alpha test, stencil operations, depth test, blending, dithering and logic operations on each sample in each pixel (see OpenGL® Spec 1.1, Section 4.1, "Per-Fragment Operations," p. 109). When the Pixel block has accumulated a tile's worth of finished pixels, it blends the samples within each pixel (thereby performing antialiasing of pixels) and sends them to the Backend, to be store in the Frame Buffer 17000.

To process fragments having common sample locations, the Pixel block blends the fragments and the background color to produce the final pixels. The Pixel block weights each fragment according to how much of the pixel it covers—or to be more precise, by the number of samples it covers.

In addition to this blending process, the Pixel block performs stencil testing, alpha blending, and antialiasing of pixels. When the Pixel block accumulates a tile's worth of finished pixels, it sends them to the Backend, to be stored in the Frame Buffer.

5.12 Backend (BKE)

The Backend 16000 receives a tile's worth of pixels at a time from the Pixel block, and stores them into the Frame Buffer 17000. The Backend also sends a tile's worth of pixels back to the Pixel block, because specific Frame Buffer values can survive from frame to frame. For example, stencil bit values can be constant over many frames, but can be used in all those frames.

In addition to controlling the Frame Buffer, the Backend performs 2D drawing and sends the finished frame to the output; devices. The Backend provides the interface between the Frame Buffer and the computer monitor and video output.

5.13 Communication Between Blocks in the Pipeline

The inventive structure and method provides for packetized communication between the functional blocks of the pipeline The nature of these packets is described in the individual functional block sections.

6 CULL BLOCK OVERVIEW

Figure 12:
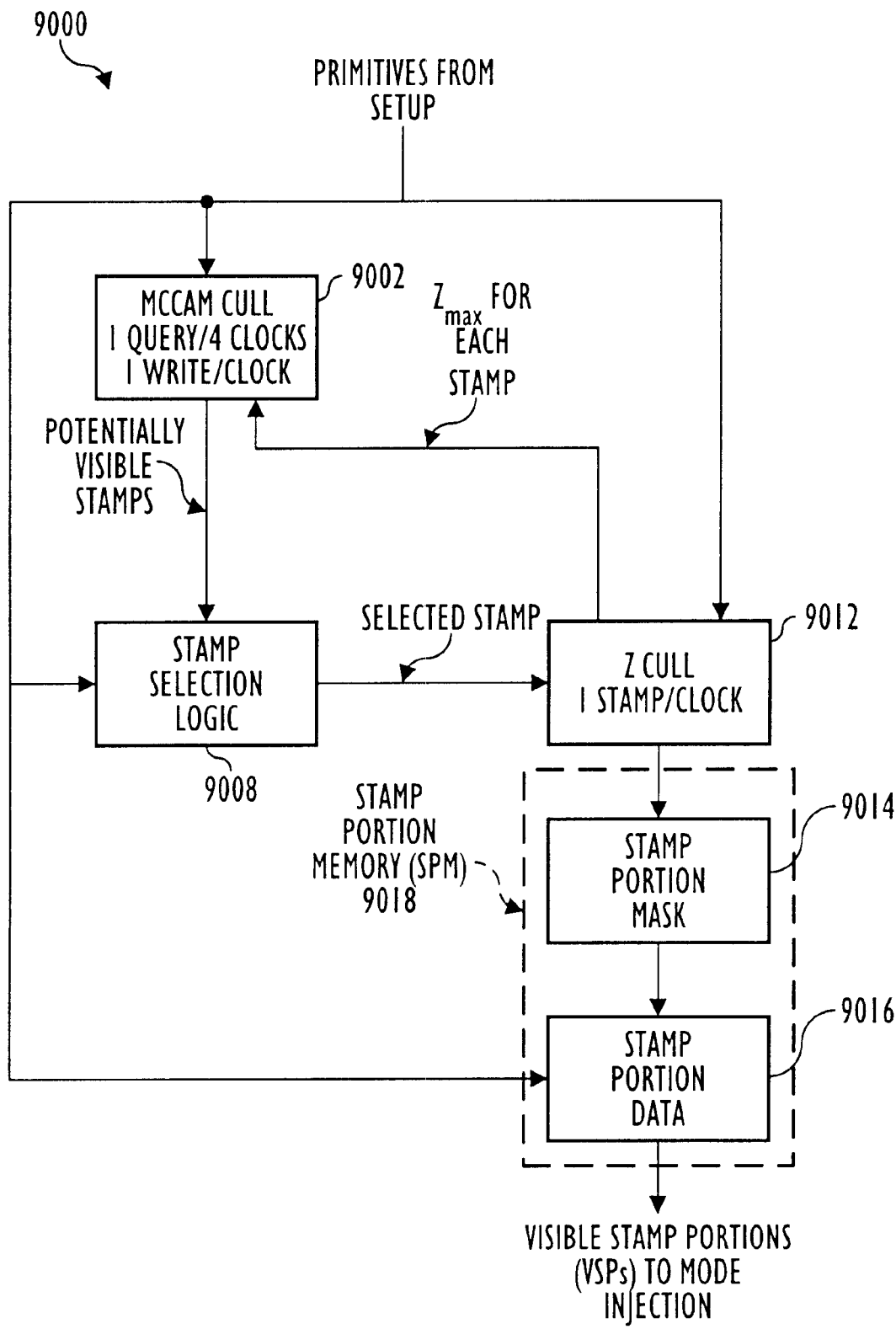
FIG. 12 illustrates a block diagram of the Cull block according to one embodiment of the present invention.

FIG. 12 illustrates a block diagram of Cull block 9000. The Cull block is responsible for: 1) pre-shading hidden surface removal; and 2) breaking down primitive geometry entities (triangles, lines and points) to stamp based geometry entities called Visible Stamp Portions (VSPs). The Cull block does, in general, a conservative culling of hidden surfaces. To facilitate the conservative hidden surface removal process Cull block 9000 does not handle some "fragment operations" such as alpha test and stencil test. Z Cull 9012 can store two depth values per sample, but Z Cull 9012 only stores the attributes of one primitive per sample. Thus, whenever a sample requires blending colors from two pieces of geometry, the Cull block sends the primitive (using time order) down the pipeline, even though there may be later geometry that hides both pieces of the blended geometry.

The Cull block receives input in the form of packets from the Setup block 8000. One type of packet received by the Cull block is a mode packet. Mode packets provide the Cull block control information including the start of a new tile, a new frame, and the end of a frame. Cull block 9000 also receives Setup Output Primitive Packets. The Setup Output Primitive Packets each describe, on a per tile basis, either a triangle, a line or a point. The data field in Setup Output Primitive Packets contain bits to indicate the primitive type (triangle, line or point). The interpretation of the rest of the geometry data field depends upon the primitive type. A non-geometry data field contains the Color Pointer and mode bits that control the culling mode that can be changed on a per primitive bases. Mode packets include mode bits that indicate whether alpha test is on, whether Z buffer write is enabled, whether culling is conservative or accurate, whether depth test is on, whether blending is on, whether a primitive is anti-aliased and other control information.

Sort block 6000 bins the incoming geometry entities to tiles. Setup block 8000 pre-processes the primitives to provide more detailed geometric information for the Cull block to do the hidden surface removal. Setup block 8000 pre-calculates the slope value for all the edges, the bounding box of the primitive within the tile, minimum depth value (front most) of the primitive within the tile, and other relevant data. Prior to Sort, Mode Extraction block 4000 has already extracted the color, light, texture and related mode data, the Cull block only gets the mode data that is relevant to the Cull block and a pointer, called Color Pointer, that points to color, light and texture data stored in Polygon Memory 5000.

The Cull block performs two main functions. The primary function is to remove geometry that is guaranteed to not affect the final results in Frame Buffer 17000 (i.e., a conservative form of hidden surface removal). The second function is to break primitives into units of Visible Stamp Portions (VSP). A stamp portion is the intersection of a primitive with a given stamp. A VSP is a visible portion of a geometry entity within a stamp. In one embodiment, each stamp is comprised of four pixels, and each pixel has four predetermined sample points. Thus each stamp has 16 predetermined sample points. The stamp portion "size" is then given by the number and the set of sample points covered by a primitive in a given stamp.

The Cull block sends one VSP at a time to the Mode Injection block 10000. Mode Injection block 10000 reconnects the VSP with its color, light and texture data and sends it to Fragment 11000 and later stages in the pipeline.

The Cull block processes primitives one tile at a time. However, for the current frame, the pipeline is in one of two modes: 1) time order mode; or 2) sorted transparency mode. In time order mode, the time order of vertices and modes are preserved within each tile, and the tile is processed in a single pass through the data. That is, for a given tile, vertices and modes are read in the same order as they are written, but are skipped if they do not affect the current tile. In sorted transparency mode, the processing of each tile is divided into multiple passes, where, in the first pass, guaranteed opaque geometry is processed (the Sort block only sends no-transparent geometry for this pass). In subsequent passes, potentially transparent geometry is processed (the Sort block repeatedly sends all the transparent geometry for each pass). Within each pass, the time ordering is preserved, and mode data is inserted in its correct time-order location.

In time order mode, when there is only "simple opaque geometry" (i.e. no scissor testing, alpha testing, color testing stencil testing, blending, or logicop) in a tile, the Cull block will process all the primitives in the tile before dispatching any VSPs to Mode Injection. This is because the Cull block hidden surface removal method can unambiguously determine, for each sample, the single primitive that covers (i.e., colors) that sample. The case of "simple opaque geometry" is a typically infrequent special case.

In time order mode, when the input geometry is not limited to "simple opaque geometry" within a tile, this may cause early dispatch of VSPs (an entire set of VSPs or selected VSPs). However, without exception all the VSPs of a given tile are dispatched before any of the VSPs of a different tile can be dispatched. In general, early dispatch is performed when more than one piece of geometry could possibly affect the final tile values (determined by Pixel block 15000) for any sample.

In sorted transparency mode, each tile is processed in multiple passes (assuming there is at least some transparent geometry in the tile). In each pass, there is no early dispatch of VSPs.

If the input packet is a Setup Output Primitive Packet, a PrimType parameter indicates the primitive type (triangle, line or point). The spatial location of the primitive (including derivatives, etc.) is done using a "unified description". That is, the packet describes the primitive as a quadrilateral (not screen aligned), and triangles and points are degenerate cases. This "unified description" is described in more detail in the provisional patent application entitled "Graphics Processor with Deferred Shading," filed Aug. 20, 1998, which is hereby incorporated by reference. The packet includes a color pointer, used by Mode Injection. The packet also includes several mode bits, many of which can change primitive by primitive. The following are considered to be "mode bits", and are input to state machines in Z Cull 9012: CullFlushOverlap, DoAlphaTest; DoABlend, DepthFunc, DepthTestEnabled, DepthTestMask, and NoColor.

In addition to;Setup Output Primitive Packets, Cull block 9000 receives the following packet types: Setup Output Clear Packet, Setup Output Cull Packet, Setup Output Begin Frame Packet, Setup Output End Frame Packet, Setup Output Begin Tile Packet, and Setup Output Tween Packet. Each of these packet types is described in detail in the Detailed Description of Cull Block section. But, collectively, these packets are referred to as "mode packets."

Figure 13A:
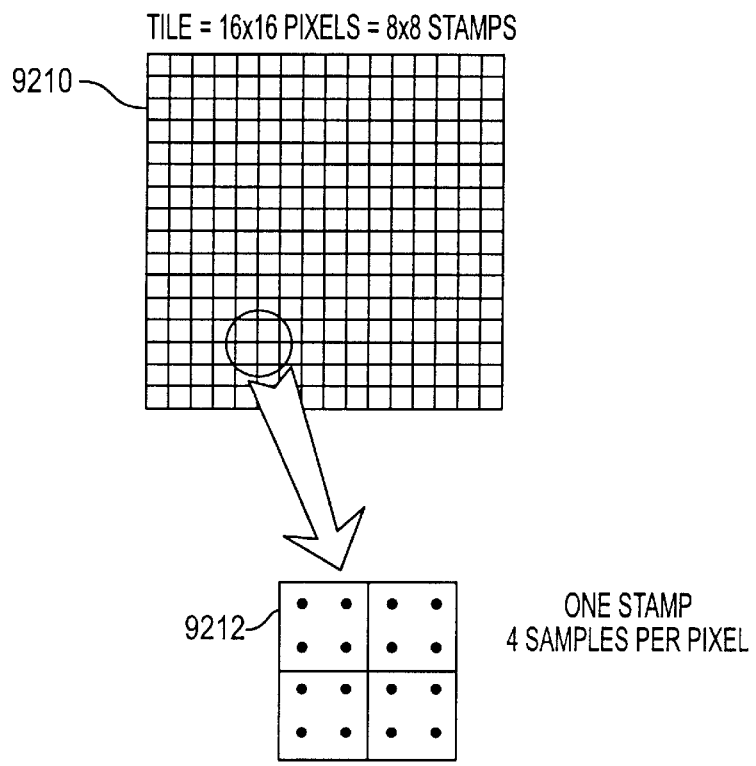
FIG. 13 illustrates the relationships between tiles, pixels, and stamp portions in an embodiment of the invention.
Figure 13B:
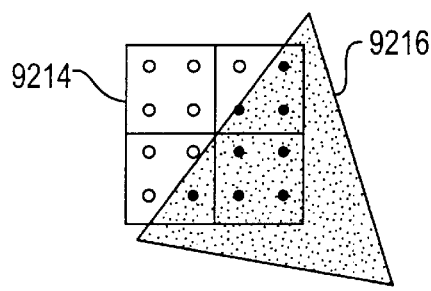
Figure 13C:
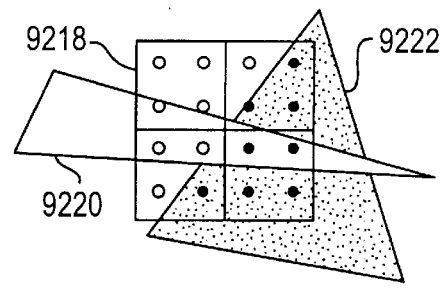

In operation, when Cull block 9000 receives a primitive, Cull attempts to eliminate it by querying the Magnitude Comparison Content Addressable Memory (MCCAM) Cull 9002, shown in FIG. 12, with the primitive's bounding box. If MCCAM Cull 9002 indicates that a primitive is completely hidden within the tile, then the primitive is eliminated. If MCCAM Cull 9002 cannot reject the primitive completely, it will generate a stamp list, each stamp in the list may contain a portion of the primitive that may be visible. This list of potentially visible stamps is sent to the Stamp Selection Logic 9008 of Cull block 9000. Stamp Selection Logic 9008 uses the geometry data of the primitive to determine the set of stamps within each stamp row of the tile that are actually touched by the primitive. Combined with the stamp list produced by MCCAM Cull 9002, the Stamp Selection Logic unit dispatches one potentially visible stamp 9006 at a time to the Z Cull block 9012. Each stamp is divided into a grid of 16 by 16 sub-pixels. Each horizontal grid line is called a subraster line. Each of the 16 sample points per stamp has to fall (for antialiased primitives) at the center of one of the 256 possible sub-pixel locations. Each pixel has four sample points within its boundary, as shown with stamp 9212 in FIG. 13A. (FIG. 13B and FIG. 13C illustrate the manner in which the Stamp Portion is input into the Z-Cull process and as stored in SPM, respectively.) Sample locations within pixels can be made programmable. With programmable sample locations, multiple processing passes can be made with different sample locations thereby increasing the effective number of samples per pixel. For example, four passes could be performed with four different sets of sample locations, thereby increasing the effective number of samples per pixel to fourteen.

The display image is divided into tiles to more efficiently render the image. The tile size as a fraction of the display size can be defined based upon the graphics pipeline hardware resources.

The process of determining the set of stamps within a stamp row that is touched by a primitive involves calculating the left most and right most positions of the primitive in each subraster line that contains at least one sample point. These left most and right most subraster line positions are referred to as XleftSubS$_i$ and XrightSubS$_i$ which stands for x left most subraster line for sample i and x right most subraster line for sample i respectively. Samples are numbered from 0 to 15. The determination of XleftSubS$_i$ and XrightSubS$_i$ is typically called the edge walking process. If a point on an edge (x0, y0) is known, then the value of x1 corresponding to the y position of y1 can easily be determined by:

$$x1 = x0 + (y1 - y0) * \frac{dx}{dy}$$

In addition to the stamp number, the set of 16 pairs of XleftSubS$_i$ and XrightSubS$_i$ is also sent by the Stamp Selection Logic unit to Z Cull 9012.

Z Cull unit 9012 receives one stamp number (or StampID) at a time. Each stamp number contains a portion of a primitive that may be visible as determined by MCCAM Cull 9002. The set of 16 pairs of XleftSubS$_i$ and XrightSubS$_i$ are used to determine which of the 16 sample points are covered by the primitive. Sample i is covered if Xsample$_i$, the x coordinate value of sample i satisfies:

XleftSubS$_i \leq$ Xsample$_i <$ XrightSubS$_i$

For each sample that is covered, the primitive's z value is computed at that sample point. At the same time, the current z values and z states for all 16 sample points are read from the Sample Z buffer 9055.

Each sample point can have a z state of "conservative" or "accurate". Alpha test, and other tests, are performed by pipeline stages after Cull block 9000. Therefore, for example, a primitive that may appear to affect the final color in the frame buffer based on depth test, may in fact be eliminated by alpha test before the depth test is performed, and thus the primitive does not affect the final color in the frame buffer. To account for this, the Cull block 9000 uses conservative z values. A conservative z value defines the outer limit of a z value: for a sample based on the geometry that has been processed up to that point. A conservative z value means that the actual z value is either at that point or at a smaller z value. Thus the conservative z is the maximum z value that the point can have. If the depth test is render if greater than, then the conservative z value is a minimum z value. Conversely, if the depth test is render if less than, then the conservative z value is a maximum z value. For a render if less than depth test, any sample for a given sample location, with a z value less than the conservative z is thus a conservative pass because it is not known at that point in the processes whether it will pass.

An accurate z value is a value such that the surface which that z represents is the actual z value of the surface. With an accurate z it is known that the z value represents a surface that is known to be visible and anything in front of it is visible and everything behind it is obscured, at that point in the process. The status of a sample is maintained by a state machine, and as the process continues the status of a sample may switch between accurate and conservative. In one embodiment, a single conservative z value is used. In another embodiment, two z values are maintained for each sample location, a near z value (Znear) and a far z value (Zfar). The far z value is a conservative z value, and the near z value is an optimistic z value. Using two z values allows samples to be determined to be accurate again after being labeled as conservative. This improves the efficiency of the pipeline because an accurate z value can be used to eliminate more geometry than a conservative z value. For example, if a sample is received that is subject to alpha test, in the Cull block it is not known whether the sample will be eliminated due to alpha test. In an embodiment where only one z value is stored, the z value may have to be made conservative if the position of the sample subject to alpha test would pass the depth test. The sample that is subject to alpha test is then sent down the pipeline. Since, the sample subject to alpha test is not kept, the z value of the stored sample cannot later be converted back to accurate. By contrast, in an embodiment where two z values are stored, the sample subject to alpha test can, depending on its relative position, be stored as the Zfar/Znear sample. Subsequent samples can then be compared with the sample subject to alpha test as well as the second stored sample. If the Cull block determines, based on the depth test, that one of the subsequent samples, such as an opaque sample in front of the sample subject to alpha test, renders the sample subject to alpha test not visible, then that subsequent sample can be labeled as accurate.

In OpenGL® primitives are processed in groups. The beginning and ending of a group of pimitives are identified by the commands, begin and end respectively. The depth test is defined independently for each group of primitives. The depth test is one component of the pipeline state.

Each sample point has a Finite State Machine (FSM) independent of other samples. The z state combined with the mode bits received by Cull drive the sample FSMs. The sample FSMs control the comparison on a per sample basis between the primitive's z value and the Z Cull 9012 z value. The result of the comparison is Mused to determine whether the new primitive is visible or hidden at each sample point that the primitive covers. The maximum of the 16 sample points z value is used to update the MCCAM Cull 9002.

A sample's FSM also determines how the Sample Z Buffer in Z Cull 9012 should be updated for that sample, and whether the sample point of the new VSP should be dispatched early. In addition, the sample FSM determines if any old VSP that may contain the sample point should be destroyed or should be dispatched early. For each sample Z Cull 9012 generates four control bits that describe how the sample should be processed, and sends them to the Stamp Portion Mask unit 9014. These per sample control bits are: SendNew, KeepOld, SendOld, and NewVSPMask. If the primitive contains a sample point that is visible, then a NewVSPMask control bit is asserted which causes Stamp Portion Memory (SPM) 9018 to generate a new VSP coverage mask. The remaining three control bits determine how SPM 9018 updates the VSP coverage mask for the primitive.

In sorted transparency mode, geometry is spatially sorted on a per-sample basis, and, within each sample, is rendered in either back-to-front or front-to-back order. In either case, only geometry that is determined to be in front of the front-most opaque geometry needs to be send down the pipeline, and this determination is done in Cull 9012.

In back-to-front sorted transparency mode, transparent primitives are rasterized in spatial order starting with the layer closest to the front most opaque layer instead of the regular mode of time order rasterization. Two z values are used for each sample location, Zfar and Znear. In sorted transparency mode the transparent primitives go through Z Cull unit 9012 several times. In the first pass, Sort block

6000, illustrated in FIG. 9, sends only the opaque primitives. The z values are updated as described above. The z values for opaque primitives are referred to as being of type Zfar. At the end of the pass, the opaque VSPs are dispatched. The second time Sort block 6000 only sends the transparent primitives for the tile to Cull block 9000. Initially the Znear portion of the Sample Z Buffer are preset to the smallest z value possible. A sample point with a z value behind Zfar is hidden, but a z value in front of Zfar and behind Znear is closer to the opaque layer and therefore replaces the current Znear's z value. This pass determines the z value of the layer that is closest to the opaque layer. The VSPs representing the closest to opaque layer are dispatched. The roles of Znear and Zfar are then switched, and Z Cull receives the second pass of transparent primitives. This process continues until Z Cull determines that it has processed all possible layers of transparent primitives. Z Cull in sorted transparent mode is also controlled by the sample finite state machines.

In back-to-front sorted transparency mode, for any particular tile, the number of transparent passes is equal to the number of visible transparent surfaces. The passes can be done as:

a) The Opaque Pass (there is only one Opaque Pass) does the following: the front-most opaque geometry is identified (labeled Zfar) and sent down the pipeline.

b) The first Transparent Pass does the following: 1) at the beginning of the pass, keep the Zfar value from the Opaque Pass, and set Znear to zero; 2) identifies the back-most transparent surface between Znear (initialized to zero at the start of the pass) and Zfar; 2) determine the new Znear value, and, 3) at the end of the pass, send this back-most transparent surface down the pipeline.

c) The subsequent passes (second Transparent Pass, etc.) do the following: 1) at the beginning off the pass, set the Zfar value to the Znear value from the last pass, and set Znear to zero; 2) identify the next farthest transparent surface between Znear and Zfar; 3) determine the new Znear value; and, 4) at the end of the pass, send this backmost transparent surface down the pipeline.

In front-to-back sorted transparency mode, for any particular tile, the number of transparent passes can be limited to a preselected maximum, even if the number of visible transparent surfaces at a sample is greater. The passes can be done as:

a) In the First Opaque Pass (there are two opaque passes, the other one is the Last Opaque Pass), the front-most opaque geometry is identified (labeled Zfar), but this geometry is not sent down the pipeline, because, only the z-value is valuable in this pass. This Zfar value is the boundary between visible transparent layers and hidden transparent layers. This pass is done with the time order mode sample FSM.

b) The next pass, the first Transparent Pass, renders the front-most transparent geometry and also counts the number of visible transparencies at each sample location. This pass does the following: 1) al the beginning of the pass, set the Znear value to the Zfar value from the last pass, set Zfar to the maximum z-value, and initialize the NumTransp counter in each sample to zero; 2) test all transparent geometry and identify the front-most transparent surface by finding geometry that is in front of both Znear and Zfar; 3) as geometry is processed, determine the new Zfar value, but don't change the Znear value; 4) count the number of visible transparent surfaces by incrementing "NumTransp when geometry that is in front of Znear is encountered; and, 5) at the end of the pass, send this front-most transparent surface down the pipeline. NOTE: concpetually, this pass is defined in an unusual way, because, at the end, Zfar is nearer than Znear; but this allows the rule, "set the Znear value to the Zfar value from the last pass, and set Zfar to the maximum z-value to be true for every transparent pass. If this is confusing, the definition of Znear and Zfar can be swapped, but this changes the definition of the second transparent pass.

c) Subsequent Transparent Passes determine progressively farther geometry, and the maximum number of transparent passes is specified by the MaxTranspPasses parameter. Each of these passes does the following: 1) at the beginning of the pass, set the Znear value to the Zfar value from the last pass, set Zfar to the maximum z-value, and the NumTransp counter in each sample is not changed; 2) test all transparent geometry and identify the next-front-most transparent surface by finding the front-most geometry that is between Znear and Zfar, but discard all the transparent geometry if all of the visible transparent layers have been found for this sample (i.e., NumTranspPass>NumTransp); 3) as geometry is processed, determine the new Zfar value, but don't change the Znear value; and, 4) at the end of the pass, send this second-most transparent surface down; the pipeline.

d) For the Last Opaque Pass, the front-most opaque geometry is again identified, but this time, the geometry is sent down the pipeline. This pass does the following: 1) at the beginning of the pass, set Zfar to the maximum z-value (Znear is not used), and the NumTransp counter in each sample is not, changed; 2) test all opaque geometry and identify the front-most geometry, using the time order mode sample FSM; 3) as geometry is processed, determine the new Zfar value, but discard the geometry if SkipOpaqueIfMaxTransp is TRUE and the maximum number of transparent layers was found (i.e., MaxTranspPasses=NumTransp); and 4) at the end of the pass, send this front-most opaque surface down the pipeline.

The efficiency of CUL is increased (i.e., fewer fragments sent down the pipeline) in front-to-back sorted transparency :mode, especially when there are lots of visible depth complexity for transparent surfaces. Also, this may enhance image quality by allowing the user to discern the front-most N transparencies, rather than all those in front of the front-most opaque surface.

The stamp portion memory block 9018 contains the VSP coverage masks for each stamp in the tile. The maximum number of VSPs a stamp can have is 16. The VSP masks should be updated or dispatched early when a new VSP comes in from Z Cull 9012. The Stamp Portion Mask unit performs the mask update or dispatch strictly depending on the SendNew, KeepOld and SendOld control bits. The update should occur at the same time for a maximum of 16 old VSPs in a stamp because a new VSP can potentially modify the, coverage mask of all the old VSPs in the stamp. The Stamp Portion Data unit 9016 contains other information associated with a VSP including but not limited to the Color Pointer. The Stamp Portion Data memory also needs to hold the data for all VSPs contained in a tile. Whenever a new VSP is created, its associated data need to be stored in the Stamp Portion Data memory. Also, whenever an old VSP is dispatched, its data need to be retrieved from the Stamp Portion Data memory.

7 DETAILED DESCRIPTION OF CULL BLOCK

Figure 14:
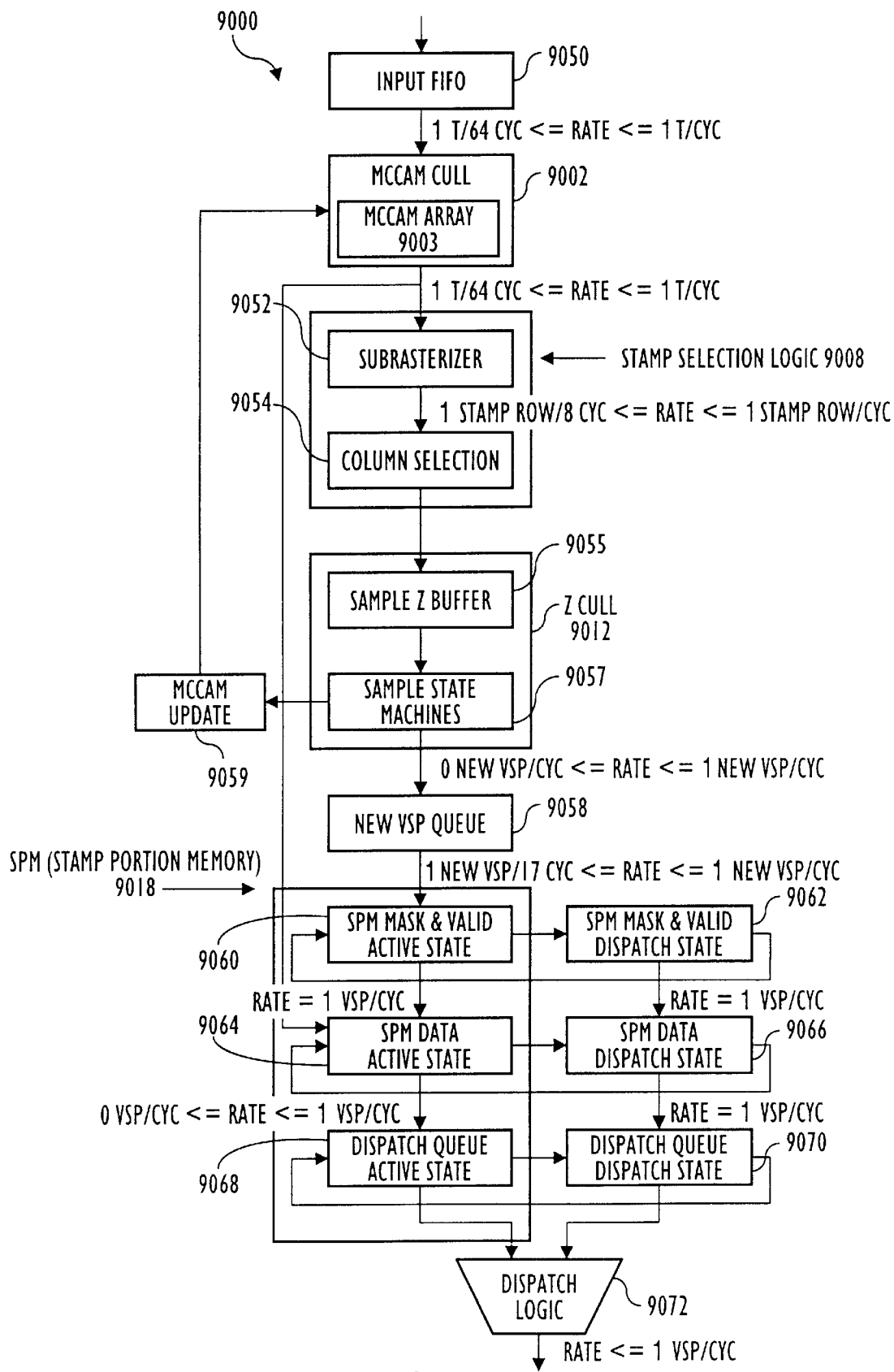
FIG. 14 illustrates a detailed block diagram of the Cull block according to one embodiment of the present invention.

FIG. 14 illustrates a detailed block diagram of Cull block 9000. Cull block 9000 is composed of the following components: Input FIFO 9050, MCCAM Cull 9002, Subrasterizer 9052, Column Selection 9054, MCCAM Update 9059, Sample Z buffer 9055, New VSP Queue 9058, Stamp Portion Memory Masks 9060 and 9062, Stamp Portion Memory Data units 9064 and 9066, Dispatch Queues 9068 and 9070, and Dispatch Logic 9072.

7.0.1 Mode and Data Packets

The operation of the Cull components is determined by the packets received by the Cull block. The following describes the mode packets:

- A Setup Output Clear Packet indicates some type of buffer clear is to be performed. However, buffer clears that occur at the beginning of a user frame (and not subject to scissor test) are included in a Begin Tile packet.
- The Setup Output Cull Packet is a packet of mode bits. This packet includes: 1) bits for enabling/disabling the MCCAM Cull and Z Cull processes; 2) a bit, CullFlushAll, that causes a flush of all the VSPs from the Cull block; and 3) the bits: AliasPolys, AliasLines, and AliasPoints, which disable antialiasing for the three types of primitives.
- The Setup Output Begin Frame Packet tells Cull that a new frame is starting. The next packet will be a Sort Output Begin Tile Packet. The Setup Output Begin Frame Packet contains all the per-frame information that is needed throughout the pipeline.
- The Setup Output End Frame Packet indicates the frame has ended, and that the current tile's input has been completed.
- The Setup Output Begin Tile Packet tells the Cull block that the current tile has ended and that the processed data should be flushed down the pipeline. Also, at the same time, the Cull block should start process the new tile's primitives. If a tile is to be repeated due to the pipeline being in sorted transparency mode, then this requires another Setup Output Begin Tile Packet. Hence, if a particular tile needs an opaque pass and four transparent passes, then a total of five begin tile packets are sent from the Setup block. This packet specifies the location of the tile within the window.
- The Setup Output Tween Packet can only occur between (hence 'tween) frames, which, of course is between tiles. Cull treats this packet as a black box, and just passes it down the pipeline. This packet has only one parameter, TweenData, which is 144 bits.

In addition to the mode packets, the Cull block also receives Setup Output Primitive Packets, as illustrated in FIG. 15.

The Setup Output Primitive Packets each describe, on a per tile basis, either a triangle, a line, or a point. More particularly, the data field in Setup Output Primitive Packets contain bits to indicate the primitive type (triangle, line, or point). The interpretation of the rest of the geometry data field depends upon the primitive type.

If the input packet is a Setup Output Primitive Packet, a PrimType parameter indicates the primitive type (triangle, line or point). The spatial location of the primitive (including derivatives, etc.) is specified using a unified description. That is, the packet describes the primitive as a quadrilateral (non-screen aligned), no matter whether the primitive is a quadrilateral, triagle, or point, and triangles and points are treated as degenerate cases of the quadralateral. The packet includes a color pointer, used by the Mode Injection unit. The packet also includes several mode bits, many of which can change state on a primitive by primitive basis. The following are considered to be "mode bits", and are input to state machines in Z Cull 9012: CullFlushOverlap, DoAlphaTest; DoABlend, DepthFunc, DepthTestEnabled, DepthTestMask, and NoColor.

The Cull components are described in greater detail in the following sections.

7.0.2 Input FIFO

FIG. 16 illustrates a flow chart of a conservative hidden surface removal method using the Cull block 9000 components shown in the FIG. 14 detailed block diagram. Input FIFO unit 9050 interfaces with the Setup block 8000. Input FIFO 9050 receives data packets from Setup and stores each packet in a queue, step 9160. The number of FIFO memory locations needed is between about sixteen and about 32, in one embodiment the depth is assumed to be sixteen.

7.0.3 MCCAM Cull

The MCCAM, Cull unit 9002 uses an MCCAM array 9003 to perform a spatial query on a primitive's bounding box to determine the set of stamps within the bounding box that may be visible. The Setup block 8000 determines the bounding box for each primitive, and determines the minimum z value of the primitive inside the current tile which is referred to as ZMin. FIG. 17A illustrates a sample tile including a primitive 9254 and a bounding box 9252 in MCCAM. MCCAM Cull 9002 uses ZMin to perform z comparisons. MCCAM Cull 9002 stores the maximum z value per stamp of all the primitives that have been processed. MCCAM Cull 9002 then compares in parallel ZMin for the primitive with all the ZMaxes for every stamp. Based on this comparison, MCCAM Cull determines (a) whether the whole primitive is hidden, based on all the stamps inside the simple bounding box; or (b) what stamps are potentially visible in that bounding box, step 9164. FIG. 17B shows the largest z values (ZMax) for each stamp in the tile. FIG. 17C shows the results of the comparison. Stamps where ZMin<ZMax are indicated with a one, step 9166. These are the potentially visible stamps. MCCAM Cull also identifies each row which has a stamp with ZMin≦ZMax, step 9168. These are the rows that the Stamp Selection Logic unit 9008 needs to process. Stamp Selection Logic unit 9008 skips the rows that are identified with a zero.

MCCAM Cull can process one primitive per cycle from the input FIFO 9050. Read operations from the FIFO occur when the FIFO is not empty and either the last primitive removed is completely hidden as determined by MCCAM Cull or the last primitive is being processed by the Subrasterizer unit 9052. In other words, MCCAM Cull does not "work ahead" of the Subrasterizer. Rather, MCCAM Cull only gets the next primitive that the Subrasterizer needs to process, and then waits.

In an alternative embodiment, Cull block 9000 does not include an MCCAM Cull unit 9002. In this embodiment, the Stamp Selection Logic unit 9008 processes all of the rows.

7.0.4 Subrasterizer within the Stamp Selection Logic

Figure 18:
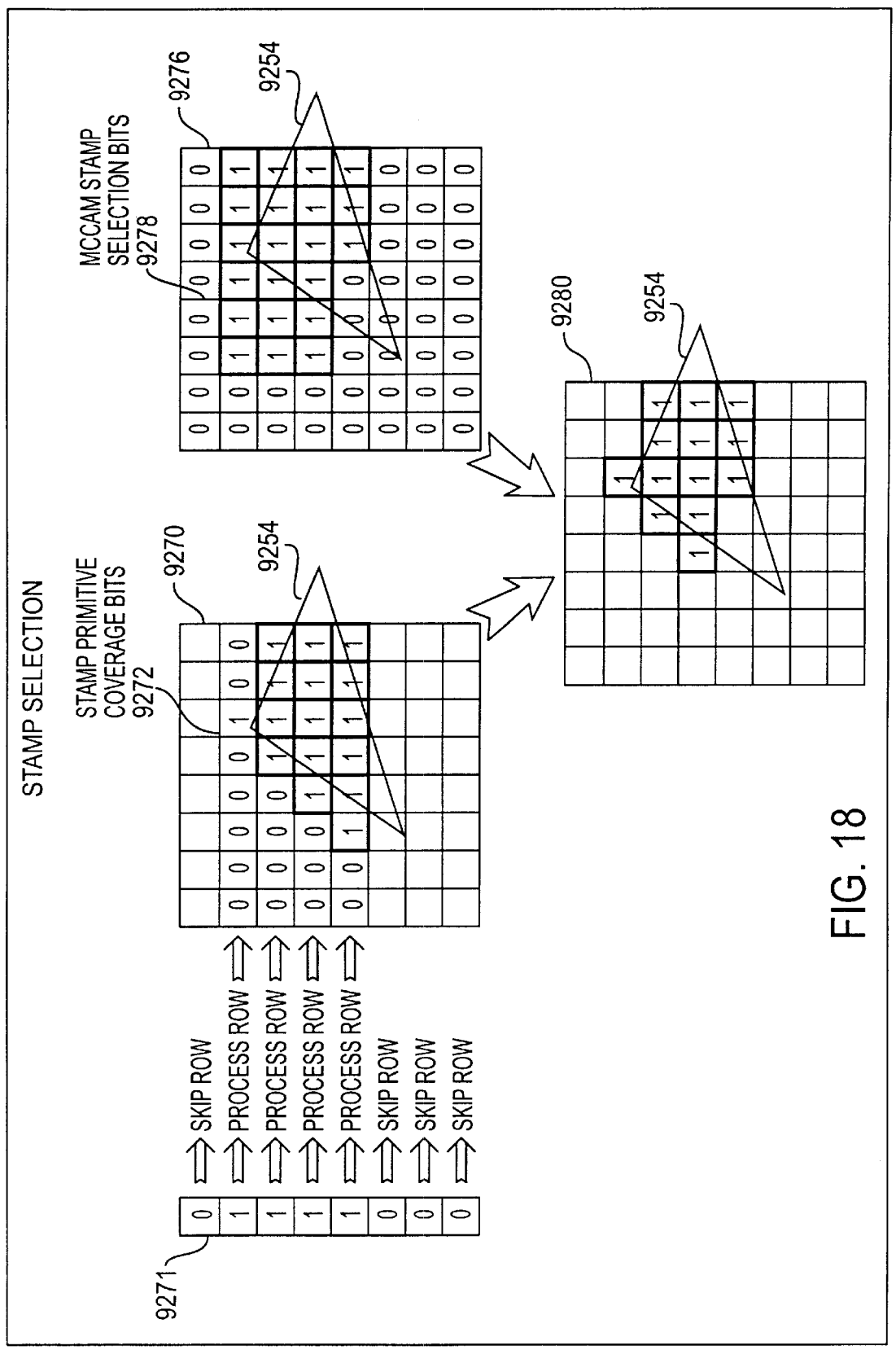
FIG. 18 illustrates an example of a stamp selection process of the conservative hidden surface removal method according to one embodiment of the present invention.
Figure 19:
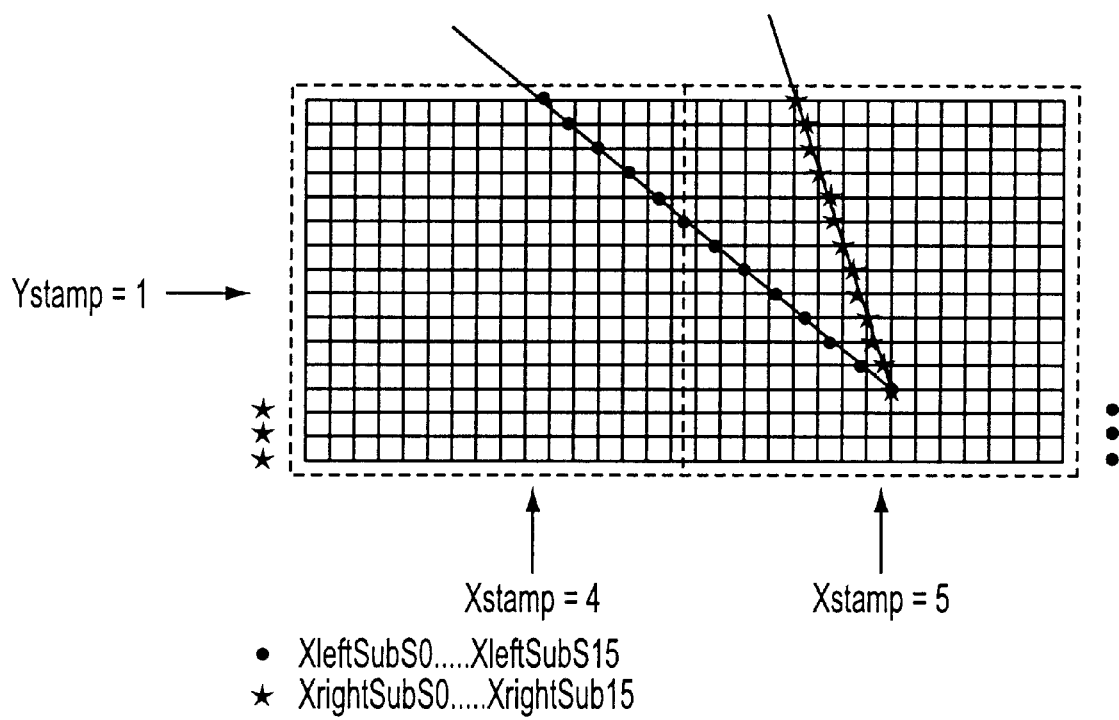
FIG. 19 illustrates an example showing a set of the left most and right most positions of a primitive each subraster line that contains at least one sample point.

Subrasterizer 9052 is the unit that does the edge walking (actually, the computation is not iterative, as the term "walking" would imply). Each cycle, Subrasterizer 9052 obtains a packet from MCCAM Cull 9002. One type of packet received by the Cull block is the Setup Output Primitive Packet, illustrated in FIG. 15. Setup Output Primitive Packets include row numbers and row masks generated by MCCAM Cull 9002 which indicate the potentially visible stamps in each row. Subrasterizer 9052 also receives the vertex and slope data it needs to compute the the left most and right most positions of the primitive in each subraster line that contains at least one sample point, $XleftSubS_i$ and $XrightSub_i$. Subrasterizer 9052 decodes the PrimitiveType field in the Setup Output Primitive Packet to determine if a primitive is a triangle, a line or a point, based on this information Subrasterizer 9052 determines whether the primitive is anti-aliased. Referring to FIG. 18, for each row of stamps that MCCAM Cull indicates is potentially visible (using the row selection bits 9271), Subrasterizer 9052 simultaneously computes the $XleftSub_i$ and $XrightSub_i$ for each of the sample points in the stamp, in a preferred embodiment there are 16 samples per stamp, step 9170. Each pair of $XleftSub_i$ and $XrightSub_i$ define a set of stamps in the row that is touched by the primitive, which are referred to as a sample row mask. For example, FIG. 19 illustrates a set of $XleftSub_i$ and $XrightSub_i$.

Referring to FIG. 18, each stamp in the potentially visible rows that is touched by the primitive is indicated by setting the corresponding stamp coverage bit 9272 to a one ("1"), as shown in tile 9270. Subrasterizer 9052 logically OR's the sixteen row masks to get the set of stamps touched by the primitive. Subraster 9052 then ANDs the touched stamps with the stamp selection bits 9278, as shown in tile 9276, to form one touched 'stamp list, which is shown in tile 9280, step 9172. The Subrasterizer passes a request to MCCAM Cull for each stamp row, and receives a potentially visible stamp list from MCCAM Cull. The visible stamp list is combined with the touched stamp list, to determine the final potentially visible stamp set in a stamp row, step 9174. For each row, the visible stamp set is sent to the Column Selection block 9054 of Stamp Selection Logic unit 9008. The Subrasterizer can process one row of stamps per cycle. If a primitive contains more than one row of stamps then the Subrasterizer takes more than one cycle to process the primitive and therefore will request MCCAM to stall the removal of primitives from the Input FIFO. The Subrasterizer itself can be stalled if a request is made by the Column Selection unit.

Figure 20:
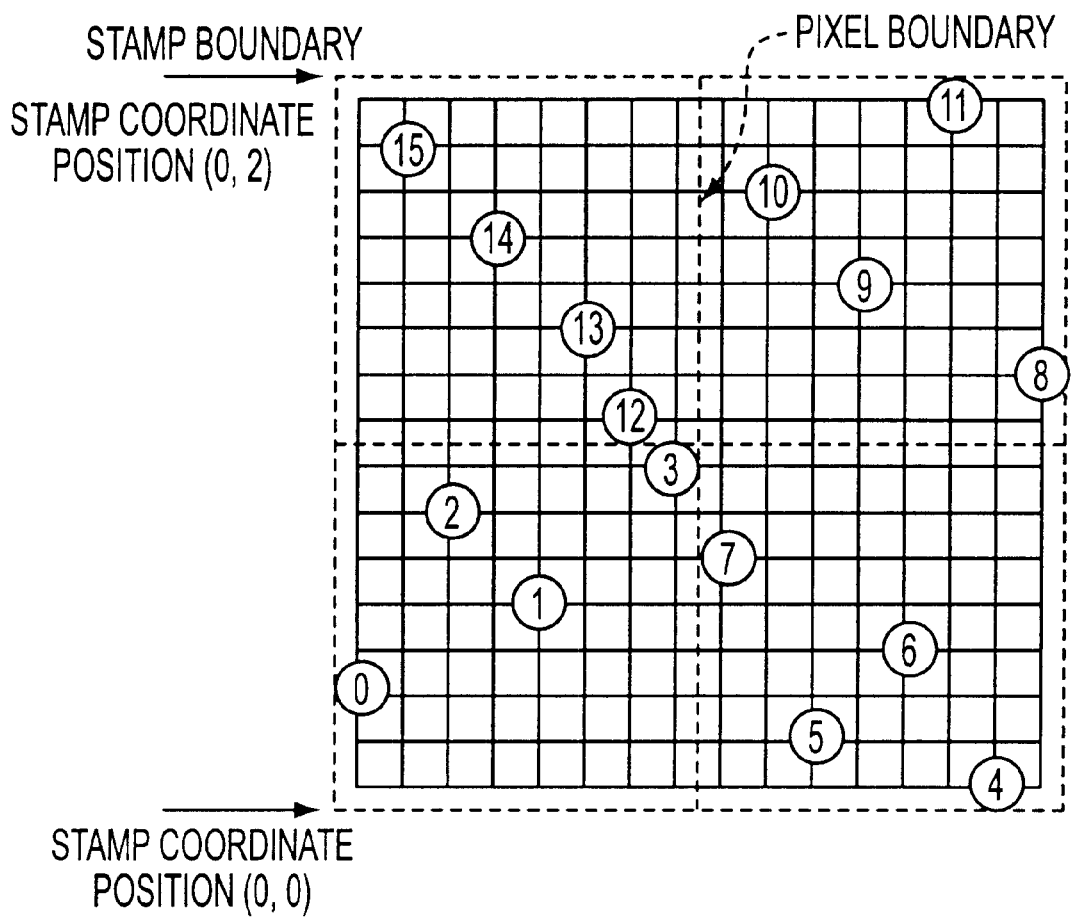
FIG. 20 illustrates a stamp containing four pixels.

FIG. 20 illustrates a stamp 9291, containing four pixels 9292, 9293, 9294 and 9295. Each pixel is divided into 8×8 subraster grid. The grid shown in FIG. 20 shows grid lines located at the mid-point of each subraster step. In one embodiment, samples are located at the center of a unit grid, as illustrated by samples 0–15 in FIG. 20 designated by the circled numbers (e.g. ①). Placing the samples in this manner, off grid bygone half of a subraster step, avoids the complications of visibility rules that apply to samples on the edge of a polygon. In this embodiment, polygons can be defined to go to the edge of a subraster line or pixel boundary, but samples are restricted to positions off of the subraster grid. In a further embodiment, two samples in adjacent pixels are placed on the same subraster. This simplifies sample processing by reducing the number of $XleftSub_i$ and $XrightSub_i$ by a factor of two.

7.0.5 Column Selection within Stamp Selection Logic

Tthe Column Selection unit 9054, shown in FIG. 14, tells the Z Cull unit 9012 which stamp to process in each clock cycle. If a stamp row contains more than one potentially visible stamp, the Column Selection unit requests that the Subrasterizer stall.

7.0.6 Z Cull

The Z Cull unit 9012 contains the Sample Z Buffer unit 9055 and Z Cull Sample State Machines 9057, shown in FIG. 14. The Sample Z Buffer unit 9055 stores all the data for each sample in a tile, including the z value for each sample, and all the the sample FSM state bits. To enable the Z Cull Sample State Machines 9057 to process one stamp per cycle, Z Cull unit 9012 accesses the z values for all 16 sample points in a stamp in parallel and also computes the new primitive's z values at those sample points in parallel.

Z Cull unit 9012 determines whether a primitive covers a particular sample point i by comparing the sample point x coordinate, $Xsample_i$, with the $XlefSub_i$ and $XrightSub_i$ values computed by the Subrasterizer. Sample i is covered if and only if $XlefSub_i \leq Xsample_i < XrightSub_i$, step 9178. Z Cull unit 9012 then computes the z value of the primitive at those sample points, step 9180, and compares the resulting z values to the corresponding z values stored in the Sample Z Buffer for that stamp, step 9182. Generally if the sample point z value is less than the z value in the Z Buffer then the sample point is considered to be visible. However, an API can allow programmers to specify the comparison function ($>$, $\geq$, $<$, $\leq$, always, never). Also, the z comparison can be affected by whether alpha test or blending is turned on, and whether the pipeline is in sorted transparency mode.

The Z Cull Sample State Machines 9057 includes a per-sample FSM for each sample in a stamp. In an embodiment where each stamp consists of 16 samples, there are 16 Z Cull Sample State Machines 9057 that each determine in parallel how to update the z value and sample state for the sample in the Z buffer it controls, and what action to take on the previously processed VSPs that overlap the sample point. Also in sorted transparency mode the Z Cull Sample State Machines determine whether to perform another pass through the transparent primitives.

Based on the results of the comparison between the z value of the primitive at the sample points and the corresponding z values stored in the Sample Z Buffer for that stamp, the current Cull mode bits and the states of the sample state machines, the Sample Z Buffer is updated, step 9184. For each sample, the sixteen Z Cull Sample State Machines output the control bits: KeepOld, SendOld, NewVSPMask, and SendNew, to indicate how a sample is to be processed, step 9186. The set of NewVSPMask bits (16 of them) constitute a new stamp portion (SP) coverage mask, step 9188. The new stamp portion is dispatched to the New VSP Queue. In the event that the primitive is not visible at all in the stamp (all NewVSPMask bits are FALSE), then nothing is sent to the New VSP Queue. If more than one sample may affect the final sample position final value, then the stamp portions containing a sample for the sample position are early dispatched, step 9192. All of the control bits for the 16 samples in a stamp are provided to Stamp Portion Memory 9018 in parallel.

Samples are sent down the pipeline in VSPs, e.g. as part of a group comprising all of the currenlty visible samples in a stamp. When one sample within a stamp is dispatched (either early dispatch or end-of-tile dispatch), other samples within the same stamp and the same primitive are also dispatched as a VSP. While this causes more samples to be sent down the pipeline, it generally causes a net decrease in the amount of color computation. This is due to the spatial coherence within a pixel (i.e., samples within the same pixel tend to be either visible together or hidden together) and a tendency for the edges of polygons with alpha test, color test, stencil test, and/or alpha blending to potentially split otherwise spatially coherent stamps. That is, sending additional samples down the pipeline when they do not appreciably increase the computational load is more than offset by reducing the total number of VSPs that need to be sent.

Figure 21A:
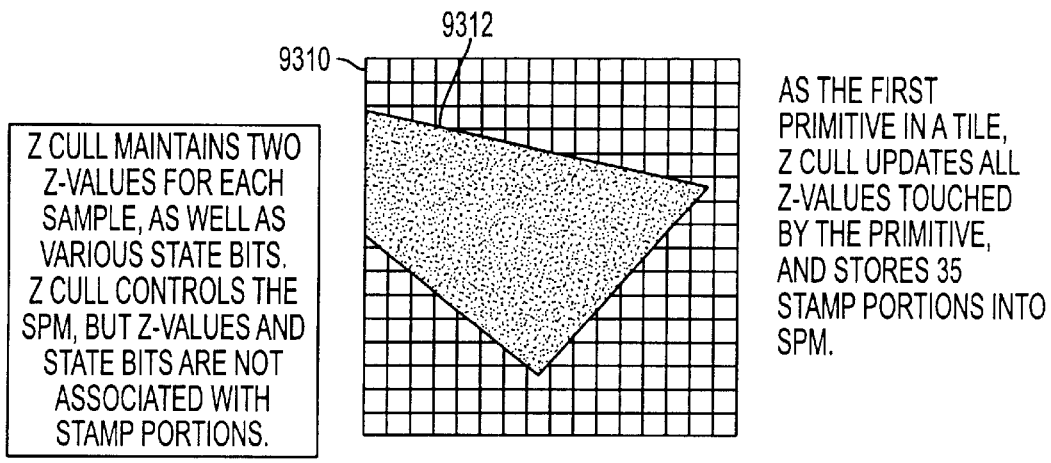
FIGS. 21A–21D illustrate an example of the operation of the Z Cull unit.
Figure 21B:
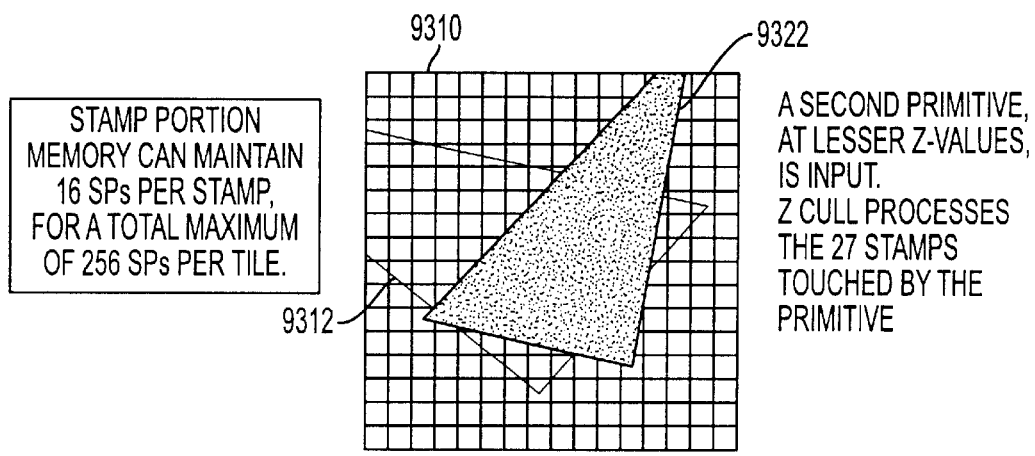
Figures 21C, 21D:
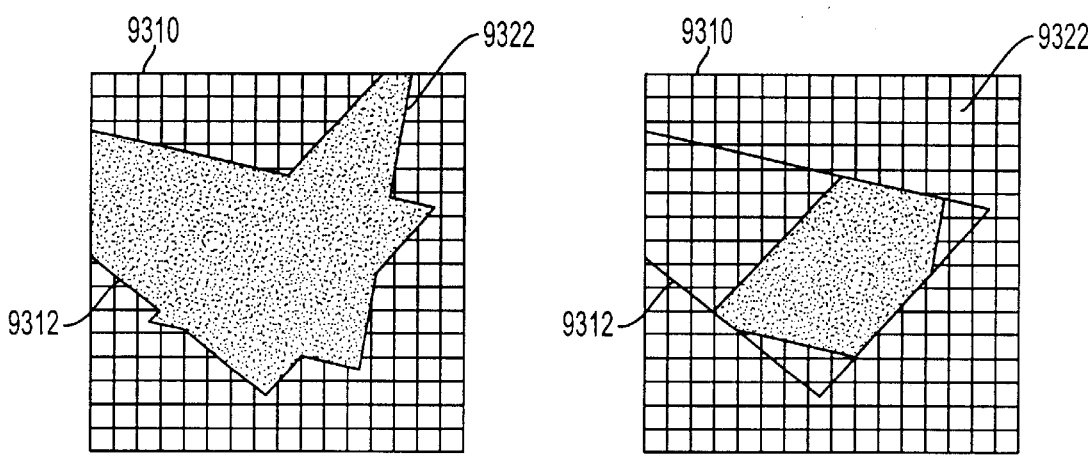

FIGS. 21A–21D illustrate an example of the operation of an embodiment of Z Cull 9012. As illustrated in FIG. 21A primitive 9312 is the first primitive in tile 9310. Z Cull 9012 therefore updates all the z values touched, by the primitive and stores 35 stamp portions into Stamp Portion Memory 9018. In FIG. 21B a second primitive 9322 is added to tile 9310. Primitive 9322 has lower z values than primitive 9312. Z-Cull 9012 processes the 27 stamps touched by primitive 9322. FIG. 21C illustrates the 54 stamp portions stored in Stamp Portion Memory 9018 after primitive 9322 is processed. The 54 stamp portions are the sum of the stamps touched by primitives 9312 and 9322 minus eight stamp portions from primitive 9312 that are completely removed. Region 9332 in FIG. 21D indicates the eight stamp portions that are removed, which are the stamp portions wherein the entire component of the stamp portion touched by primitive 9312 is also touched by primitive 9322 which has lesser Z values.

In one embodiment, Z Cull 9012 maintains one z value for each sample, as well as various state bits. In another embodiment, Z Cull 9012 maintains two z values for each sample, the second z value improves the efficiency of the conservative hidden surface removal process. Z Cull 9012 controls Stamp Portion Memory 9018, but z values and state bits are not associated with stamp portions. Stamp Portion Memory 9018 can maintain 16 stamp portions per stamp, for a total of 256 stamp portions per tile.

Z Cull 9012 outputs the four bit control signal (SendNew, KeepOld and SendOld and NewVSPMask) to Stamp Portion Memory 9018 that controls how the sample is processed. KeepOld indicates that the corresponding sample in Stamp Portion Memory 9018 is not invalidated. That is, if the sample is part of a stamp portion in Stamp Portion Memory 9018, it is not discarded. SendOld is the early dispatch indicator. If the sample corresponding to a SendOld bit belongs to a stamp portion in Stamp Portion Memory 9018, then this stamp portion is sent down the pipeline. SendOld is only asserted when KeepOld is asserted. NewVSPMask is asserted, when the Z Cull 9012 process determines this sample is visible (at that point in the processing) and a new stamp portion needs to be created for the new primitive, which is done by Stamp Portion Memory 9018 when it receives the signal. SendNew is asserted when the Z Cull 9012 process determines the sample is visible (at that point in the processing) and needs to be sent down the pipeline. SendNew causes an early dispatch of a stamp portion in the new primitive.

Figure 22:
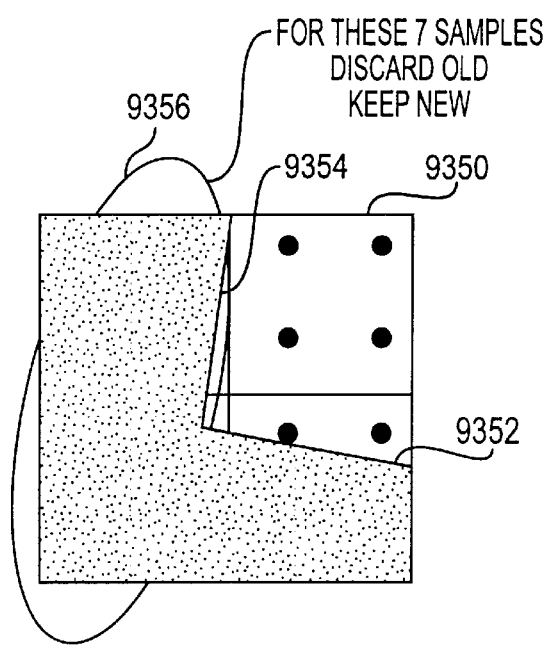
FIG. 22 illustrates an example of how samples are processed by the Z Cull unit.

FIG. 22 illustrates an example of how samples are processed by Z Cull 9012. Primitive 9352 is processed in tile 9350 before primitive 9354. Primitive 9354 has lesser z values than primitive 9352 and is therefore in front,of primitive 9352. For the seven samples in oval region 9356 Z Cull 9012 sets the KeepOld control bits to zero, and the NewVSPMask control bits to one.

FIGS. 23A–23D illustrate an example of early dispatch. Early dispatch is the sending of geometry down the pipeline be fore all geometry in the tile has been processed. In sorted transparency mode early dispatch is not used. First a single primitive 9372, illustrated in FIG. 23A is processed in tile 9370. Primitive 9370 touches 35 stamps, and these are stored in Stamp Portion Memory 9018. A second primitive, 9382, with lesser z values is then added with the mode bit DoABlend asserted. The DoABlend mode bit indicates that the colors from the overlapping stamp portions should be blended. Z Cull 9012 then processes the 27 stamps touched by primitive 9382. Z Cull 9012 can be designed so that samples from up to N primitives can be stored for each stamp. In one embodiment samples from only one primitive are stored for each stamp. FIG. 23C illustrates the stamp portions in Stamp Portion Memory 9018 after primitive 9382 is processed. FIG. 23D illustrates the 20 visible stamp portions touched by region 9374 that are dispatched early from primitive 9372 because the stamp portion z values were replaced by the lesser z values from primitive 9382.

Figure 24:
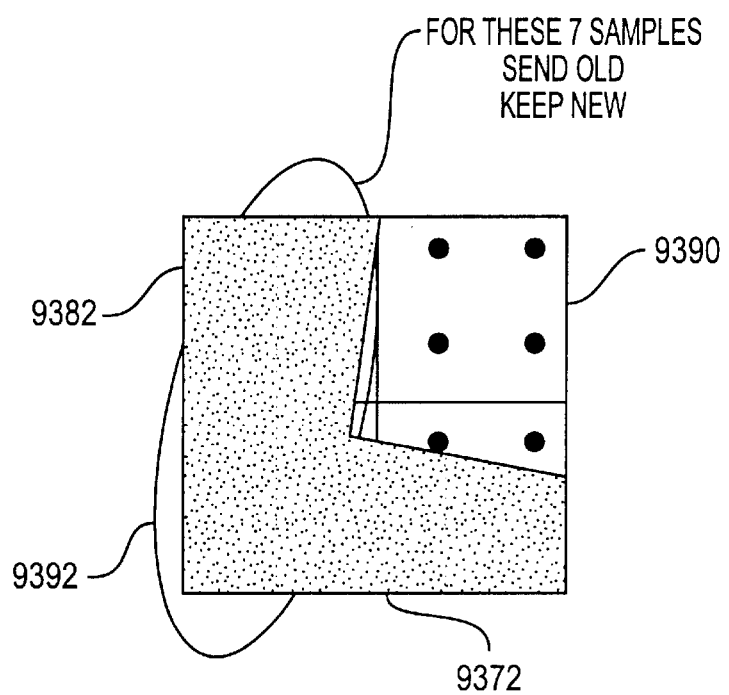
FIG. 24 illustrates a sample level example of early dispatch processing.

FIG. 24 illustrates a sample level example of early dispatch processing. Stamp 9390 includes part of primitive 9382 and part of primitive 9372, both of which are shown in FIG. 23B. The samples in region 9392 all are touched by primitive 9382 which has lesser z values than primitive 9372. Therefore, for these seven samples Z Cull 9012 outputs the control signal SendOld. In one embodiment, if Z Cull 9012 determines that one sample in a stamp should be sent down the pipeline then Z Cull 9012 sends all of the samples in that stamp down the pipeline so as to preserve spatial coherency. This is also minimizes the number of fragments that are sent down the pipeline. In another embodiment this approach is applied at a pixel level, wherein if Z Cull 9012 determines that any sample in a pixel should be sent down the pipeline all of the samples in the pixel are sent down the pipeline.

In a cull process where everything in a scene is an opaque surface, after all the surfaces have been processed, only the stamp portions that are visible are left in Stamp Portion Memory 9018. The known visible stamp portions are then sent down the pipeline. However, when an early dispatch occurs, the early dispatch stamp portions are sent down the pipeline right away.

For each stamp a reference called Zref is generated. In one embodiment, the Zref is placed at the center of the stamp. The values $\partial z/\partial x$ and $\partial z/\partial y$ at the Zref point are also computed. These three values are sent down the pipeline to Pixel block 15000. Pixel block 15000 does a final z test. As part of the final z test, Pixel block 15000 re-computes the exactly equivalent z values for each sample using the Zref value and the $\partial z/\partial x$ and $\partial z/\partial y$ values using the equation:

$$z_1 = Zref + \frac{\partial z}{\partial y}(y_1 - y_{ref}) + \frac{\partial z}{\partial x}(x_1 - x_{ref})$$

Computing the z values rather than sending the 16 z values in every stamp down the pipeline significantly reduces the bandwith used. Furthermore, only the z values of potentially visible samples are determined. To ensure that Z Cull 9012 and Pixel block 15000 use exactly the same z values, Z Cull 9012 performs the same computations that Pixel block does to determine the z value for each stamp so as to avoid introducing any artifacts. To improve the computational efficiency a small number of bits can be used to express the delta x and delta (values, since the distances are only fractions of a pixel. For example, in one embodiment a 24 bit derivative and 4 bit delta values are used.

7.0.7 MCCAM Update

MCCAM Update unit 9059, shown in FIG. 14, determines the maximum of the sixteen updated z values for the sixteen sample points in each stamp and sends it to the MCCAM Cull unit to update the MCCAM array 9003.

7.0.8 New VSP Queue

Each clock cycle, Z Cull unit 9012 generates the four sets of four control bits (KeepOld, SendOld, NewVSPMask, and SendNew) per stamp portion. Thus Z Cull 9012 processes one stamp per primitive per cycle, but not all of the stamps processed are visible, only the Visible Stamp Portions (VSPs) are sent into New VSP Queue 9058. The input rate to New VSP Queue 9058 is therefore variable. Under "ideal" circumstances, the SPM Mask and Valid unit 9060 can store one new stamp portion every clock cycle. However, the SPM Mask and Valid unit 9060 requires multiple clocks for a new stamp portion when early dispatch of VSPs occurs. When VSPs are dispatched early, New VSP Queue 9058 stores the new stamp portions, thus allowing Z Cull 9012 to proceed without stalling. One new VSP may cause the dispatch of up to 16 old VSPs, so the removal rate from the New VSP Queue is also variable.

In one embodiment, New VSP Queue 9058 is only used with early dispatches. The SPM Mask and Valid unit handles one VSP at a time. The New VSP Queue ensures stamp portions are available for Z Cull 9012 when an early dispatch involves more than one VSP. Based upon performance analysis, typically about 450 stamps are expected to be touched in a tile. The depth complexity of a scene refers to the average number of times a pixel in the scene needs to be rendered. With a depth complexity of two, 225 VSPs would be expected to be provided as output from Z Cull 9012 per tile. Therefore on average about four VSPs are expected per stamp. A triangle with blend turned on covering a 50 pixel area can touch on average three tiles, and the number of stamps it touches within a tile should be less than eight. Therefore, in one embodiment the New VSP Queue depth is set to be 32.

The link between Z Cull unit 9012 and Stamp Portion Memory 9018 through New VSP Queue 9058 is unidirectional. By avoiding using a feedback loop New VSP Queue 9058 is able to process samples in each cycle.

7.0.9 SPM Mask and Valid

The active Stamp Portion Memory (SPM) Mask and Valid unit 9060 stores the VSP coverage masks for the tile. Each VSP entry includes a valid bit to indicate if there is a valid VSP stored there. The valid bits for the VSPs are stored in a separate memory. The Stamp Portion Memory Mask and Valid unit 9060 is double buffered (i.e. there are two copies 9060 and 9062) as shown in FIG. 14. The Memory Mask and Valid Active State unit 9060 contains VSPs for the current tile while the Memory Mask and Valid Dispatch State unit page 9062 contains VSPs from the previous tile (currently being dispatched). As a new VSP is removed from the New VSP Queue, the active state SPM Mask and Valid unit 9060 updates the VSP Mask for the VSPs that already exist in its mask memory and adds the new VSP to the memory content. When color blending or other conditions occur that require early dispatch, the active state SPM Mask and Valid unit dispatches VSPs through the active SPM Data unit 9064 to the dispatch queue. The operations performed in the mask update or early dispatch are controlled by the KeepOld, SendOld, SendNew and NewVSPMask control bits generated in Z Cull 9012. In sorted transparency mode, the SendOld and SendNew mask bits are off. VSP coverage masks are mutually exclusive, therefore if a new VSP has a particular coverage mask bit turned on, the corresponding bit for all the previously processed VSPs in the stamp have to be turned off.

The state transition from active to dispatch and vice versa is controlled by mode packets. Receiving a packet signaling the end of a tile (Begin Tile, End Frame, Buffer Clear, or Cull Packet with CullFlushAll set to TRUE) causes the active state Stamp Portion Memory to switch over to dispatch state and vice versa. The page in dispatch state cycles through each stamp and sends all VSPs to the SPM Data unit, which forwards them to the dispatch queue. In an alternative embodiment, the Stamp Portion Memory Mask and Valid unit 9060 is triple buffered.

7.0.9.1 The SPM Data

The active Stamp Portion Memory Data unit 9064 stores the Zstamp, dz/dx, dz/dy and the Color Pointer for every VSP in the tile. The Stamp Portion Memory Data unit is also double buffered. The SPM Mask and Valid unit 9060 sends new VSP information to the SPM Data unit 9064. The VSP information includes control signals that instruct the SPM Data unit 9064 to either send the new VSP or save the new VSP to its memory. If the new VSP should be saved, the SPM Mask and Valid unit control signals also determine which location among the 16 possible slots the new VSP should occupy. In addition, for the case of early dispatch, the SPM Data unit also gets a list of old VSP locations and the associated VSP Masks that need early dispatch. The SPM Data unit first checks to see if there are any old VSPs that need to be dispatched. If the SPM Data unit finds any, it will read the VSP data from its memory, merge the VSP data with the VSP Mask sent from the SPM Mask and Valid unit, and put the old VSPs into the dispatch queue.

The SPM Data unit then checks if the new VSP should also be sent, and if it is affirmative, then it passes the new VSP data to the dispatch queue 9068. If the new VSP should not be sent, then the SPM Data unit writes the new VSP data into its memory.

7.0.10 The Dispatch Queue and Dispatch Logic The Dispatch Logic unit 9072 sends one entry's worth of data at a time from one of the two SPM dispatch queues, 9068, 9070 to the Mode Injection unit 10000. The Dispatch Logic unit 9072 requests dispatch from the dispatch state SPM unit first. After the dispatch state SPM unit has exhausted all of its VSPs, the Dispatch Logic unit 9072 requests dispatch from the active state SPM dispatch queue.

7.1 Alpha Test,

Alpha test compares the alpha value of a given pixel to an alpha reference value. The alpha reference value is often used to indicate the transparency value of a pixel. The type of comparison may be specified, so that for, example the comparison may be a greater-than operation, a less-than operation, or other arithmetic, algebraic, or logical comparison, and so forth. If the comparison is a greater-than operation, then a pixel's alpha value has to be greater than the reference to pass the alpha test. For instance, if a pixel's alpha value is 0.9, the reference alpha is 0.8, and the comparison is greater-than, then that pixel passes the alpha test. Any pixel not passing the alpha test is discarded.

Figure 25:
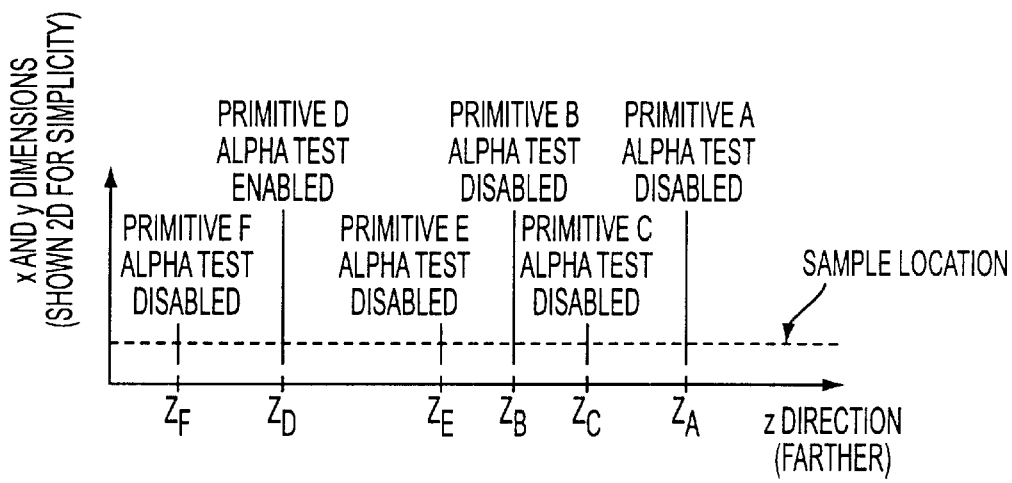
FIG. 25 illustrates an example of processing samples with alpha test with a CHSR method according to one embodiment of the present invention.

Alpha test is a per-fragment operation and in a preferred embodiment is performed by the Pixel block after all of the fragment coloring calculations, lighting operations and shading operations are completed. FIG. 25 illustrates an example of processing samples with alpha test with a CHSR method. This diagram illustrates the rendering of six primitives (Primitives A, B, C, D, E, and F) at different z coordinate locations for a particular sample, rendered in the following order (starting with a "depth dear" and with "depth test" set to less-than): primitives A, B, and C (with alpha test" disabled); primitive D (with "alpha test" enabled); and primitives E and F (with "alpha test" disabled). Note from the illustration that $z_A > z_C > z_B > z_E > z_D > z_F$, such that primitive A is at the greatest z coordinate distance. Also note that alpha test is enabled for primitive D, but disabled for each of the other primitives.

The steps for rendering these six primitives under a conservative hidden surface removal process with alpha test are as follows:

Step 1: The depth clear causes the following result in each sample finite state machine: 1) z values are initialized to the:maximum value; 2) primitive information is cleared; and 3) sample state bits are set to indicate the z value is accurate.

Step 2: When primitive A is processed by the sample FSM, the primitive is kept (i.e., it becomes the current best guess for the visible surface), and this causes the sample FSM to store: 1) the z value $Z_A$ as the near" z value,; 2) primitive information needed to color primitive A; and 3) the z value ($Z_A$) is labeled as accurate.

Step 3: When primitive B is processed by the sample FSM, the primitive is kept (its z value is less-than that of primitive A), and this causes the sample FSM to store: 1) the z value $Z_B$ as the "near" z value ($Z_A$ is discarded); 2) primitive information needed to color primitive B (primitive A's information is discarded); and 3) the z value ($Z_B$) is labeled as accurate.

Step 4: When primitive C is processed by the sample FSM the primitive is discarded (i.e., it is obscured by the current best guess for the visible surface, primitive B), and the sample FSM data is not changed.

Step 5: When primitive D (which has alpha test enabled) is processed by the sample FSM, the primitive's visibility cannot be determined because it is closer than primitive B and because its alpha value is unknown at the time the sample FSM operates. Because a decision cannot be made as to which primitive would end up being visible (either primitive B or primitive D) primitive B is early dispatched down the pipeline (to have its colors generated) and primitive D is kept. When processing of primitive D has been completed, the sample FSM stores: 1) the "near" z value is $z_D$ and the "far" z value is $Z_B$ 2) primitive information needed to color primitive D (primitive B's information has undergone early dispatch); and 3) the z values are labeled as conservative (because both a near and far are being maintained). In this condition, the sample FSM can determine that a piece of geometry closer than $z_D$ obscures previous geometry, geometry farther than z. is obscured, and geometry between $z_D$ and $Z_B$ is indeterminate and must be assumed to be visible (hence a conservative assumption is made). When a sample FSM is in the conservative state and it contains valid primitive information, the sample FSM method considers the depth value of the stored primitive information to be the near depth value.

Step 6: When primitive E (which has alpha test disabled) is processed by the sample FSM, the primitive's visibility cannot be determined because it is between the near and far z values (i.e., between $z_D$ and $Z_B$). However, primitive E is not sent down the pipeline at this time because it could result in the primitives reaching the z buffered blend (part of the Pixel block in a preferred embodiment) out of correct time order. Therefore, primitive D is sent down the pipeline to preserve the time ordering. When processing of primitive E has been completed, the sample FSM stores: 1) the "near" z value is $z_D$ and the "far" z value is $z_B$ (note these have not changed, and $Z_E$ is not kept); 2) primitive information needed to color primitive E (primitive D's information has undergone early dispatch); and 3) the z values are labeled as conservative (because both a near and far are being maintained).

Step 7: When primitive F is processed by the sample FSM, the primitive is kept (its z value is less-than that of the near z value), and this causes the sample FSM to store: 1) the z value $Z_F$ as the "near" z value ($z_D$ and $Z_B$ are discarded); 2) primitive information needed to color primitive F (primitive E's information is discarded); and 3) the z value ($Z_F$) is labeled as accurate.

Step 8: When all the geometry that touches the tile has been processed (or, in the case there are no tiles, when all the geometry in the frame has been processed), any valid primitive information is sent down the pipeline. In this case, primitive F's information is sent. This is the end-of-tile (or end-of-frame) dispatch, and not an early dispatch.

In summary in this CHSR process example involving alpha test, primitives A through F are processed, and primitives B, D, and F are sent down the pipeline. The Pixel block resolves the visibility of B, D, and F in the final z buffer blending stage. In this example, only the color primitive F is used for the sample.

7.1.0.1 Stencil Test

In OpenGL® stencil test conditionally discards a fragment based on the outcome of a comparison between a value stored in a stencil buffer at location ($x_w$, $Y_w$) and a reference value. Several stencil comparison functions are permitted such that whether the stencil test passes can depend upon whether the reference value is less than, less than or equal to, equal to, greater than or equal to, greater than, or not equal to the masked stored value in the stencil buffer. In OpenGL®, if the stencil test fails, the incoming fragment is discarded. The reference value and the comparison value can have multiple bits, typically 8 bits so that 256 different values may be represented. When an object is rendered into Frame Buffer 11000, a tag having the stencil bits is also written into the frame buffer. These stencil bits are part of the pipeline state. The type of stencil test to perform can be specified at the time the geometry is rendered.

The stencil bits are used to implement various filtering, masking or stenciling operations, to generate, for example, effects such as shadows. If a particular fragment ends up affecting a particular pixel in the frame buffer, then the stencil bits can be written to the frame buffer along with the pixel information.

In a preferred embodiment of the CHSR process, all stencil operations are done near the end of the pipeline in the Pixel block in a preferred embodiment. Therefore, the stencil values are stored in the Frame Buffer and as a result the stencil values are not available to the CHSR method performed in the Cull block. While it is possible for the stencil values to be transferred from the Frame Buffer for use in the CHSR process, this would generally require a long latency path that would reduce performance. In APIs such as OpenGL®, the stencil test is performed after alpha test, and the results of alpha test are not known to the CHSR process. Furthermore, renderers typically maintain stencil values over many frames (as opposed to depth values that are generally cleared at the start of each frame). Hence, the CHSR process utilizes a conservative approach to dealing with stencil operations. If a primitive can affect the stencil values in the frame buffer, then the VSPs in the primitive are always sent down the pipeline by the Cull block asserting the control bit CullFlushOverlap, shown in FIG. 15. Primitives that can affect the stencil values are sent down the pipeline because stencil operations are performed by pipeline stages after Cull block 9000 (see OpenGL® specification). A CullFlushOverlap condition sets the sample FSM to its most conservative state.

Generally the stencil test is defined for a group of primitives. When Cull block 9000 processes the first sample in a primtive with a new stencil test, control software sets the CullFlushAll bit in the corresponding Setup:Output Cull Packet. CullFlushAll causes all of the VSPs from the Cull block to be sent to Pixel block 15000, and clears the z values in Stamp Portion Memory 9018. This "flushing" is needed because changing the stencil reference value effectively changes the "visibility rules" in the z buffered blend (or Pixel block). Pixel block 15000 compares the stencil values of the samples for a given sample location and determines which samples affect the final frame buffer color based on the stencil test. For example, for one group of samples corresponding to a sample location, the stencil test may be render if the stencil bit is equal to one. Pixel block 15000 then discards each of the samples for that sample in this group that have a stencil bit value not equal to one.

Figure 26:
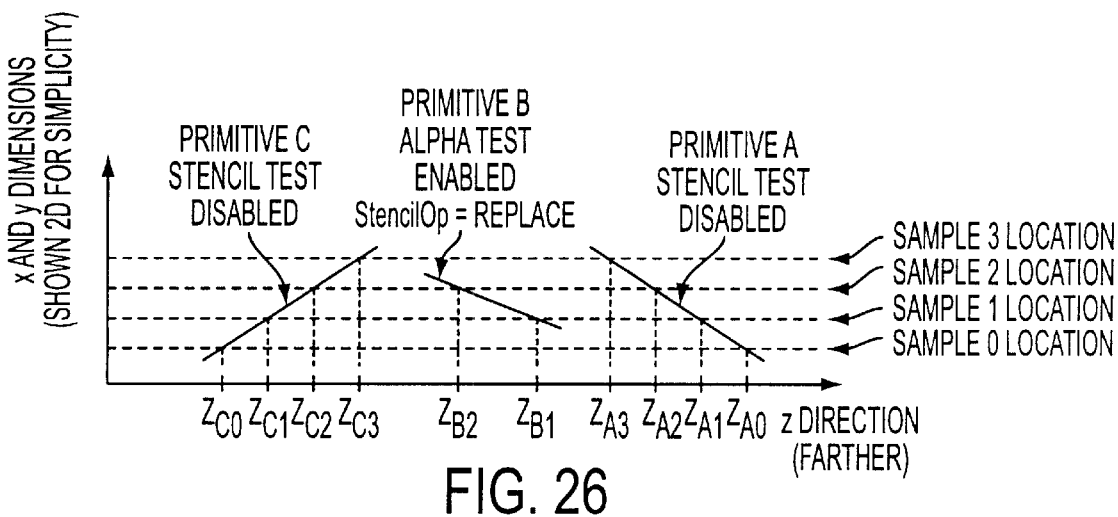
FIG. 26, illustrates aspects of stencil testing relative to rendering operations for an embodiment of CHSR.

As an example of the CHSR process dealing with stencil test (see OpenGL® specification), consider the diagrammatic illustration of FIG. 26, which has two primitives (primitives A and C) covering four particular samples (with corresponding sample FSMs, referred to as SFSM0 through SFSM3) and an additional primitive (primitive B) covering two of those four samples. The three primitives are rendered in the following order (starting with a depth clear and with depth test set to less-than): primitive A (with stencil test disabled); primitive B (with stencil test enabled and StencilOp set to "REPLACE", see OpenGL® specification); and primitive C (with stencil test disabled). The steps are as follows:

Step 1: The: depth clear causes the following in each of the four sample FSMs in this example: 1) z values are initialized to the maximum value; 2) primitive information is cleared; and 3) sample state bits are set to indicate the z,value is accurate.

Step 2: When primitive A is processed by each sample FSM, the primitive is kept (i.e., it becomes the current best guess for the visible surface), and this causes the four sample FSMs to store: 1) their corresponding z values (either $Z_{A0}$, $Z_{A1}$, $z_{A2}$, or $Z_{A3}$ respectively) as the "near" z value; 2) primitive information needed to color primitive A; and 3) the z values in each sample FSM are labeled as accurate.

Step 3: When primitive B is processed by the sample FSMs, only samples 1 and 2 are affected, causing SFSM0 and: SFSM3 to be unaffected and causing SFSM1 and SFSM2 to be updated as follows: 1) the far z values are set to the maximum value and the near z values are set to the minimum value; 2) primitive information for primitives A and B are sent down the pipeline; and 3) sample state bits are set to indicate the z values are conservative.

Step 4: When primitive C is processed by each sample FSM, the primitive is kept, but the sample FSMs do not all handle the primitive the same way. In SFSM0 and SFSM3, the state is updated as: 1) $Z_{co}$ and $Z_{C3}$ become the "near" z values ($z_{A0}$ and $z_{A3}$ are discarded); 2) primitive information needed to color primitive C (primitive A's information is discarded); and 3) the z values are labeled as accurate. In SFSM1 and SFSM2, the state is updated as: 1) $Z_{c1}$ and $Z_{c2}$ become the "far" z values (the near z values are kept); 2) primitive information needed to color primitive C; and 3) the z values remain labeled as conservative.

In summary in this CHSR process example involving stencil test, primitives A through C are processed, and all the primitives are sent down the pipeline, but not all the samples. In a preferred embodiment, the Pixel blocks performs final z buffered blending operations to process the unresolved visibility issues. Multiple samples were shown in this example to illustrate that CullFlushOverlap "flushes" selected samples while leaving others unaffected.

7.1.0.2 Alpha Blending

Alpha blending is used to combine the colors of two primitives into one color. However, the primitives are still subject to the depth test for the updating of the z values. The amount of color contribution from each of the samples depends upon the transparency values, referred to as the alpha value, of the samples. The blend is performed according to the equation $$C = C_s \alpha_s + C_d(1-\alpha_s)$$

where C is the resultant color, $C_s$ is the source color for an incoming primitive sample, $\alpha_s$ is the alpha value of the incoming primitive sample, and $C_d$ is the destination color at the corresponding frame buffer location. Alpha values are defined at the vertices of primitives, and alpha values for samples are interpolated from the values at the vertices.

Figure 27:
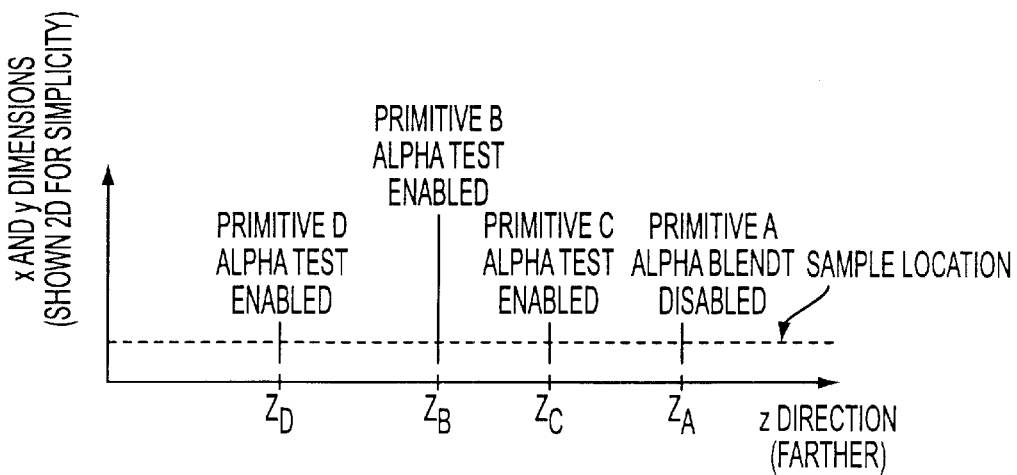
FIG. 27 illustrates aspects of alpha blending relative to rendering operations for an embodiment of CHSR.

As an example of the CHSR process dealing with alpha blending, consider FIG. 27, which has four primitives (primitives A, B, C, and D) for a particular sample, rendered in the following order (starting with a depth clear and with depth test set to less-than): primitive A (with alpha blending disabled); primitives B and C (with alpha blending enabled); and primitive D (with alpha blending disabled). The steps are as follows:

Step 1: The depth clear causes the following in each CHSR sample FSM: 1) z values are initialized to the maximum value 2) primitive information is cleared; and 3) sample state bits are set to indicate the z value is accurate.

Step 2: When primitive A is processed by the sample FSM, the primitive is kept (i.e., it becomes the current best guess for the visible surface), and this causes the sample FSM to store: 1) the z value $Z_A$ as the "near" z value; 2) primitive information needed to color primitive A; and 3) the z value is labeled as accurate.

Step 3: When primitive B is processed by the sample FSM, the primitive is kept (because its z value is less-than that of primitive A), and this causes the sample FSM to store: 1) the z value $z_B$ as the "near" z value ($Z_A$ is discarded); 2) primitive information needed to color primitive B (primitive A's information is sent down the pipeline); and 3) the z value ($Z_B$) is labeled as accurate. Primitive A is sent down the pipeline because, at this point in the rendering process, the color of primitive B is to be blended with primitive A. This preserves the time order of the primitives as they are sent down the pipeline.

Step 4: When primitive C is processed by the sample FSM, the primitive is discarded (i.e., it is obscured by the current best guess for the visible surface, primitive B), and the sample FSM data is not changed. Note that f primitives B and C need to be rendered as transparent surfaces, then primitive C should not be hidden by primitive B. This could be accomplished by turning off the depth mask while primitive B is being rendered, but for transparency blending to be correct, the surfaces should be blended in either front-to-back or back-to-front order.

If the depth mask (see OpenGL® specification) is disabled, writing to the depth buffer (i.e., saving z values) is not performed; however, the depth test is still performed. In this example, if the depth mask is disabled for primitive B, then the value $Z_B$ is not saved in the sample FSM. Subsequently, primitive C would then be considered visible because its z value would be compared to $Z_A$.

In summary of this example CHSR process example involving alpha blending, primitives A through D are processed, and all the primitives are sent down the pipeline, but not in all the samples. In a preferred embodiment, the Pixel blocks performs final z buffered blending operations to process the unresolved visibility issues. Multiple samples were shown in this example to illustrate that CullFlushOverlap dispatches selected samples without affecting other samples.

7.1.0.3 Control Bits

Figure 28A:
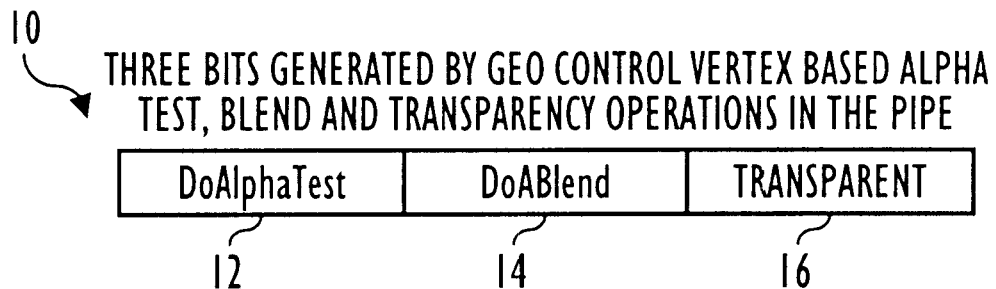
FIG. 28A illustrates part of a Spatial Packet containing three control bits: DoAlphaTest, DoABlend and Transparent.

FIG. 28A illustrates part of a Spatial Packet containing three control bits: DoAlphaTest, DoABlend and Transparent. The Transparent bit is set by the Geometry block 3000 and is normally only used in sorted transparency mode. When the Transparent bit is reset the corresponding primitive is only processed in passes for opaque primitives. When the Transparent bit is set the corresponding primitive is only processed in passes for transparent primitives. The Transparent bit is generated in the Geometry block 3000 and is used by the Sort block 6000 to determine whether a particular primitive should be included in an opaque pass or a transparent pass; but, the Cull block 9000 knows the type of pass (i.e. opaque or transparent) by looking at the Begin Tile packet, so there is no need to send the Transparent bit to the Cull block 9000. The DoAlphaTest control bit controls whether Alpha test is performed on the samples in the primitive.

When the DoAlphaTest control bit is set to a one it means that downstream from Cull block 9000 an alpha test will be performed on each fragment. When the alpha values of all of the samples in a stamp exceed a predetermined value, then even though an application program indicates that an alpha test should be performed, a functional block upstream from Cull block 9000 may determine that none of the samples can fail alpha test. DoAlphaTest can then be set to zero which indicates to Cull block 9000 that since all the samples are guaranteed to pass alpha test, it can process the samples as if they were not subject to alpha test. Observe that in an embodiment where one z value is stored, a sample being subject to alpha test can cause the stored sample to be made conservative. Therefore, DoAlphaTest being zero allows Cull to identify more samples as accurate and thereby eliminate more samples. A detailed description of the control of the DoAlphaTest control bit is provided in the provisional patent application entitled "Graphics Processor with Deferred Shading," filed Aug. 20, 1998, which is incorporated by reference.

The DoABlend control bit, generated by the Geometry block 3000, indicates whether a primitive is subject to blending. Blending combines the color values of two samples.

In one embodiment, the Geometry block 3000 checks the alpha values at each vertex. If, given the alpha values, the BlendEquation and the BlendFunc pipeline state information is defined such that the frame buffer color values cannot affect the final color, then blending is turned off for that primitive using the DoABlend control bit. Observe that if blending was always on, and all primitives were treated as transparent, then a hidden surface removal process before lighting and shading might not not remove any geometry.

The following describes the method for evaluating texture data to determine whether blending can be turned off for a render if less than depth test. With a render if less than depth test, if there are two opaque primitives at the same location, the primitive that is in front is rendered. The present invention can also be used with a render if greater than depth test. Blending is turned off when a primitive is opaque and therefore no geometry behind the primitive will contribute to the corresponding final colors in the frame buffer. Whether a primitive is opaque is determined conservatively in that if there is any uncertainty as to whether the final frame buffer colors will be a blend of the current primitive and other primitives with greater z values, then the primitive is treated as transparent. For example, given an appropriately defined texture environment, if the alpha values at all of the vertices of a primitive are equal to one then blending can be turned off for that primitive because that primitive can be treated as opaque. Therefore, the culling method can be applied and more distant geometry can be eliminated.

Whether blending can be turned off for a primitive depends upon the texture type, the texture data, and the texture environment. In one embodiment there are two texture types. The first texture type is RGB texture. In RGB texture each texel (the equivalent of a pixel in texture space) is defined by a red color component value "R," a green color component value "G," and a blue color component value "B." There are no alpha values, in this first texture type. The second texture type describes each texel by R, G and B values as well as by an alpha value. The texture data comprise the values of the R, G, B and alpha components. The texture environment defines how to determine the final color of a pixel based on the relevant texture data and properties of the primitive. For example, the texture environment may define the type of interpolation that is used, as well as the lighting equation and when each operation is performed.

Figure 28B:
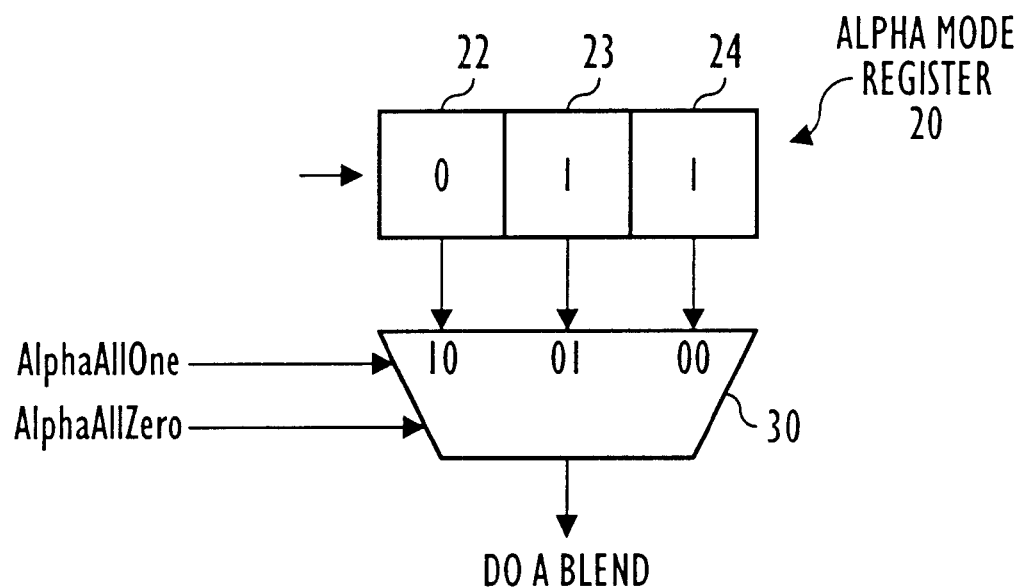
FIG. 28B illustrates how the alpha values are evaluated to set the DoABlend control bit.

FIG. 28B illustrates how the alpha values are evaluated to set the DoABlend control bit. Alpha mode register stores the Transparent bits for each of the three vertices of a triangular primitive. The Transparent bit defines whether the corresponding vertex is transparent indicated by a one, or opaque indicated by a zero. If all three of the vertices are opaque then blending is turned off, otherwise blending is on. Logic block implements this blending control function. When the AlphaAllOne control signal is asserted and all three of the transparent bits in the alpha mode register are equal to one, logic block sets DoABlend to a zero to turn off blending. The alpha value can also be inverted so that an alpha value of zero indicates that a vertex is opaque. Therefore, in this mode of operation, when the AlphaAllZero control signal is asserted and all three of the transparent bits are zero, the logic block sets DoABlend to a zero ("0") to turn off blending.

7.1.0.4 Sorted Transparency Mode

The graphics pipeline operates in either time order mode or in sorted transparency mode. In sorted transparency mode, the process of reading geometry from a tile is divided into multiple passes. In the first pass, the Sort block outputs guaranteed opaque geometry, and in subsequent passes the Sort block outputs potentially transparent geometry. Within each sorted transparency mode pass, the time ordering is preserved, and mode data is inserted into its correct time-order location. Sorted transparency mode can be performed in either back-to-front or front-to-back order. In a preferred embodiment, the sorted transparency method is performed jointly by the Sort block and the Cull block.

In back-to-front sorted transparency modes a pixel color is determined by first rendering the front most opaque surface at the sample location. In the next pass the farthest transparent surface, that is in front of the opaque surface is rendered. In the subsequent pass the next farthest transparent surface is rendered, and this process is repeated until all of the samples at the sample location have been rendered or when a predetermined maximum number of samples have been rendered for the sample location.

The following provides a more detailed description of the back-to-front sorted transparency mode rendering method. This method is used with a render if less than depth test. Referring to FIG. 29, in the first pass the Sort block sends the opaque primitives. Cull block 9000 stores the z values for the opaque primitive samples in MCCAM array 9003 (shown in FIG. 15) (step 2901). The Sort block sends transparent primitives to the Cull block in the second and subsequent passes. In sorted transparency mode MCCAM array 90031 and Sample Z Buffer 9055 each store two z values (Zfar and Znear) for each corresponding sample. The Zfar value is the z value of the closest opaque sample. The Znear value is the z value of the sample nearest to, and less than, the z value of the opaque layer. One embodiment includes two MCCAM arrays :9003 and two Sample Z Buffers 9055 so as to store the Zfar and Znear values in separate units. First the z values for the front-most non-transparent samples are stored in the MCCAM array 9003 (step 2902). The front-most non-transparent samples are then dispatched down the pipeline to be rendered (step 2903). In one embodiment, a flag bit in every pointer indicates whether the corresponding geometry is transparent or non-transparent. The Znear values for each sample are reset to zero (step 2904) in preparation for the next pass. During each transparent pass the z value for each sample point in the current primitive is compared with both the Zfar and the Znear values for that sample point. If the z value is larger than Znear but smaller than Zfar, then the sample is closer to the opaque layer and its z value replaces the current Znear value. The samples corresponding to the new Znear values are then dispatched down the pipeline to be rendered (step 2907), and Zfar for each such sample is set to the value of Znear (step 1908). This process is then repeated in the next pass.

Cull block 900 detects that it has finished processing a tile when for each sample point, there is at most one sample that is in front of Zfar. Transparent layer processing is not finished as long as there are two or more samples in front of Zfar for any sample point in the tile.

In front-to-back sorted transparency modes the transparent samples are rendered in order, starting at the front most transparent sample and then the next farther transparent sample in each subsequent cycle is rendered. An advantage of using a front-to-back sorted transparency mode is that if a maximum number of layers is defined then the front most transparent layers are rendered which thereby provides a more accurate final displayed image.

In one embodiment, the maximum number of layers to render is determined by accumulating the alpha values. The alpha value represents the transparency of the sample location. As each sample is rendered the transparency at that sample location decreases, and the cumulative alpha value increases (where an alpha value of one is defined as opaque). For example, the maximum cumulative alpha value may be defined to be 0.9, when the cumulative alpha value exceeds 0.9 then no further samples at that sample location are rendered.

There are two counters in Sample Z Buffer 9055, shown in FIG. 15, for every sample. When two samples from different primitives at the same sample location have the same z value, the samples are rendered in the time order that they arrived. The counters are used to determine which sample should be rendered based on the time order. The first counter identifies the primitive that is to be processed in the current pass. For example, in a case where there are five primitives all having a sample in a given sample location with the same z value, in the first pass the first counter is set to one which indicates the first primitive in this group should be rendered. In the second pass this first counter is incremented, to identify the second primitive as the primitive to be rendered.

The second counter maintains a count of the primitive being evaluated within a pass. In the five primitive example, in the third pass, the third primitive has the sample that should be rendered. At the start of the first pass the first counter is equal to three and the second counter is equal to one. The first counter value is compared with the second counter value and because the counter values are not equal the sample from the first primitive is not rendered. The second counter is then incremented, but the counters are still not equal so the sample from the second primitive is not rendered. In the third pass, the first and second counter values are equal, therefore the sample from the third primitive is rendered.

Characteristics of Particular Exemplary Embodiments

We now highlight particular embodiments of the inventive deferred shading graphics processor (DSGP). In one aspect (CULL) the inventive DSGP provides structure and method for performing conservative hidden surface removal. Numerous embodiments are shown and described, including but not limited to:

(1) A method of performing hidden surface removal in a computer graphics pipeline comprising the steps of: selecting a current primitive from a group of primitives, each primitive comprising a plurality of stamps; comparing stamps in the current primitive to stamps from previously evaluated primitives in the group of primitives selecting a first stamp as a currently potentially visible stamp (CPVS) based on a relationship of depth states of samples in the first stamp with depth states of samples of previously evaluated stamps; comparing the CPVS to a second stamp; discarding the second stamp when no part of the second stamp would affect a final graphics display image based on the stamps that have been evaluated; discarding the CPVS and making the second stamp the CPVS, when the second stamp hides the CPVS; dispatching the CPVS and making the second stamp the CPVS when both the second stamp and the CPVS are at least partially visible in the final graphics display image; and dispatching the second stamp and the CPVS when the visibility of the second stamp and the CPVS depends on parameters evaluated later in the computer graphics pipeline.

(2) The method of (1) wherein the step of comparing the CPVS to a second stamp furthing comprises the steps of: comparing depth states of samples in the CPVS to depth states of samples in the second stamp; and evaluating pipeline state values. (3) The method of (1) wherein the depth state comprises one z value per sample, and wherein the z value includes a state bit which is defined to be accurate when the z value represents an actual z value of a currently visible surface and is defined to be conservative when the z value represents a maximum z value. (4) The method of (1) further comprising the step of dispatching the second stamp and the CPVS when the second stamp potentially alters the final graphics display image independent of the depth state. (5) The method of (1) further comprising the steps of: coloring the dispatched stamps; and performing an exact z buffer test on the dispatched stamps, after the coloring step. (6) The method of (1) further comprising the steps of: comparing alpha values of a plurality of samples to a reference alpha value; and performing the step of dispatching the second stamp and the CPVS, independent of alpha values when the alpha values of the plurality of samples are all greater than the reference value. (7) The method of (1) further comprising the steps of: determining whether any samples in the current primitive may affect final pixel color values in the final graphics display image; and turning blending off for the current primitive when no samples in the current primitive affect final pixel color values in the final graphics display image. (8) The method of claim 1 wherein the step of comparing stamps in the current primitive to stamps from previously evaluated primitives further comprises the steps of: determining a maximum z value for a plurality of stamp locations of the current primitive; comparing the maximum z value for a plurality of stamp positions with a minimum z value of the current primitive and setting corresponding stamp selection bits; and identifying as a process row a row of stamps wherein the maximum z value for a stamp position in the row is greater than the minimum z value of the current primitive. (9) The method of (8) wherein the step of determining a maximum z value for a plurality of stamp locations of the current primitive further comprises determining a maximum z value for each stamp in a bounding box of the current primitive. (10) The method of (8) wherein the step of comparing stamps in the current primitive to stamps from previously evaluated primitives further comprises the steps of: determining the left most and right most stamps touched by the current primitive in each of the process rows and defining corresponding stamp primitive coverage bits; and combining the stamp primitive coverage bits with the stamp selection bits to generate a final potentially visible stamp set. (11) The method of (10) wherein the step of comparing stamps in the current primitive to stamps from previously evaluated primitives further comprises the steps of: determining a set of sample points in a stamp in the final potentially visible stamp set; computing a z value for a plurality of sample points in the set of sample points; and comparing the computed z values with stored z values and outputting sample control signals. (12) The method of (10) wherein the step of comparing the computed z values with stored z values, further comprises the steps of: storing a first sample at a first sample location as a Zfar sample, if a first depth state of the first sample is the maximum depth state of a visible sample at the first sample location; comparing a second sample to the first sample; and storing the second sample if the second sample is currently potentially visible as a Zopt sample, and discarding the second sample when the Zfar sample hides the second sample. (13) The method of (10) wherein when it is determined that one sample in a stamp should be dispatched down the pipeline, all samples in the stamp are dispatched down the pipeline. (14) The method of (10) wherein when it is determined that one sample in a pixel should be dispatched down the pipeline, all samples in the pixel are dispatched down the pipeline. (15) The method of (10) wherein the step of computing a z value for a plurality of sample points in the set of sample points further comprises the steps of: creating a reference z value for a stamp; computing partial derivatives for a plurality of sample points in the set of sample points; sending down the pipeline the reference z value and the partial derivatives; and computing a z value for a sample based on the reference z value and partial derivatives. (16) The method of (10) further comprising the steps of: receiving a reference z value and partial derivatives; and re-computing a z value for a sample based on the reference z value and partial derivatives. (17) The method of (10) further comprising the step of dispatching the CPVS when the CPVS can affect stencil values. The method of (13) further comprising the step of dispatching all currently potentially visible stamps when a stencil test changes. (19) The method of (10) further comprising the steps of: storing concurrently samples from a plurality of primitives; and comparing a computed z value for a sample at a first sample location with stored z values of samples at the first sample location from a plurality of primitives. (20) The method of (10) wherein each stamp comprises at least one pixel and wherein the pixels in a stamp are processed in parallel. (21) The method of (20) further comprising the steps of: dividing a display image area into tiles; and rendering the display image in each tile independently. (22) The method of (10) wherein the sample points are located at positions between subraster grid lines. (23) The method of (20) wherein locations of the sample points within each pixel are programmable. (24) The method of (23) further comprising the steps of: programming a first set of sample locations in a plurality of pixels; evaluating stamp visibility using the first set of sample locations; programming a second set of sample locations in a plurality of pixels; and evaluating stamp visibility using the second set of sample locations. (25) The method of (10) further comprising the step of eliminating individual stamps that are determined not to affect the final graphics display image. (26) The method of (10) further comprising the step of turning off blending when alpha values at vertices of the current primitive have values such that frame buffer color values cannot affect a final color of samples in the current primitive. (27) The method of (1) wherein the depth state comprises a far z value and a near z value.

(28) A hidden surface removal system for a deferred shader computer graphics pipeline comprising: a magnitude comparison content addressable memory Cull unit for identifying a first group of potentially visible samples associated with a current primitive; a Stamp Selection unit, coupled to the magnitude comparison content addressable memory cull unit, for identifying, based on the first group and a perimeter of the primitive, a second group of potentially visible samples associated with the primitive; a Z Cull unit, coupled to the stamp selection unit and the magnitude comparison content addressable memory cull unit, for identifying visible stamp portions by evaluating a pipeline state, and comparing depth states of the second group with stored depth state values; and a Stamp Portion Memory unit, coupled to the Z Cull unit, for storing visible stamp portions based on control signals received from the Z Cull unit, wherein the Stamp Portion Memory unit dispatches stamps having a visibility dependent on parameters evaluated later in the computer graphics pipeline. (29) The hidden surface removal system of (28) wherein the stored depth state values are stored separately from the visible stamp portions. (30) The hidden surface removal system of (28) wherein the Z Cull unit evaluates depth state and pipeline state values, and compares a currently potentially visible stamp (CPVS) to a first stamp; and wherein the Stamp Portion Memory, based on control signals from the Z Cull unit: discards the first stamp when no part of the first stamp would affect a final graphics display image based on the stamps that have been evaluated; discards the CPVS and makes the first stamp the CPVS, when the first stamp hides CPVS; dispatches the CPVS and makes the first stamp the CPVS when both the first stamp and the CPVS are at least partially visible in the final graphics display image; and dispatches the first stamp and the CPVS when the visibility of the first stamp and the CPVS depends on parameters evaluated later in the computer graphics pipeline. (31) The hidden surface removal system of (28) wherein the MCCAM Cull unit: determines a maximum z value for a plurality of stamp locations of the current primitive; compares the maximum z value for a plurality of stamp positions with a minimum z value of the current primitive and sets corresponding stamp selection bits; and identifies as a process row a row of stamps wherein the maximum z value for a stamp position in the row is greater than the minimum z value of the current primitive. (32) The hidden surface removal system of (31) wherein the Stamp Selection unit: determines the leftmost and right most stamps touched by the current primitive in each of the process rows and defines corresponding stamp primitive coverage bits; and combines the stamp primitive coverage bits with the stamp selection bits to generate a final potentially visible stamp set. (33) The hidden surface removal system of (32) wherein the Z Cull unit: determines a set of sample points in a stamp in the final potentially visible stamp set; computes a z value for a plurality of sample points in the set of sample points; and compares the computed z values with stored z values and outputs control signals. (34) The hidden surface removal system of (33) wherein the Z Cull unit comprises a plurality of Z Cull Sample State Machines, each of the Z Cull Sample State Machines receive, process and output control signals for samples parallel.

(35) A method of rendering a computer graphics image comprising the steps of: receiving a plurality of primitives to be rendered; selecting a sample location; rendering a front most opaque sample at the selected sample location, and defining the z value of the front most opaque sample as Zfar; comparing z values of a first plurality of samples at the selected sample location; defining to be Znear a first sample, at the selected sample location, having a z value which is less than Zfar and which is nearest to Zfar of the first plurality of samples; rendering the first sample; setting Zfar to the value of Znear; comparing z values of a second plurality of samples at the selected sample location; defining as Znear the z value of a second sample at the selected sample location, having a z value which is less than Zfar and which is nearest to Zfar of the second plurality of samples; and rendering the second sample. (36) The method of 35 further comprising the steps of: when a third plurality of samples at the selected sample location have a common z value which is less than Zfar, and the common z value is the z value nearest to Zfar of the first plurality of samples: rendering a third sample, wherein the third sample is the first sample received of the third plurality of samples; incrementing a first counter value to define a sample render number, wherein the sample render number identifies the sample to be rendered; selecting a fourth sample from the third plurality of samples; incrementing a second counter wherein the second counter defines an evaluation sample number; comparing the sample render number and the evaluation sample number; and rendering a sample when the corresponding evaluation sample number equals the sample render number.

Alternative Embodiments

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

All publications, patents, and patent applications mentioned in this specification are herein incorporated by reference to the same extent as if each individual publication or patent application was specifically and individually indicated to be incorporated by reference. U.S. Provisional Patent App. Ser. No. 60/097,336 entitled Graphics Processor with Deferred Shading filed Aug. 20, 1998 is hereby specifically incorporated by reference.

What is claimed is:

1. A method of performing hidden surface removal in a computer graphics pipeline comprising the steps of:
   selecting a current primitive from a group of primitives, each primitive comprising a plurality of stamps;
   comparing stamps in the current primitive to stamps from previously evaluated primitives in the group of primitives;
   selecting a first stamp as a currently potentially visible stamp (CPVS) based on a relationship of depth states of samples in the first stamp with depth states of samples of previously evaluated stamps;
   comparing the CPVS to a second stamp;
   discarding the second stamp when no part of the second stamp would affect a final graphics display image based on the stamps that have been evaluated;
   discarding the CPVS and making the second stamp the CPVS, when the second stamp hides the CPVS;
   dispatching the CPVS and making the second stamp the CPVS when both the second stamp and the CPVS are at least partially visible in the final graphics display image; and
   dispatching the second stamp and the CPVS when the visibility of the second stamp and the CPVS depends on parameters evaluated later in the computer graphics pipeline.

2. The method of claim 1 wherein the step of comparing the CPVS to a second stamp furthing comprises the steps of:
   comparing depth states of samples in the CPVS to depth states of samples in the second stamp; and
   evaluating pipeline state values.

3. The method of claim 1 wherein the depth state comprises one z value per sample, and wherein the z value includes a state bit which is defined to be accurate when the z value represents an actual z value of a currently visible surface and is defined to be conservative when the z value represents a maximum z value.

4. The method of claim 1 further comprising the step of dispatching the second stamp and the CPVS when the second stamp potentially alters the final graphics display image independent of the depth state.

5. The method of claim 1 further comprising the steps of:
   coloring the dispatched stamps; and
   performing an exact z buffer test on the dispatched stamps, after said coloring step.

6. The method of claim 1 further comprising the steps of:
   comparing alpha values of a plurality of samples to a reference alpha value; and
   performing said step of dispatching the second stamp and the CPVS, independent of alpha values when said alpha values of said plurality of samples are all greater than said reference value.

7. The method of claim 1 further comprising the steps of:
   determining whether any samples in said current primitive may affect final pixel color values in said final graphics display image; and
   turning blending off for said current primitive when no samples in said current primitive affect final pixel color values in said final graphics display image.

8. The method of claim 1 wherein the step of comparing stamps in the current primitive to stamps from previously evaluated primitives further comprises the steps of:

determining a maximum z value for a plurality of stamp locations of the current primitive;

comparing the maximum z value for a plurality of stamp positions with a minimum z value of the current primitive and setting corresponding stamp selection bits; and identifying as a process row a row of stamps wherein the maximum z value for a stamp position in the row is greater than the minimum z value of the current primitive.

9. The method of claim 1, wherein:

the step of comparing the CPVS to a second stamp further comprises the steps of comparing depth states of samples in the CPVS to depth states of samples in the second stamp and evaluating pipeline state values;

the depth state comprises one z value per sample, and wherein the z value includes a state bit which is defined to be accurate when the z value represents an actual z value of a currently visible surface and is defined to be conservative when the z value represents a z value greater than an actual z value of a currently visible surface;

further comprising the steps of: dispatching the second stamp and the CPVS when the second stamp potentially alters the final graphics display image independent of the depth state;

coloring the dispatched stamps; performing an exact z buffer test on the dispatched stamps, after said coloring step;

comparing alpha values of a plurality of samples to a reference alpha value;

performing said step of dispatching the second stamp and the CPVS, independent of alpha values when said alpha values of said plurality of samples are all greater than said reference value;

for a current primitive that has blending turned on, examining the vertex alpha values of the current primitive, if all the vertices of the current primitive are opaque, and turning the blending off for said current primitive;

comparing stamps in the current primitive to stamps from previously evaluated primitives further comprises the steps of:

determining a maximum z value for a plurality of stamp locations of the current primitive; and comparing the maximum z value for a plurality of stamp positions with a minimum z value of the current primitive and setting corresponding stamp selection bits;

determining a maximum z value for a plurality of stamp locations of the current primitive further comprises determining a maximum z value for each stamp in a bounding box of the current primitive;

comparing the CPVS to the second stamp comprises the steps of:
  (i) determining a set of sample points in a the second stamp;
  (ii) computing a z value for a plurality of sample points in the set of sample points; and
  (iii) comparing the computed z values with stored z values and outputting sample control signals; and comparing stamps in the current primitive to stamps from previously evaluated primitives further comprises the step of dispatching the CPVS when the CPVS can affect stencil values.

10. A hidden surface removal system for a deferred shader computer graphics pipeline comprising:

a Magnitude Comparison Content Addressable Memory (MCCAM) Cull unit for identifying a first group of potentially visible samples associated with a current primitive;

a Stamp Selection unit, coupled to the MCCAM cull unit, for identifying, based on the first group and a perimeter of the primitive, a second group of potentially visible samples associated with the primitive;

a Z Cull unit, coupled to the stamp selection unit and the MCCAM cull unit, for identifying visible stamp portions by evaluating a pipeline state, and comparing depth states of the second group with stored depth state values; and a Stamp Portion Memory unit, coupled to the Z Cull unit, for storing visible stamp portions based on control signals received from the Z Cull unit, wherein the Stamp Portion Memory unit dispatches stamps having a visibility dependent on parameters evaluated later in the computer graphics pipeline.

11. The hidden surface removal system of claim 10 wherein the stored depth state values are stored separately from the visible stamp portions.

12. The hidden surface removal system of claim 10 wherein the Z Cull unit evaluates depth state and pipeline state values, and compares a currently potentially visible stamp (CPVS) to a first stamp; and wherein said Stamp Portion Memory, based on control signals from the Z Cull unit:

discards the first stamp when no part of the first stamp would affect a final graphics display image based on the stamps that have been evaluated;

discards the CPVS and makes the first stamp the CPVS, when the first stamp hides CPVS;

dispatches the CPVS and makes the first stamp the CPVS when both the first stamp and the CPVS are at least partially visible in the final graphics display image; and dispatches the first stamp and the CPVS when the visibility of the first stamp and the CPVS depends on parameters evaluated later in the computer graphics pipeline.

13. A method of rendering a computer graphics image comprising the steps of:

receiving a plurality of primitives to be rendered;

selecting a sample location;

rendering a front most opaque sample at the selected sample location, and defining the z value of the front most opaque sample as Zfar;

comparing z values of a first plurality of samples at the selected sample location;

defining to be Znear a first sample, at the selected sample location, having a z value which is less than Zfar and which is nearest to Zfar of the first plurality of samples;

rendering the first sample;

setting Zfar; the value of Znear;

comparing z values of a second plurality of samples at the selected sample location;

defining as Znear the z value of a second sample at the selected sample location, having a z value which is less than Zfar and which is nearest to Zfar of the second plurality of samples; and rendering the second sample.

14. The method of claim 13 further comprising the steps of:

when a third plurality of samples at the selected sample location have a common z value which is less than Zfar, and the common z value is the z value nearest to Zfar of the first plurality of samples:

rendering a third sample, wherein the third sample is the first sample received of the third plurality of samples;

incrementing a first counter value to define a sample render number, wherein the sample render number identifies the sample to be rendered;

selecting a fourth sample from said third plurality of samples;

incrementing a second counter wherein said second counter defines an evaluation sample number;

comparing said sample render number and said evaluation sample number; and rendering a sample when the corresponding evaluation sample number equals the sample render number.

15. A computing system for 3D graphics rendering, the system comprising:

a host processor; and a computer graphics pipeline coupled to the host processor;

the computer graphics pipeline further including a hidden surface removal device comprising:

an input for receiving a current primitive from a group of primitives, each primitive composed of one or more stamps;

a stamp selection unit for identifying a touched stamp list, the stamps in the touched stamp list being associated with, the primitive;

a z cull unit, coupled to the stamp selection unit, for identifying visible stamp portions by evaluating a pipeline state and comparing depth states of the stamps in the touched stamp list with stored depth state values; and a pixel unit, to receive the visible stamp portions and perform fragment operations the received visible stamp portions.

16. The computing system of claim 15, wherein:

the stamp selection unit for identifying a touched stamp list further comprises: (a) means for selecting a first stamp from the previously evaluated primitives as a currently potentially visible stamp (CPVS) based on a relationship of depth states of samples in the first stamp with depth states of samples of at least some of the stamps in the previously evaluated primitives; and (b) means for selecting a second stamp, the second stamp being from the current primitive; and the z cull unit for comparing depth states of the stamps in the touched stamp list with stored depth state values further comprises: (i) means for comparing the CPVS to the second stamp; (ii) means for discarding the second stamp when no part of the second stamp would affect the final graphics display image based on the stamps that have been evaluated; (iii) means for discarding the CPVS and making the second stamp the CPVS, when the second stamp hides the CPVS; (iv) means for dispatching the CPVS and making the second stamp the CPVS when both the second stamp and the CPVS are at least partially visible in the final graphics display image; and (v) means for dispatching the second stamp and the CPVS when the visibility of the second stamp and the CPVS depends on parameters evaluated later in the computer graphics pipeline.

17. The computing system of claim 15, wherein the hidden surface removal device further comprises:

a magnitude comparison content addressable memory cull unit, coupled to the stamp selection unit, for processing the current primitive, using a perimeter of the current primitive, and either (i) eliminating entire current primitive, or, (ii) if the primitive can not be completely eliminated, generating a first group of stamps indicated by the value of stamp selection bits used to affect the touched stamp list.

18. The computing system of claim 16, wherein the hidden surface removal device further comprises:

a magnitude comparison content addressable memory update unit for determining a maximum z value for a plurality of stamp locations of the current primitive; and the magnitude comparison content addressable memory cull unit compares the maximum z value for a plurality of stamp positions with a minimum z value of the current primitive and sets corresponding stamp selection bits used to affect the touched stamp list.

19. A method of performing hidden surface removal to form a final graphics display of pixels, each pixel comprising one or more samples, each sample comprising a finite state machine, each finite state machine maintaining, (1) z coordinate information; (2) primitive information, the primitive information consisting of either (a) information needed to generate a primitive's color at that sample or pixel, or (b) a pointer to the information needed to generate a primitive's color at that sample or pixel; and (3) one or more sample state bits.

20. The method of claim 19, wherein the one or more sample state bits designate the z value or z values to be either (i) accurate or (ii) conservative; and the state bit is defined to be accurate when the z value represents an actual z value of a surface, and is defined to be conservative when the z value represents a z value greater than an actual z value of a surface.

21. A method of performing hidden surface removal in a computer graphics pipeline that forms a final graphics image from a plurality of graphics primitives, the method comprising the steps of:

(1) performing conservative hidden surface removal, the conservative hidden surface removal further comprising: (a) storing a plurality of first sample depth values; (b) computing depth values for the selected input primitive at sample locations within selected stamp regions; (c) comparing stored first sample depth values to computed depth values; (d) updating stored first sample depth values based on the comparison of the stored first sample depth values to the computed depth values; and (e) dispatching visible stamp portions, visible stamp portions being one or more sample locations of input primitives that were not eliminated by the comparisons of the stored first sample depth values to the computed depth values; and (2) performing z buffer operations, said z buffer operations further comprising: (f) storing a plurality of second sample depth values; (g) comparing the stored second depth values to depth values corresponding to sample locations in visible stamp portions; and (h) updating the second sample depth values based on the comparisons of the stored second depth values to the depth values corresponding to sample locations in visible stamp portions.

22. A device for performing hidden surface removal in a computer graphics pipeline to form a final graphics image from a plurality of graphics primitives, comprising:

(1) a z cull unit including: (1a) means for storing a plurality of first sample depth values; (1b) means for computing depth values for the selected input primitive at sample locations within selected stamp regions; (1c) means for comparing stored first sample depth values to computed depth values; (1d) means for updating stored first sample depth values based on the comparison of the stored first sample depth values to the computed depth values; and (1e) means for dispatching visible stamp portions, visible stamp portions being one or more sample locations of input primitives that were not eliminated by the comparisons of the stored first sample depth values to the computed depth values; and (2) a pixel unit including: (2a) means for storing a plurality of second sample depth values; (2b) means for comparing the stored second depth values to depth values corresponding to sample locations in visible stamp portions; and (2c) means for updating the second sample depth values based on the comparisons of the stored second depth values to the depth values corresponding to sample locations in visible stamp portions.

23. A computing system for 3D graphics rendering comprising:

a host processor coupled to a computer graphics pipeline, the computer graphics pipeline including a hidden surface removal device comprising:

(1) a z cull unit storing a plurality of first sample depth values, computing depth values for the selected input primitive at sample locations within selected stamp regions, comparing stored first sample depth values to computed depth values, updating stored first sample depth values based on the comparison of the stored first sample depth values to the computed depth values, and dispatching visible stamp portions, the visible stamp portions being one or more sample locations of input primitives that were not eliminated by the comparisons of the stored first sample depth values to the computed depth values; and (2) a pixel unit storing a plurality of second sample depth values, comparing the stored second depth values to depth values corresponding to sample locations in visible stamp portions, and updating the second sample depth values based on the comparisons of the stored second depth values to the depth values corresponding to sample locations in visible stamp portions.

24. A method of performing hidden surface removal in a computer graphics pipeline, forming a final graphics image from a plurality of graphics primitives, comprising the steps of:

(1) performing a spatial cull operation, the spatial cull operation further comprising steps of: (1a) storing a plurality of maximum z values, each maximum z value corresponding to a stamp, each stamp corresponding to a plurality of samples; (1b) comparing the maximum z values to a minimum z value of a selected input primitive; and (1c) selecting none, some, or all of corresponding stamp regions within a perimeter of the input primitive for further processing based on the result of the comparison of the maximum z values to he minimum z value;

(2) performing a conservative hidden surface removal operation, the conservative hidden surface removal operation further comprising steps of: (2a) storing a plurality of first sample depth values; (2b) computing depth values for the selected input primitive at sample locations within selected stamp regions; (2c) comparing stored first sample depth values to computed depth values; (2d) updating stored first sample depth values based on the comparison of the stored first sample depth values to the computed depth values; and (2e) dispatching visible stamp portions, visible stamp portions being one or more sample locations of input primitives that were not eliminated by either the comparisons of the maximum z values to the minimum z value or the comparisons of the stored first sample depth values to the computed depth values; and (3) performing a z buffer operation, the z buffer operation further comprising steps of: (3a) storing a plurality of second sample depth values; (3b) comparing the stored second depth values to depth values corresponding to sample locations in visible stamp portions; and (3c) updating the second sample depth values based on the comparisons of the stored second depth values to the depth values corresponding to sample locations in visible stamp portions.

25. A device for performing hidden surface removal in a computer graphics pipeline and forming a final graphics image from a plurality of graphics primitives, the device comprising:

(1) an magnitude comparison content addressable cull unit: (a) storing a plurality of maximum z values, each maximum z value corresponding to a stamp, each stamp corresponding to a plurality of samples; (b) comparing the maximum z values to a minimum z value of a selected input primitive; and (c) selecting none, some, or all of corresponding stamp regions within a perimeter of the input primitive for further processing based on the result of the comparison of the maximum z values to the minimum z value;

(2) a z cull unit: (a) storing a plurality of first sample depth values; (b) computing depth values for the selected input primitive at sample locations within selected stamp regions; (c) comparing stored first sample depth values to computed depth values; (d) updating stored first sample depth values based on the comparison of the stored first sample depth values to the computed depth values; and (e) dispatching visible stamp portions, the visible stamp portions being one or more sample locations of input primitives that were not eliminated by either the comparisons of the maximum z values to the minimum z value or the comparisons of the stored first sample depth values to the computed depth values; and (3) a pixel unit: (a) storing a plurality of second sample depth values; (b) comparing the stored second depth values to depth values corresponding to sample locations in visible stamp portions; and (c) updating the second sample depth values based on the comparisons of the stored second depth values to the depth values corresponding to sample locations in visible stamp portions.

26. A computing system for 3D graphics rendering comprising:

a host processor coupled to a computer graphics pipeline, the computer graphics pipeline including a hidden surface removal devise comprised of:

(1) an MCCAM cull unit for: (1a) storing a plurality of maximum z values, each maximum z value corresponding to a stamp, each stamp corresponding to a plurality of samples; (1b) comparing the maximum z values to a minimum z value of a selected input primitive; and (1c) selecting none, some, or all of corresponding stamp regions within a perimeter of the input primitive for further processing based on the result of the comparison of the maximum z values to the minimum z value;

(2) a z cull unit for: (2a) storing a plurality of first sample depth values; (2b) computing depth values for the selected input primitive at sample locations within selected stamp regions; (2c) comparing stored first sample depth values to computed depth values; (2d) updating stored first sample depth values based on the comparison of the stored first sample depth values to the computed depth values; and (2e) dispatching visible stamp portions, visible stamp portions being one or more sample locations of input primitives that were not eliminated by either the comparisons of the maximum z values to the minimum z value or the comparisons of the stored first sample depth values to the computed depth values; and (3) a pixel unit for: (3a) storing a plurality of second sample depth values; (3b) comparing the stored second depth values to depth values corresponding to sample locations in visible stamp portions; and (3c) updating the second sample depth values based on the comparisons of the stored second depth values to the depth values corresponding to sample locations in visible stamp portions.

27. A computer program product for use in conjunction with a computer system, the computer program product comprising a computer readable storage medium and a computer program mechanism embedded therein, the computer mechanism, comprising:

a program module that directs the rendering of a digital representation of a final graphics image from a plurality of graphics primitives, to function in a specified manner, storing the final graphics image into a frame buffer memory, the program module including instructions for:
(1) conservative hidden surface removal, the conservative hidden surface removal including the steps of: (1a) storing a plurality of first sample depth values; (1b) computing depth values for the selected input primitive at sample locations within selected stamp regions; (1c) comparing stored first sample depth values to computed depth values; (1d) updating stored first sample depth values based on the comparison of the stored first sample depth values to the computed depth values; and (1e) identifying visible stamp portions, visible stamp portions being one or more sample locations of input primitives that were not eliminated by the comparisons of the stored first sample depth values to the computed depth values; and
(2) z buffer processing, the z buffer processing including the steps of: (2a) storing a plurality of second sample depth values; (2b) comparing the stored second depth values to depth values corresponding to sample locations in visible stamp portions; and (2c) updating the second sample depth values based on the comparisons of the stored second depth values to the depth values corresponding to sample locations in visible stamp portions.

28. A computer program product for use in conjunction with a computer system, the computer program product comprising a computer readable storage medium and a computer program mechanism embedded therein, the computer mechanism, comprising:

a program module that directs the rendering of a digital representation of a final graphics image from a plurality of graphics primitives, to function in a specified manner, storing the final graphics image into a frame buffer memory, the program module including instructions for:
(1) a spatial cull operation comprising steps of: (1a) storing a plurality of maximum z values, each maximum z value corresponding to a stamp, each stamp corresponding to a plurality of samples; (1b) comparing the maximum z values to a minimum z value of a selected input primitive; and (1c) selecting none, some, or all of corresponding stamp regions within a perimeter of the input primitive for further processing based on the result of the comparison of the maximum z values to the minimum z value;
(2) a conservative hidden surface removal operation comprising steps of: (2a) storing a plurality of first sample depth values; (2b) computing depth values for the selected input primitive at sample locations within selected stamp regions; (2c) comparing stored first sample depth values to computed depth values; (2d) updating stored first sample depth values based on the comparison of the stored first sample depth values to the computed depth values; and (2e) identifying visible stamp portions, visible stamp portions being one or more sample locations of input primitives that were not eliminated by either the comparisons of the maximum z values to the minimum z value or the comparisons of the stored first sample depth values to the compute,d depth values; and
(3) a z buffer operation comprising steps of: (3a) storing a plurality of second sample depth values; (3b) comparing the stored second depth values to depth values corresponding to sample locations in visible stamp portions; and (3c) updating the second sample depth values based on the comparisons of the stored second depth values to the depth values corresponding to sample locations in visible stamp portions.

29. A method of performing hidden surface removal in a computer graphics pipeline, forming a final graphics image from a plurality of graphics primitives, comprising the steps of:

(1) selecting a current primitive from a group of primitives, each primitive comprising a plurality of stamps;
(2) performing a spatial cull operation, the spatial cull operation further comprising steps of:
(2a) storing a plurality of maximum z values, each maximum z value corresponding to a stamp, each stamp corresponding to a plurality of samples;
(2b) comparing the maximum z values to a minimum z value of a selected input primitive; and
(2c) selecting none, some, or all of corresponding stamp regions within a perimeter of the input primitive for further processing based on the result of the comparison of the maximum z values to the minimum z value;
(3) performing a conservative hidden surface removal operation, the conservative hidden surface removal operation further comprising steps of:
(3a) storing a plurality of first sample depth values, each first sample depth value comprising a finite state machine, each finite state machine maintaining:
(3a1) z coordinate information including a z value;
(3a2) primitive information, the primitive information consisting of either
(3a2a) information needed to generate a primitive's color at that sample or pixel, or (3a2b) a pointer to the information needed to generate a primitive's color at that sample or pixel; and (3a3) one or more sample state bits, at least one state bit per sample as depth state bit, defining the depth state bit as accurate when the z value represents an actual z value of a surface, and defining the depth state bit as conservative when the z value represents a z value greater than or equal to an actual z value of a surface;

(3b) computing depth values for the selected input primitive at sample locations within selected stamp regions, and comparing stamps in the current primitive to stamps from previously evaluated primitives in the group,of primitives, the comparing being done in one of two selectable modes:

(3b1) a first selectable mode, time order mode, comprising the steps of:

(3b1a) selecting a first stamp from the previously evaluated primitives as a currently potentially visible stamp (CPVS) based on a relationship of depth states of samples in the first stamp with depth state's of samples of at least some of the stamps in the previously evaluated primitives;

(3b1b) selecting a second stamp, the second stamp being from the current primitive;

(3b1c) comparing the CPVS to the second stamp, the steps comprising:

(3b1c1) comparing stored first sample depth values to computed depth values; and (3b1c2) updating stored first sample depth values based on the comparison of the stored first sample depth values to the computed depth values; and (3b1d) discarding the second stamp when no part of the second stamp would affect the final graphics display image based on the stamps that have previously been evaluated;

(3b1e) discarding the CPVS and making the second stamp the CPVS, when the second stamp hides the CPVS;

(3b1f) dispatching the CPVS and making the second stamp the CPVS when both the second stamp and the CPVS are at least partially visible in the final graphics display image; and (3b1g) dispatching the second stamp and the CPVS when the visibility of the second stamp and the CPVS depends on parameters evaluated later in the computer graphics pipeline.

(3b2) a second selectable mode, sorted transparency mode, comprising the steps of:

(3b2a) selecting a sample location in the stamp in the current primitive;

(3b2b) rendering a front most opaque sample at the selected sample location, and defining the z value of the front most opaque sample as Zfar;

(3b2c) comparing z values of a first plurality of samples at the selected sample location;

(3b2d) defining to be Znear a first sample, at the selected sample location, having a z value which is less than Zfar and which is nearest to Zfar of the first plurality of samples;

(3b2e) rendering the first sample;

(3b2f) setting Zfar to the value of Znear;

(3b2g) comparing z values of a second plurality of samples at the selected sample location;

(3b2h) defining as Znear the z value of a second sample at the selected sample location, having a z value which is less than Zfar and which is nearest to Zfar of the second plurality of samples; and (3b2i) rendering the second sample; and (4) performing a z buffer operation, the z buffer operation further comprising steps of:

(4a) storing a plurality of second sample depth values;

(4b) comparing the stored second depth values to depth values corresponding to sample locations in visible stamp portions; and (4c) updating the second sample depth values based on the comparisons of the stored second depth values to the depth values corresponding to sample locations in visible stamp portions.

30. A computing system for 3D graphics rendering comprising:

a host processor coupled to a computer graphics pipeline, the computer graphics pipeline including a hidden surface removal devise comprised of:

an input for receiving a current primitive from a group of primitives, each primitive composed of one or more stamps;

(1) an MCCAM cull unit for: (1a) storing a plurality of maximum z values, each maximum z value corresponding to a stamp, each stamp corresponding to a plurality of samples; (1b) comparing the maximum z values to a minimum z value of a selected input primitive; and (1c) selecting none, some, or all of corresponding stamp regions within a perimeter of the input primitive for further processing based on the result of the comparison of the maximum z values to the minimum z value;

a stamp selection unit for identifying a touched stamp list, the stamps in the touched stamp list being associated with the current primitive;

(2) a z cull/unit, coupled to the stamp selection unit, for identifying visible stamp portions by evaluating a pipeline, state and comparing depth states of the stamps in the touched stamp list with stored depth state values the z cull unit further comprising: (2a) a circuit for storing a plurality of first sample depth values; (2b) a circuit for computing depth values for the selected input primitive at sample locations within selected stamp regions; (2c) a circuit for comparing stored first sample depth values to computed depth values; (2d) a circuit for updating stored first sample depth values based on the comparison of the stored first sample depth values to the computed depth values; and (2e) a circuit for dispatching visible stamp portions, visible stamp portions being one or more sample locations of input primitives that were not eliminated by either the comparisons of the maximum z values to the minimum z value or the comparisons of the stored first sample depth values to the computed depth values; and (3) a pixel unit, to receive the visible stamp portions and perform fragment operations the received visible stamp portions, the pixel unit further comprising: (3a) a circuit for storing a plurality of second sample depth values; (3b) a circuit for comparing the stored second depth values to depth values corresponding to sample locations in visible stamp portions; and (3c) a circuit for updating the second sample depth values based on the comparisons of the stored second depth values to the depth values corresponding to sample locations in visible stamp portions.

31. A computing system for 3D graphics rendering comprising:

a host processor coupled to a computer graphics pipeline, the computer graphics pipeline including a hidden surface removal devise comprised of:
an input for receiving a current primitive from a group of primitives, each primitive composed of one or more stamps;
(1) an MCCAM cull unit for: (1a) storing a plurality of maximum z values, each maximum z value corresponding to a stamp, each stamp corresponding to a plurality of samples; (1b) comparing the maximum z values to a minimum z value of a selected input primitive; and (1c) selecting none, some, or all of corresponding stamp regions within a perimeter of the input primitive for further processing based on the result of the comparison of the maximum z values to the minimum z value;
a stamp selection unit for identifying a touched stamp list, the stamps in the touched stamp list being associated with; the current primitive;
(2) a z cull unit, coupled to the stamp selection unit, for identifying visible stamp portions by evaluating a pipeline state and comparing depth states of the stamps in the touched stamp list with stored depth state values, the z cull unit further comprising: (2a) a circuit for storing a plurality of first sample depth values; (2b) a circuit for computing depth values for the selected input primitive at sample locations within selected stamp, regions; (2c) a circuit for comparing stored first sample depth values to computed depth values; (2d) a circuit for updating stored first sample depth values based on the comparison of the stored first sample depth values to the computed depth values; and (2e) a circuit for dispatching visible stamp portions, visible stamp portions being one or more sample locations of input primitives that were not eliminated by either the comparisons of the maximum z values to the minimum z value or the comparisons of the stored first sample depth values to the computed depth values;
(3) a pixel unit, to receive the visible stamp portions and perform fragment operations the received visible stamp portions, the pixel unit further comprising: (3a) a circuit for storing a plurality of second sample depth values; (3b) a circuit for comparing the stored second depth values to depth values corresponding to sample locations in visible stamp portions; and (3c) a circuit for updating the second sample depth values based on the comparisons of the stored second depth values to the depth values corresponding to sample locations in visible stamp portions;
the magnitude comparison content addressable memory cull unit processing the current primitive by performing a spatial cull operation comprising:
(1a) storing a plurality of maximum z values, each maximum z value corresponding to a stamp, each stamp corresponding to a plurality of samples;
(1b) comparing the maximum z values to a minimum z value of a selected input primitive; and
(1c) selecting none, some, or all of corresponding stamp regions within a perimeter of the input primitive for further processing based on the result of the comparison of the maximum z values to the minimum z value;
the z cull unit processing the selected corresponding stamp regions by performing a conservative hidden surface removal operation comprising:
(2a) storing a plurality of first sample depth values, each first sample depth value comprising a finite state machine, each finite state machine maintaining:
(2a1) z coordinate information including a z value;
(2a2) primitive information, the primitive information consisting of either
(2a2a) information needed to generate a primitive's color at that sample or pixel, or
(2a2b) a pointer to the information needed to generate a primitive's color at that sample or pixel; and
(2a3) one or more sample state bits, at least one state bit per sample as depth state bit, defining the, depth state bit as accurate when the z value represents an actual z value of a surface, and defining the depth state bit as conservative when the z value represents a z value greater than or equal to an actual z value of a surface;
(2b) computing depth values for the selected input primitive at sample locations within selected stamp regions, and comparing stamps in the current primitive to stamps from previously evaluated primitives in the group of primitives, the comparing being done in one of two selectable modes:
(2b1) a first selectable mode, time order mode, comprising the steps of:
(2b1a) selecting a first stamp from the previously evaluated primitives as a currently potentially visible stamp (CPVS) based on a relationship of depth states of samples in the first stamp with depth states of samples of at least some of the stamps in the previously evaluated primitives;
(2b1b) selecting a second stamp, the second stamp being from the current primitive;
(2b1c) comparing the CPVS to the second stamp, the steps comprising:
(2b1c1) comparing stored first sample depth values to computed depth values; and
(2b1c2) updating stored first sample depth values based on the comparison of the stored first sample depth values to the computed depth values; and
(2b1d) discarding the second stamp when no part of the second stamp would affect the final graphics display image based on the stamps that have previously been evaluated;
(2b1e) discarding the CPVS and making the second stamp the CPVS, when the second stamp hides the CPVS;
(2b1f) dispatching the CPVS and making the second stamp the CPVS when both the second stamp and the CPVS are at least partially visible in the final graphics display image; and
(2b1g) dispatching the second stamp and the CPVS when the visibility of the second stamp and the CPVS depends on parameters evaluated later in the computer graphics pipeline.
(2b2) a second selectable mode, sorted transparency mode, comprising the steps of:
(2b2a) selecting a sample location in the stamp in the current primitive;
(2b2b) rendering a front most opaque sample at the selected sample location, and defining the z value of the front most opaque sample as Zfar;
(2b2c) comparing z values of a first plurality of samples at the selected sample location;
(2b2d) defining to be Znear a first sample, at the selected sample location, having a z value which is less than Zfar and which is nearest to Zfar of the first plurality of samples;

(2b2e) rendering the first sample;
(2b2f) setting Zfar to the value of Znear;
(2b2g) comparing z values of a second plurality of samples at the selected sample location;
(2b2h) defining as Znear the z value of a second sample at the selected sample location, having a z value which is less than Zfar and which is nearest to Zfar of the second plurality of samples; and
(2b2i) rendering the second sample; and
the pixel unit processing the visible stamp portions by performing a z buffer operation comprising:

(3a) storing a plurality of second sample depth values;
(3b) comparing the stored second depth values to depth values corresponding to sample locations in visible stamp portions; and
(3c) updating the second sample depth values based on the comparisons of the stored second depth values to the depth values corresponding to sample locations in visible stamp portions.

* * * * *